US008614277B2

(12) United States Patent
Kiss et al.

(10) Patent No.: US 8,614,277 B2
(45) Date of Patent: *Dec. 24, 2013

(54) POLYPROPYLENE ETHYLENE-PROPYLENE COPOLYMER BLENDS AND IN-LINE PROCESS TO PRODUCE THEM

(75) Inventors: Gabor Kiss, Hampton, NJ (US); Patrick Brant, Seabrook, TX (US); Robert Patrick Reynolds, Jr., Clinton, NJ (US); Aspy K. Mehta, Humble, TX (US); Manika Varma-Nair, Warren, NJ (US); John W. Chu, Neshanic Station, NJ (US); Steven P. Rucker, Warren, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/371,733

(22) Filed: Feb. 13, 2012

(65) Prior Publication Data

US 2012/0225998 A1    Sep. 6, 2012

Related U.S. Application Data

(62) Division of application No. 12/317,045, filed on Dec. 18, 2008, now Pat. No. 8,138,269.

(60) Provisional application No. 60/008,495, filed on Dec. 20, 2007.

(51) Int. Cl.
*C08F 2/01* (2006.01)
*C08F 6/06* (2006.01)
*C08L 23/16* (2006.01)

(52) U.S. Cl.
USPC ............... 525/53; 525/54; 525/191; 525/240

(58) Field of Classification Search
USPC ...................... 525/53, 54, 191, 240
See application file for complete search history.

(56) References Cited

U.S. PATENT DOCUMENTS

| | | | |
|---|---|---|---|
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,041,584 A | 8/1991 | Crapo et al. |
| 5,066,741 A | 11/1991 | Campbell, Jr. |
| 5,091,352 A | 2/1992 | Kioka et al. |
| 5,103,031 A | 4/1992 | Smith, Jr. |
| 5,153,157 A | 10/1992 | Hlatky et al. |
| 5,157,137 A | 10/1992 | Sangokoya |
| 5,198,401 A | 3/1993 | Turner et al. |
| 5,204,419 A | 4/1993 | Tsutsui et al. |
| 5,206,197 A | 4/1993 | Campbell, Jr. |
| 5,206,199 A | 4/1993 | Kioka et al. |
| 5,235,081 A | 8/1993 | Sangokoya |
| 5,241,025 A | 8/1993 | Hlatky et al. |
| 5,248,801 A | 9/1993 | Sangokoya |
| 5,329,032 A | 7/1994 | Tran et al. |
| 5,384,299 A | 1/1995 | Turner et al. |
| 5,502,124 A | 3/1996 | Crowther et al. |
| 5,942,459 A | 8/1999 | Sugano et al. |
| 5,965,477 A | 10/1999 | Sivaram et al. |
| 5,972,510 A | 10/1999 | O'Hare et al. |
| 6,034,187 A | 3/2000 | Maehama et al. |
| 6,500,563 B1 | 12/2002 | Data et al. |
| 6,525,157 B2 | 2/2003 | Cozewith et al. |
| 6,531,552 B2 | 3/2003 | Nakano et al. |
| 6,590,055 B2 | 7/2003 | Brant |
| 6,642,316 B1 | 11/2003 | Datta et al. |
| 6,878,790 B2 | 4/2005 | Preuschen et al. |
| 7,354,979 B2 | 4/2008 | Brant et al. |
| 7,429,634 B2 | 9/2008 | Brant et al. |
| 7,619,026 B2 | 11/2009 | Yang et al. |

(Continued)

FOREIGN PATENT DOCUMENTS

| | | |
|---|---|---|
| EP | 0277003 A1 | 8/1988 |
| EP | 0277004 A1 | 8/1988 |

(Continued)

OTHER PUBLICATIONS

Baum, Rudy M., Chemical and Engineering News, 63(5), 27 (1985).
Datta, S., Srinivas., S., Cheng, C.Y., Hu, W., Tsou, A., Lohse, D.J., "Polyolefin elastomers with isotactic propylene crystallinity", Rubber World, Rohere, Jill, Ed., Oct. 2003, 55-67, Lippincott & Peto, Inc., US.
Rieger, Bernhard; Troll, Carsten; Preuschen, Judith, "Ultrahigh Molecular Weight Polypropene Elastomers by High Activity 'Dual-Side' Hafnocene Catalysts", Macromolecules, Jun. 19, 2002, 5742-5743, vol. 35, American Chemical Society, Published on the Web.
M. Kinzl, G. Luft, R. Horst, B.A. Wolf, J., "Viscosity of solutions of low-density polyethylene in ethylene as a function of temperature and pressure", Journal of Rheology, Brady, John, Ed., Jul./Aug. 2003, 869-877, 47(4), The Society of Rheology, Inc.
Tarmy, B.L., "Reactor Technology", Encyclopedia of Polymer Sci. and Eng., H.F. Mark et al., Eds., 189-237, vol. 14, Wiley, New York, 1988.
Soares, JBP, Simon, LC, "Coordination Polymerization", Handbook of Polymer Reaction Engineering, Meyer, T. and Keurentjes, J., Eds., 2005, p. 365-430, Wiley•VCH, Weinheim.

(Continued)

*Primary Examiner* — Irina S Zemel
*Assistant Examiner* — Jeffrey Lenihan
(74) *Attorney, Agent, or Firm* — Robert A. Migliorini

(57) ABSTRACT

Isotactic polypropylene ethylene-propylene copolymer blends and in-line processes for producing. The blends may have between 1 and 50 wt % of isotactic polypropylene with a melt flow rate of between 0.5 and 20,000 g/10 min and a melting peak temperature of 145° C. or higher, and wherein the difference between the DSC peak melting and the peak crystallization temperatures is less than or equal to 0.5333 times the melting peak temperature minus 41.333° C., and between 50 and 99 wt % of ethylene-propylene copolymer including between 10 wt % and 20 wt % randomly distributed ethylene with a melt flow rate of between 0.5 and 20,000 g/10 min, wherein the copolymer is polymerized by a bulk homogeneous polymerization process, and wherein the total regio defects in the continuous propylene segments of the copolymer is between 40 and 150% greater than a copolymer of equivalent melt flow rate and wt % ethylene polymerized by a solution polymerization process.

20 Claims, 26 Drawing Sheets

(56) References Cited

U.S. PATENT DOCUMENTS

| | | | |
|---|---|---|---|
| 7,910,637 B2* | 3/2011 | Kiss et al. | 523/343 |
| 7,928,162 B2* | 4/2011 | Kiss et al. | 525/53 |
| 7,963,923 B2 | 6/2011 | Aihara et al. | |
| 7,994,237 B2* | 8/2011 | Kiss et al. | 523/348 |
| 8,080,610 B2* | 12/2011 | Kiss et al. | 525/53 |
| 8,143,352 B2* | 3/2012 | Kiss et al. | 525/240 |
| 2004/0127654 A1* | 7/2004 | Brant et al. | 526/64 |
| 2006/0025545 A1 | 2/2006 | Brant et al. | |
| 2008/0153997 A1 | 6/2008 | Casty et al. | |
| 2008/0281040 A1* | 11/2008 | Kiss et al. | 525/54 |
| 2009/0076214 A1* | 3/2009 | Kiss et al. | 524/570 |

FOREIGN PATENT DOCUMENTS

| | | |
|---|---|---|
| EP | 0495375 B1 | 7/1992 |
| EP | 0520732 B1 | 12/1992 |
| EP | 561476 B1 | 3/1993 |
| EP | 0570982 B1 | 11/1993 |
| EP | 0279586 B1 | 5/1994 |
| EP | 0516476 B1 | 10/1997 |
| EP | 0511665 B1 | 7/1998 |
| EP | 500944 B1 | 10/1998 |
| EP | 594218 B1 | 3/1999 |
| EP | 767184 B1 | 8/1999 |
| EP | 1160261 B1 | 6/2007 |
| WO | 9410180 A1 | 5/1994 |
| WO | 9843983 A1 | 10/1998 |
| WO | 9947598 A1 | 9/1999 |
| WO | 9948605 A1 | 9/1999 |
| WO | 9950311 A1 | 10/1999 |
| WO | 9960033 A1 | 11/1999 |
| WO | 0118109 A1 | 3/2001 |
| WO | 0238628 A2 | 5/2002 |
| WO | 0246247 A2 | 6/2002 |
| WO | 02055566 A2 | 7/2002 |
| WO | 03040095 A2 | 5/2003 |
| WO | 03040201 A1 | 5/2003 |
| WO | 03040202 A2 | 5/2003 |
| WO | 03040233 A2 | 5/2003 |
| WO | 03040442 A1 | 5/2003 |
| WO | 03064433 A1 | 8/2003 |
| WO | 2004041928 A1 | 5/2004 |

OTHER PUBLICATIONS

Spaleck, Walter, Kuber, Frank, Winter, Andreas, Rohrmann, Jurgen, Bachmann, Bernd, Antbert, Martin, Dolle, Volker, Paulus, Erich F., "The Influence of Aromatic Substituents on the Polymerization Behavior of Bridged Zirconocene Catalysts", Organometallics, Seyferth, Dietmar, Ed., 1994, 954-963, 13, American Chemical Society, US.

Spaleck, W., Antberg, M., Aulbach, M., Bachmann, B., Dolle, V.,Haftka, S., Kuber, F., Rohrmann, J., Winter, A., "New Isotactic Polypropylenes via Metallocene Catalysts", Ziegler Catalysts, Fink/Mulhaupt/Brintzinger, Eds., 1995, 83-97 Springer, Berlin.

Resconi, Luigi Fabrizio, Piemontesi, Camurati, Isabella, Sudmeijer, Olof, Nifant'ev, Ilya E., Ivchenko, Pavel V., Kuz'mina, Lyudmila G., "Highly Regiospecific Zirconocene Catalysts for the Isospecific Polymerization of Propene", Journal of the American Chemical Society, Mar. 3, 1998, 2308-2321, vol. 120, Published on the Web.

Chen, Eugene You-Xian and Marks, Tobin J., "Cocatalysts for Metal•Catalyzed Olefin Polymerization: Activators, Activation Processes and Structure-Activity Relationships", Chemical Reviews, Mar. 28, 2000, 1391-1434, vol. 100, Journal of American Chemical Society, Published on the Web.

Han, S. Joon, Gregg, Christopher J., Radosz, Maciej, "How the Solute Polydispersity Affects the Cloud-Point and Coexistence Pressures in Propylene and Ethylene Solutions of Alternating Poly(etheylene-co-propylene)", Industrial & Engineering Chemistry Research, Paul, Donald R., Ed., 1997, 5520-5525, vol. 36, American Chemical Society, US.

Koak, N., Visser, R.M., de Loos, Th. W., "High-pressure phase behavior of the systems polyethylene + ethylene and polybutene + 1-butene", Fluid Phase Equilibria, Cummings, P.T., Ed., Jun. 25, 1998, 835-846, vols. 158-160, Elsevier BV, Netherlands.

Scanlon, James T., Willis, Donald E., "Calculation of Flame Ionization Detector Relative Response Factors Using the Effective Carbon Number Concept", Journal of Chromatographic Science, Bailey, Kevin, Ed., Aug. 1985, 333-340, vol. 23, Preson Publications, US.

Dietz, W.A., "Response Factors for Gas Chromatographic Analyses", Journal of Gas Chrom., Feb. 1967, 68-71.

Resconi, Luigi, Cavallo, Luigi, Fait, Anna, Piemontesi, Fabrizio, "Selectivity in Propene Polymerization with Metallocene Catalysts", Chemical Reviews, Mar. 25, 2000, 1253-1345, vol. 100, American Chemical Society, US.

Wunderlich, B., "Thermal Analysis" Academic Press, 1990, 418, Harcourt Brace Jovanich, Boston.

Sun, Thomas, Brant, Patrick, Chance, Ronald R., Graessley, William W., "Effect of Short Chain Branching on the Coil Dimensions of Polyolefins in Dilute Solution", Macromolecules, Aug. 17, 2001, 6812-6820, vol. 34, No. 19, American Chemical Society, Published on the Web.

DiMartino, S., Kelchtermans, M., "Determination of the Composition of Ethylene-Propylene-Rubbers Using 13C-NMR Spectroscopy", Journal of Applied Polymer Science, Baer, Eric, Ed., 1995, 1781-1787, vol. 56, John Wiley & Sons, Inc., US.

Randall, James C., Rucker, Steven P., "Markovian Statistics for Finite Chains: Characterization of End Group Structures and Initiation, Chain Propagation, and Chain-Transfer Probabilities in Poly(ethylene-co-propylene)", Macromolecules, Lodge, Timothy P., Ed., 1994, 2120-2129, vol. 27(8) American Chemical Society, US.

Randall, J. C., "A Review of High Resolution Liquid 13Carbon Nuclear Magnetic Resonance Characterizations of Ethylene-Based Polymers", JMS—Rev. Macromol. Chem. Phys. 1989, 201-317, 029(2 & 3),, Marcel Dekker, Inc.

Cheng, H.N., "13C NMR Analysis of Ethylene-Propylene Rubbers", Macromolecules, Lodge, Timothy P., 1984, 1950•1955, vol. 17, American Chemical Society, US.

* cited by examiner

Production of polymer blends in two-stage series reactor configuration (Prior Art)

In-line polymer blending process with single separation vessel

In-line polymer blending with buffer tanks for improved blend ratio control and with the option for additive/polymer blending component Operating regime with process disclosed for a reactor operating in a fluid–fluid phase Turnover frequency independent of catalyst concentration due to first kinetic order for catalyst in supercritical propylene polymerization with MAO-activated (μ-dimethylsilyl)bis(2-methyl-4-phenylindenyl)zirconium dichloride (Q-Zr-MAO) at 120-130 °C and 10 or 20 kpsi total pressure

2,1-E

2,1-EE

2,1-P

Defects for a EP copolymer chain segment growing from left to right

POLYPROPYLENE ETHYLENE-PROPYLENE COPOLYMER BLENDS AND IN-LINE PROCESS TO PRODUCE THEM

CROSS REFERENCE TO RELATED APPLICATION

This application is a divisional application filed under 37 C.F.R. 1.53(b) of parent application U.S. Ser. No. 12/317,045, the entirety of which is hereby incorporated herein by reference, which claims the benefit of U.S. Provisional Application No. 61/008,495 filed Dec. 20, 2007, herein incorporated by reference in its entirety.

FIELD

The present invention relates to the field of polymer blends and in-line processes to produce them. It more particularly relates to blends of isotactic polypropylene and ethylene-propylene copolymer and in-line fluid phase processes for producing them.

BACKGROUND

Blends of highly crystalline isotactic polypropylene (iPP) and soft ethylene-propylene (EP) copolymers find many uses where flexibility and softness need to be combined with rapid crystallization for fast processing. These are iPP-EP blends produced at typically made by melt-blending an iPP resin and an EP copolymer resin. The off-line melt blending process significantly increases the production cost since it involves two devolatilization-pelletization steps for the two blending components followed by melt-blending and pelletization of the final product blend and also has many of the disadvantages associated with off-line blending techniques.

Polymer blends may be made by a variety of ways. A flexible but expensive off-line process of making polymer blends currently applied for making iPP-EP blends uses solid polymers as starting materials, typically outside the polymerization process that produced the polymer blend components. The polymer blend components are typically first melted or dissolved in a solvent and then blended. These processes are known as melt-blending and off-line solution blending, respectively. In melt blending, the solid, often pelletized or haled, polymer blend components are first melted and then blended together in their molten state. One of the difficulties presented by melt blending is the high viscosity of molten polymers, which makes blending of two or more polymers difficult and often imperfect on the molecular level. In solution off-line blending, the solid, often pelletized or baled, polymer blend components are first dissolved in a suitable solvent to form a polymer solution, and then two or more polymer solutions are blended together. After blending, solution blending requires the removal of solvent from the blend and drying of the blended polymer. Solution blending can overcome the viscosity issue associated with melt blending, but is expensive due to the need for redissolving the polymer blend components and due to the cost of solvent handling.

The common feature of both melt blending and off-line solution blending is that the polymer blending components are made in separate plants and the solid polymers then are reprocessed either in a molten or in a dissolved state to prepare the final polymer blend. In fact, these off-line blending processes are often operated by so-called compounders, generally independent of the manufacturers of the polymer blend components. These processes add considerable cost to the cost of the final polymer blend. The production and full polymer recovery in separate plants and subsequent reprocessing increases the costs of producing such blends because of the need for duplicate polymer recovery lines and because of the need for separate blending facilities and the energy associated with their operations. Off-line solution blending also requires extra solvent, and facilities for polymer dissolution and solvent recovery-recycle. Substantial reprocessing costs could be saved if the polymer blends could be made in one integrated polymerization plant in-line, i.e. before the recovery and pelletizing of the solid polymer blend components.

The disadvantage of a separate polyolefin blending plant associated with the melt blending and off-line solution blending processes is alleviated with the prior art method of in-line solution blending of polymers using a series reactor configuration. Utilizing the series reactor configuration, product blending may be accomplished in the solution polymerization reactor itself when the effluent of the first solution polymerization reactor is fed into the second reactor operating at different conditions with optionally different catalyst and monomer feed composition. Referring to the two-stage series reactor configuration of FIG. 1 (prior art), the two different polymers made in the first and second reactor stages are blended in the second stage yielding a blended polymer product leaving the second reactor. Such reactor series configuration may be further expanded into more than a two-stage series configuration (three or more reactors in series). Generally, a series of n reactors may produce a blend with as many as n components or even more present in the effluent of the last reactor. Note that in principle, more than n components may be produced and blended in n reactors by, for example, using more than one catalyst or by utilizing multiple zones operating at different conditions in one or more reactors of the series reactor cascade. While mixing in the downstream reactor(s) provides good product mixing, particularly when the reactors are equipped with mixing devices, e.g., mechanical stirrers, such series reactor configuration and operation presents a number of practical process and product quality control problems due to the close coupling of the reactors in the cascade. One of the most important difficulties in commercial practice is ensuring proper blend and monomer ratios to deliver consistent blend quality. Additional complications arise when the blend components have different monomer compositions, particularly when they have different monomer pools, such as in the case of blending different copolymers or in the case of blending homo- and copolymers. Since the monomer streams are blended, there is no option for their separate recovery and recycle mandating costly monomer separations in the monomer recycle lines.

Applying parallel reactors can overcome many of the disadvantages related to the direct coupling of the polymerization reactors in an in-line polymer blending applying series reactors. While production flexibility is increased, a parallel reactor arrangement necessitates the installation of blending vessels increasing the cost of the process.

A need thus exists for an improved and cost-effective method of in-line blending of iPP and EP copolymers to avoid the issues associated with the prior-art methods, such as melt blending, off-line solution blending, and in-line solution blending in a series reactor configuration. More particularly, a need exists for an improved in-line method of blending iPP and EP copolymers, where to the residence time, monomer composition, catalyst choice, and catalyst concentration can be independently controlled in each polymer reactor prior to the blending step. There is also a need for improved blends of isotactic polypropylene and ethylene-propylene copolymers that yield improved properties and performance in comparison to prior art blends of such polymers.

SUMMARY

Provided are blends of isotactic polypropylene and ethylene-propylene copolymer and fluid-phase in-line blending process for producing such blends.

According to the present disclosure, an advantageous in-line blending process for producing blends of polypropylene and ethylene-propylene copolymer comprises: (a) providing two or more reactor trains configured in parallel and a high-pressure separator downstream fluidly connected to the two or more reactor trains configured in parallel, wherein one or more of the reactor trains produces polypropylene and one or more of the reactor trains produces ethylene-propylene copolymer; (b) contacting in one or more of the reactor trains configured in parallel 1) propylene, 2) one or more catalyst systems, and 3) optional one or more diluents or solvents, wherein the polymerization system for at least one of the reactor trains configured in parallel is at a temperature above the solid-fluid phase transition temperature, at a pressure no lower than 10 MPa below the cloud point pressure and less than 1500 MPa, contacting in the other one or more reactor trains configured in parallel 1) propylene, 2) ethylene, 3) optional one or more comonomers comprising four or more carbon atoms, 4) one or more catalyst systems, and 5) optional one or more diluents or solvents, wherein at least one of the reactor trains is at a temperature of between 65° C. and 180° C. and at a pressure no lower than 10 MPa below the cloud point pressure of the polymerization system and less than 1500 MPa, wherein the polymerization system for each reactor train is in its dense fluid state and comprises propylene, any ethylene present, any comonomer comprising four or more carbon atoms present, any diluent or solvent present, and the polymer product, wherein the catalyst system for each reactor train comprises one or more catalyst precursors, one or more activators, and optionally, one or more catalyst supports; and (c) forming a reactor effluent including a homogeneous fluid phase polymer-monomer mixture in each parallel reactor train; (d) combining the reactor effluent comprising the homogeneous fluid phase polymer-monomer mixture from each parallel reactor train to form a combined reactor effluent; (e) passing the combined reactor effluent through the high-pressure separator for product blending and product-feed separation; (f) maintaining the temperature and pressure within the high-pressure separator above the solid-fluid phase transition point but below the cloud point pressure and temperature to form a fluid-fluid two-phase system comprising a polymer-rich phase and a monomer-rich phase; (g) separating the monomer-rich phase from the polymer-rich phase to form a polymer-enriched stream comprising a blend of polypropylene and ethylene-propylene copolymer and a separated monomer-rich stream, and (h) further processing the polymer enriched stream of (g) to further remove any solvent/diluent and/or monomer to yield a polypropylene-(ethylene-propylene copolymer) product blend.

A further aspect of the present disclosure relates to an advantageous in-line blending process for producing blends of polypropylene and ethylene-propylene copolymer comprising: (a) providing two or more reactor trains configured in parallel and two or more high-pressure separators fluidly connected to the two or more reactor trains configured in parallel, wherein one or more of the reactor trains produces polypropylene and one or more of the reactor trains produces ethylene-propylene copolymer; (b) contacting in one or more of the reactor trains configured in parallel 1) propylene, 2) one or more catalyst systems, and 3) optional one or more diluents or solvents, wherein the polymerization system for at least one of the reactor trains configured in parallel is at a temperature above the solid-fluid phase transition temperature, at a pressure no lower than 10 MPa below the cloud point pressure and less than 1500 MPa, contacting in the other one or more reactor trains configured in parallel 1) propylene, 2) ethylene, 3) optional one or more comonomers comprising four or more carbon atoms, 4) one or more catalyst systems, and 4) optional one or more solvents, wherein at least one of the reactor trains is at a temperature of between 65° C. and 180° C. and at a pressure no lower than 10 MPa below the cloud point pressure of the polymerization system and less than 1500 MPa, wherein the polymerization system for each reactor train is in its dense fluid state and comprises propylene, any ethylene present, any comonomer comprising four or more carbon atoms present, any diluent or solvent present, and the polymer product, wherein the catalyst system for each reactor train comprises one or more catalyst precursors, one or more activators, and optionally, one or more catalyst supports; and (c) forming an unreduced reactor effluent including a homogenous fluid phase polymer-monomer mixture in each parallel reactor train; (d) passing the unreduced reactor effluents from one or more but not from all of the parallel reactor trains through one or more high-pressure separators, maintaining the temperature and pressure within the one or more high-pressure separators above the solid-fluid phase transition point but below the cloud point pressure and temperature to form one or more fluid-fluid two-phase systems with each two-phase system comprising a polymer-enriched phase and a monomer-rich phase, and separating the monomer-rich phase from the polymer-enriched phase in each of the one or more high-pressure separators to form one or more separated monomer-rich phases and one or more polymer-enriched phases; (e) combining the one or more polymer-enriched phases from the one or more high-pressure separators of (d) with the one or more unreduced reactor effluents from one or more parallel reactor trains to form a mixture of one or more polymer-enriched phases and the one or more unreduced reactor effluents from the one or more parallel reactor trains to form a combined effluent stream that comprises the polymeric blend components from all parallel reactor trains; (f) passing the combined effluent stream of (e) into another high-pressure separator for product blending and product-feed separation; (g) maintaining the temperature and pressure within the another high pressure separator of (f) above the solid-fluid phase transition point but below the cloud point pressure and temperature to form a fluid-fluid two-phase system comprising a polymer-rich blend phase and a monomer-rich phase; (h) separating the monomer-rich phase from the polymer-rich blend phase to form a polymer-enriched stream comprising a blend of polypropylene and ethylene-propylene copolymer and a separated monomer-rich stream, and (i) further processing the polymer-enriched stream of (h) to further remove any solvent/diluent and/or monomer to yield a polypropylene-(ethylene-propylene copolymer) product blend.

A still further aspect of the present disclosure relates to an advantageous blend of isotactic polypropylene and ethylene-propylene copolymer comprising: between 1 and 50 wt % of isotactic polypropylene with a melt flow rate of between 0.5 and 20,000 g/10 min, and between 50 and 99 wt % of ethylene-propylene copolymer including between 10 wt % and 20 wt % randomly distributed ethylene with a melt flow rate of between 0.5 and 20,000 g/10 min, wherein the copolymer is polymerized by a hulk homogeneous polymerization process, and wherein the total regio defects in the continuous propylene segments of the copolymer is between 40 and 150% greater than a copolymer of equivalent melt flow rate and wt % ethylene polymerized by a solution polymerization process.

A still further aspect of the present disclosure relates to an advantageous blend of isotactic polypropylene and ethylene-propylene copolymer comprising: between 1 and 50 wt % of isotactic polypropylene with more than 15 and less than 100 regio defects (sum of 2,1-erithro, 2,1-threo insertions, and 3,1-isomerizations) per 10,000 propylene units in the polymer chain, an mmmmm pentad fraction of 0.85 or more, a weight average molecular weight (Mw) of at least 35 kg/mol, a melting peak temperature of 149° C. or higher, a heat of fusion ($\Delta$Hf) of at least 80 J/g, and wherein the difference between the DSC peak melting and the peak crystallization temperatures (Tmp–Tcp) is less than or equal to 0.907 times the melting peak temperature minus 99.64 (Tmp–Tcp$\leq$0.907 Tmp–99.64)° C., and between 50 and 99 wt % of ethylene-propylene copolymer including between 10 wt % and 20 wt % randomly distributed ethylene with a melt flow rate of between 0.5 and 20,000 g/10 min.

A still yet further aspect of the present disclosure relates to an advantageous blend of polypropylene and ethylene-propylene copolymer comprising: between 1 and 50 wt % of isotactic polypropylene with more than 15 and less than 100 regio defects (sum of 2,1-erithro, 2,1-threo insertions, and 3,1-isomerizations) per 10,000 propylene units in the polymer chain, an mmmmm pentad fraction of 0.85 or more, a weight average molecular weight (Mw) of at least 35 kg/mol, a melting peak temperature of 149° C. or higher, a heat of fusion ($\Delta$Hf) of at least 80 J/g, and wherein the difference between the DSC peak melting and the peak crystallization temperatures (Tmp–Tcp) is less than or equal to 0.907 times the melting peak temperature minus 99.64 (Tmp–Tcp$\leq$0.907 Tmp–99.64)° C., and between 50 and 99 wt % of ethylene-propylene copolymer including between 10 wt % and 20 wt % randomly distributed ethylene with a melt flow rate of between 0.5 and 20,000 g/10 min, wherein the copolymer is polymerized by a bulk homogeneous polymerization process, and wherein the total regio defects in the continuous propylene segments of the copolymer is between 40 and 150% greater than a copolymer of equivalent melt flow rate and wt % ethylene polymerized by a solution polymerization process.

These and other features and attributes of the disclosed blends of isotactic polypropylene and ethylene-propylene copolymers, the fluid phase in-line processes for producing them and their advantageous applications and/or uses will be apparent from the detailed description that follows, particularly when read in conjunction with the figures appended hereto.

BRIEF DESCRIPTION OF THE DRAWINGS

To assist those of ordinary skill in the relevant art in making and using the subject matter hereof, reference is made to the appended drawings, wherein.

DEFINITIONS

Figure 1:
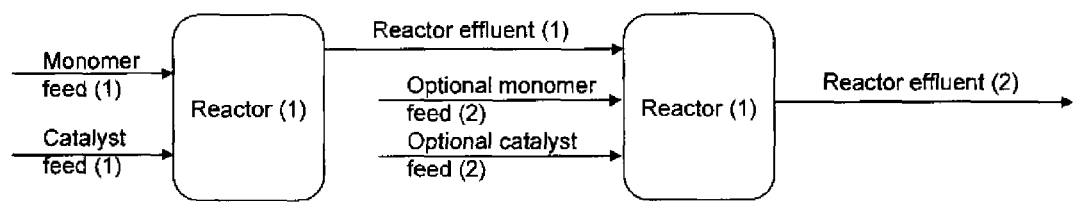
FIG. 1 presents the process for the production of polymer blends in a two-stage series reactor configuration (prior art)

For the purposes of this invention and the claims thereto:

A catalyst system is defined to be the combination of one or more catalyst precursor compounds and one or more activators. Any part of the catalyst system can be optionally supported on solid particles, in which case the support is also part of the catalyst system.

Fluids are defined as materials in their liquid or supercritical fluid state. Dense fluids are defined as fluid media in their liquid or supercritical state with densities greater than 300 $kg/m^3$.

Solid-fluid phase transition temperature is defined as the temperature at which a solid polymer phase separates from the polymer-containing dense fluid medium at a given pressure. The solid-fluid phase transition temperature can be determined by temperature reduction starting from temperatures at which the polymer is fully dissolved in the fluid reaction medium. Solid-fluid phase transition temperature can be measured by turbidity in addition to other known measurement techniques.

Solid-fluid phase transition pressure is defined as the pressure at which a solid polymer phase separates from the polymer-containing fluid medium at a given temperature. The solid-fluid phase transition pressure can be determined by pressure reduction at constant temperature starting from pressures at which the polymer is fully dissolved in the fluid reaction medium. Solid-fluid phase transition pressure can be measured by turbidity in addition to other known measurement techniques.

The cloud point is defined as the pressure below which, at a given to temperature, the polymerization system becomes turbid as described in J. Vladimir Oliveira, C. Dariva and J. C. Pinto, Ind. Eng, Chem. Res. 29 (2000) 4627. For purposes of this invention and the claims thereto, the cloud point is measured by shining a helium laser through the selected polymerization system in a cloud point cell onto a photocell and recording the pressure at the onset of rapid increase in light scattering (turbidity) for a given temperature.

A higher $\alpha$-olefin is defined as an alpha-olefin having 4 or more carbon atoms.

Use of the term "polymerization" encompasses any polymerization reaction such as homopolymerization and copolymerization. Copolymerization encompasses any polymerization reaction of two or more monomers.

The new numbering scheme for the Periodic Table Groups is used as published in CHEMICAL AND ENGINEERING NEWS, 63(5), 27 (1985).

When a polymer is referred to as comprising an olefin, the olefin present in the polymer is the polymerized form of the olefin.

An oligomer is defined to be compositions having 2-75 monomer units.

A polymer is defined to be compositions having 76 or more monomer units.

A series reactor cascade can include two or more reactors connected in series, in which the effluent of an upstream reactor is fed to the next reactor downstream in the reactor cascade. Besides the effluent of the upstream reactor(s), the feed of any reactor can be augmented with any combination of additional monomer, catalyst, scavenger, or solvent fresh or recycled feed streams. In a parallel reactor configuration, the reactor or reactors in series cascade that form a branch of the parallel reactor configuration is referred to as a reactor train.

Reactor train or reactor branch or reactor leg refers to a single polymerization reactor or to a group of polymerization reactors of the in-line is blending process disclosed herein that produces a single polymer blend component. If the reactor train contains more than one reactor, the reactors are arranged in a series configuration within the train. The need for having more than one reactor in a reactor train may, for example, arise when an in-line blend component cannot be produced at the desired rate economically in a single reactor but there could be also reasons related to blend component quality, such as molecular weight or composition distribution, etc. Since a reactor train can comprise multiple reactors and/or reactor zones in series, the single blend component produced in a reactor train may itself be a polymer blend of polymeric components with varying molecular weights and/or compositions. However, in order to simplify the description of different embodiments of the in-line blending processes disclosed herein, the polymeric product of a reactor train is referred to simply as blend component or polymeric blend component regardless of its molecular weight and/or compositional dispersion. For the purpose of defining the process of the present invention, parallel reactors will be always considered as separate reactor trains even if they produce essentially the same in-line blend component. Also, spatially separated, parallel reaction zones that do not exchange or mix reaction mixtures by, for example, pump-around loops, or by other recirculation methods, will be considered as separate parallel reactor trains even when those parallel zones are present in a common shell and fall within the in-line blending process disclosed herein.

Reactor bank refers to the combination of all polymerization reactors in the polymerization section of the in-line polymer blending process disclosed herein. A reactor bank may comprise one or more reactor trains.

A parallel reactor configuration includes two or more reactors or reactor trains connected in parallel. A reactor train, branch, or leg of the parallel configuration may include one reactor or more than one reactor configured in a series configuration. The entire parallel reactor configuration of the polymerization process disclosed herein, i.e., the combination of all parallel is polymerization reactor trains forms the reactor bank.

Monomer recycle ratio refers to the ratio of the amount of recycled monomer fed to the reactor divided by the total (fresh plus recycled) amount of monomer fed to the reactor.

Polymerization system is defined to be monomer(s) plus comonomer(s) plus polymer(s) plus optional inert solvent(s)/diluent(s) plus optional scavenger(s). Note that for the sake of convenience and clarity, the catalyst system is always addressed separately in the present discussion from other components present in a polymerization reactor. In this regard, the polymerization system is defined here narrower than customary in the art of polymerization that typically considers the catalyst system as part of the polymerization system. By the current definition, the mixture present in the polymerization reactor and in its effluent is composed of the polymerization system plus the catalyst system. Dense fluid polymerization systems have greater than 300 $kg/m^3$ fluid phase density, all of their components listed above, i.e., the monomer(s) plus comonomer(s) plus polymer(s) plus optional inert solvent(s)/diluent(s) plus optional scavenger(s), are in fluid state, or stating differently, none of their components is in solid state. Note that these qualifications may be different for the catalyst system since it is not part of the polymerization system.

The polymerization system can form one single fluid phase or two fluid phases.

A homogeneous polymerization system contains all of its components dispersed and mixed on a molecular scale. In our discussions, homogeneous polymerization systems are meant to be in their dense fluid (liquid or supercritical) state. Note that our definition of the polymerization system does not include the catalyst system, thus the catalyst system may or may not be homogeneously dissolved in the polymerization system. A homogeneous system may have regions with concentration gradients, but there would be no sudden, discontinuous changes of composition on a micrometer scale within the system. In practical terms, a homogeneous polymerization system has all of its components in a single dense fluid phase. Apparently, a polymerization system is not homogeneous when it is partitioned to more than one fluid phase or to a fluid and a solid phase. The homogeneous fluid state of the polymerization system is represented by the single fluid region in its phase diagram.

A homogeneous polymerization process operates with a homogeneous polymerization system. Note that the catalyst system is not part of the polymerization system, thus it is not necessarily dissolved homogeneously in the polymerization system. A reactor in which a homogeneous polymerization process is carried out will be referred to as homogeneous polymerization reactor.

Pure substances, including all types of hydrocarbons, can exist in either a subcritical, or supercritical state, depending on their temperature and pressure. Substances in their supercritical state possess interesting physical and thermodynamic properties, which are exploited in this disclosure. In particular, as supercritical fluids undergo large changes in pressure, their density and solvency for polymers changes over a wide range. To be in the supercritical state, a substance must have a temperature above its critical temperature (Tc) and a pressure above its critical pressure (Pc). Mixtures of hydrocarbons, including mixtures of monomers, polymers, and optional solvents, have pseudo-critical temperatures (Tc) and pseudo-critical pressures (Pc), which for many systems can be approximated by mole-fraction-weighted averages of the corresponding critical properties (Tc or Pc) of the mixture's components. Mixtures with a temperature above their pseudo-critical temperature and a pressure above their pseudo-critical pressure will be said to be in a supercritical state or phase, and the thermodynamic behavior of supercritical mixtures will be analogous to supercritical pure substances. For purposes of this disclosure, the critical temperatures (Tc) and critical pressures (Pc) of certain pure substances relevant to the current invention are those that found in the HANDBOOK OF CHEMISTRY AND PHYSICS, David R. Lide, Editor-in-Chief, 82nd edition 2001-2002, CRC Press, LLC. New York, 2001. In particular, the Tc and Pc of various molecules are:

| Name | Tc (K) | Pc (MPa) | Name | Tc (K) | Pc (MPa) |
|---|---|---|---|---|---|
| Hexane | 507.6 | 3.025 | Propane | 369.8 | 4.248 |
| Isobutane | 407.8 | 3.64 | Toluene | 591.8 | 4.11 |
| Ethane | 305.3 | 4.872 | Methane | 190.56 | 4.599 |
| Cyclobutane | 460.0 | 4.98 | Butane | 425.12 | 3.796 |
| Cyclopentane | 511.7 | 4.51 | Ethylene | 282.34 | 5.041 |
| 1-Butene | 419.5 | 4.02 | Propylene | 364.9 | 4.6 |
| 1-pentene | 464.8 | 3.56 | Cyclopentene | 506.5 | 4.8 |
| Pentane | 469.7 | 3.37 | Isopentane | 460.4 | 3.38 |
| Benzene | 562.05 | 4.895 | Cyclohexane | 553.8 | 4.08 |
| 1-hexene | 504.0 | 3.21 | Heptane | 540.2 | 2.74 |

273.2 K = 0° C.

The following abbreviations are used: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, TIBA is tri-isobutylaluminum, MAO is methylaluminoxane, pMe is para-methyl, flu is fluorenyl, cp is cyclopentadienyl.

By "continuous" is meant a system that operates (or is intended to operate) without interruption or cessation. For example a continuous process to produce a polymer would be one where the reactants are continually introduced into one or more reactors and polymer product is continually withdrawn.

The term "solvent", or "high-boiling diluent" refers to a hydrocarbon having a boiling point of 30° C. or more or 50° C. or more, or 70° C. or more, or 100° C. or more, or 120° C. or more, or 150° C. or more than the boiling point of is propylene (−47.6° C. at 760 torr). High boiling diluents are also referred to as solvents herein. In olefin polymerization, solvents are typically hydrocarbons comprising five or more carbon atoms.

Slurry polymerization refers to a polymerization process in which particulate, solid polymer (e.g., granular) forms in a dense fluid or in a liquid/vapor polymerization medium. The dense fluid polymerization medium can form a single or two fluid phases, such as liquid, supercritical fluid, or liquid/liquid, or supercritical fluid/supercritical fluid, polymerization medium. In a liquid/vapor polymerization medium, the polymer resides in the liquid (dense) phase. Slurry polymerization processes typically employ heterogeneous catalyst particles, such as Ziegler-Natta catalysts or supported metallocene catalysts, and the like. The solid polymeric product typically adheres to the heterogeneous solid catalyst particles thus forming a slurry phase. Slurry polymerization processes operate below the solid-fluid phase transition temperature of the polymerization system.

Solution polymerization refers to a polymerization process in which the polymer is dissolved in a liquid polymerization system comprising substantial amounts (typically 40 wt % or more, or 50 wt % or more, or 60 wt % or more) of solvent. Note that solution polymerization comprises a liquid polymerization system. Solution polymerization may be performed at conditions where a vapor and a liquid phase are present, in which case the polymerization system comprises the liquid phase.

Advantageously, solution polymerization is performed with liquid-filled reactors, in the substantial absence of a vapor phase. Liquid-filled reactor operations are characterized by reactor pressures that are at or advantageously above the bubble point of the polymerization system. Bubble point is defined as the pressure at which a liquid starts forming vapor bubbles at a given temperature. Bubble point pressures of hydrocarbon blends can be readily determined by standard techniques known in the art of chemical engineering. Methods suitable for conducting such calculations are equation of state methods, such as Peng Robinson or Suave Redlich Kwong. The bubble point of a liquid can be conveniently determined by reducing the pressure at constant temperature of a compressed fluid until the first vapor bubble is formed. Solution polymerization is typically performed in a single homogeneous liquid phase, but solution polymerization comprising two liquid phases are also known. In the latter case, the polymerization system is below of its cloud point pressure but above of its solid-fluid phase transition pressure and temperature. In these two-phase liquid polymerizations systems, the polymerization system is typically partitioned into two liquid phases, a polymer-lean and a polymer-rich liquid phase. In a well-stirred polymerization reactor, these two phases are finely dispersed. Note, however, that these two-phase liquid polymerizations systems have none of their components in solid state.

Supercritical polymerization refers to a polymerization process in Which the polymerization system is in its dense supercritical or pseudo supercritical state, i.e. when the density of the polymerization system is above 300 g/L and its temperature and pressure are above the corresponding critical or pseudo critical values. Supercritical polymerization is typically performed in a single homogeneous supercritical phase, but supercritical polymerization comprising two supercritical fluid phases is also contemplated. In the latter case, the polymerization system is below of its cloud point pressure but above of its solid-fluid phase transition pressure and temperature. In these two-phase supercritical fluid polymerizations systems, the polymerization system is typically partitioned into two fluid phases, a polymer-lean and a polymer-rich fluid phase. In a well-stirred polymerization reactor, these two phases are finely dispersed. Note, however, that these two-phase supercritical fluid polymerizations systems have none of their components in solid state.

Bulk polymerization refers to a polymerization process in which the dense fluid polymerization system contains less than 40 wt %, or less than 30 wt %, or less than 20 wt %, or less than 10 wt %, or less than 5 wt %, or less than 1 wt % of inert solvent or diluent. The product polymer may be dissolved in the dense fluid polymerization system or may form a solid phase. In this terminology, slurry polymerization, in which solid polymer particulates form in a dense fluid polymerization system containing less than 40 wt % of inert solvent or diluent, will be referred to as a bulk slurry polymerization process or bulk heterogeneous polymerization process. The polymerization process in which the polymeric product is dissolved in a single-phase dense fluid polymerization system containing less than 40 wt % of inert solvent or diluent will be referred to as bulk homogeneous polymerization process. The polymerization process in which the polymeric product is dissolved in a liquid polymerization system containing less than 40 wt %, or less than 30 wt %, or less than 20 wt %, or less than 10 wt %, or less than 5 wt %, or less than 1 wt % of inert solvent or diluent will be referred to as hulk solution polymerization process (as distinguished from other solution polymerization processes in which the polymeric product is dissolved in a liquid polymerization system containing greater than or equal to 40 wt % solvent, which is also referred to herein as the prior art solution process). The polymerization process in which the polymeric product is dissolved in a single-phase supercritical polymerization system containing less than 40 wt %, or less than 30 wt %, or less than 20 wt %, or less than 10 wt %, or less than 5 wt %, or less than 1 wt % of inert solvent or diluent will be referred to as bulk homogeneous supercritical polymerization process.

Homogeneous supercritical polymerization refers to a polymerization process in which the polymer is dissolved in a single-phase dense supercritical fluid polymerization medium, such as an inert solvent or monomer or their blends in their supercritical state. As described above, when the supercritical fluid polymerization system contains less than 40 wt %, or less than 30 wt %, or less than 20 wt %, or less than 10 wt %, or less than 5 wt %, or less than 1 wt % of inert solvent and the polymer is dissolved in the dense supercritical fluid, the process is referred to as a bulk homogeneous supercritical polymerization process. Homogeneous supercritical polymerization should be distinguished from heterogeneous supercritical polymerizations, such as for example, supercritical slurry processes, the latter of which is performed in supercritical fluids but form solid polymer particulates in the polymerization reactor. Similarly, bulk homogeneous supercritical polymerization should be distinguished from bulk solution polymerization, the latter of which is performed in a liquid as opposed to in a supercritical polymerization system.

Note that by our definitions, the catalyst system should not be considered in determining whether a polymerization process is homogeneous or not.

Fouling refers to accumulation and deposition of solid polymer in the interior reactor volume and/or in its interconnected parts such as feed ports, stirrer (for stirred reactors), etc. For crystalline polymers, the polymer tends to accumulate and deposit on the reactor interior by crystallization on surfaces that are at or below the crystallization temperature of the polymer. Reactor fouling creates considerable operational costs, including reduced production rates and increased downtime for cleaning.

Reaction zone refers to the interior of a polymerization reactor where both the catalyst system and the polymerization system are present and mixed intentionally. The reaction zone is defined as the reactor interior filled with the mixed polymerization and catalyst systems between the feed ports and the effluent ports. By "where both the catalyst system and the polymerization system are present and mixed intentionally" we mean the space where the polymerization to reaction is designed to take place and the polymer is designed to be present as opposed to spaces where no reaction is intended to happen and no polymer is intended to be present, such as the interior of the catalyst and monomer feed ports, stirrer assembly, etc. Although the later spaces are directly coupled to the reaction zone, no polymer is intended to enter and no polymer is intended to be polymerized in those spaces.

An ethylene propylene random copolymer (also referred to herein as EP copolymer, EP random copolymer and EP polyolefin elastomer is defined as propylene-based polymer with random insertions of ethylene along the propylene based polymer backbone. This is to be distinguished from ethylene propylene block copolymers which have groups or blocks of ethylene inserted along the propylene-based polymer backbone.

An isotactic polypropylene homopolymer blend component (also referred to herein as iPP and isotactic polypropylene) is defined as propylene-based polymer with all methyl groups from the propylene monomer units located on the same side of the polymer. Isotactic polypropylene is semicrystalline and forms a helix configuration.

An in-line blending process disclosed herein refers to one where the polymerization and the polymer blending processes are integrated in a single process and at least one of the polymerization trains operates under solution or homogeneous supercritical conditions. Although in-line blending processes typically employ polymerization trains using solution or homogeneous supercritical polymerization systems, one or more of the polymerization trains may employ slurry polymerization systems, particularly hulk slurry polymerization systems. When the polymerization reactor bank includes one or more slurry polymerization trains, the effluents of those slurry trains are always heated to dissolve the polymer and are optionally pressurized before mixing them with the effluents of other trains to enable fluid-phase mixing.

The isotactic polypropylene and EP copolymer blend disclosed herein refers to a mixture of isotactic polypropylene and EP copolymer components. The components are produced internally in the in-line blending process and are mixed in the same process without recovering them in their solid state. Optionally, the in-line blends may also contain additives produced outside the invention process, such as plasticizers, UV stabilizers, antioxidants, etc., and off-line polymeric additives/modifiers in minor amounts, i.e., less than 50%, or less than 40%, or less than 30%, or less than 20%, or less than 10%, or less than 5%, or less than 1% by weight.

DETAILED DESCRIPTION

Disclosed herein are novel blends of isotactic polypropylene and ethylene-propylene copolymer and in-line processes for blending such polymers.

In some embodiments, the polymerization reactor trains operate in a dense fluid state (i.e., in homogeneous liquid phase or homogeneous supercritical phase). In some other embodiments, at least one of the reactor trains configured parallel operates above the critical temperature and critical pressure of the polymerization system and the polymerization system is homogeneous. In one or more embodiments, the polymerization is carried out in a bulk homogeneous polymerization system (i.e., in bulk homogeneous liquid phase or bulk homogeneous supercritical phase).

As disclosed in U.S. Patent Application No. 60/876,193 filed on Dec. 20, 2006, herein incorporated by reference in its entirety, an improved in-line process for blending polymers has been developed to improve blend quality and reduce the capital and operating costs associated with a combined polymerization and blending plant. The present disclosure expands the scope of U.S. Patent Application No. 60/876,193 to an in-line blending process with two or to more parallel reactor trains for producing novel blends of isotactic polypropylene and ethylene-propylene copolymers.

U.S. Patent Application No. 60/905,247, filed on Mar. 6, 2007, incorporated herein in its entirety by reference, discloses novel recycle methods is for the unconverted monomers that emerge from the parallel reactor trains of the in-line fluid phase polymer blending processes disclosed herein. In particular, the novel recycle methods are applicable wherein each monomer component fed to a first group of one or more reactor trains of the said in-line blending processes is also present in the feed of a second group of one or more trains of the said in-line blending processes. The processes disclosed in U.S. Patent Application No. 60/905,247, filed on Mar. 6, 2007 afford a simpler and lower-cost monomer recycling by eliminating the need for the recovery of the individual recycle components.

U.S. Patent Application No. 60/993,647, filed on Sep. 13, 2007, incorporated herein in its entirety by reference, discloses a novel process for fluid phase in-line blending of plasticized polymers, wherein one or more of the plasticizers are produced in a reactor train in parallel with the reactor train used to produce the one or more polymers.

U.S. Patent Application No. 60/993,646, filed on Sep. 13, 2007, incorporated herein in its entirety by reference, discloses a novel process for in-line blending of off-line produced plasticizers and in-line produced polymers, wherein the one or more plasticizers are fed to the process after the polymer reactor train and while the base polymer still has a substantial quantity of light components to form a plasticized polymer blend.

The blends of iPP and EP copolymer disclosed herein may include a novel iPP in terms of structure and properties in combination with a conventional EP copolymer or a novel EP in terms of structure and properties. The blends of iPP and EP copolymer disclosed herein may also include a conventional iPP and a novel EP copolymer in terms of structure and properties. Hence a total of three novel blend combinations based upon conventional and differentiated iPP and EP copolymers are disclosed. The blends of conventional iPP and conventional EP represent the prior art.

In one form (conventional iPP/novel EP copolymer), the novel blend of isotactic polypropylene and ethylene-propylene copolymer comprising: between 1 and 50 wt % of isotactic polypropylene with a melt flow rate of between 0.5 and 20,000 g/10 min, and between 50 and 99 wt % of ethylene-propylene copolymer including between 10 wt % and 20 wt % randomly distributed ethylene with a melt flow rate of between 0.5 and 20,000 g/10 min, wherein the copolymer is polymerized by a bulk homogeneous polymerization process, and wherein the total regio defects in the continuous propylene segments of the copolymer is between 40 and 150% greater than a copolymer of equivalent melt flow rate and wt % ethylene polymerized by a solution polymerization process.

In another form (novel iPP/conventional EP copolymer), the novel blend of isotactic polypropylene and ethylene-propylene copolymer comprising: between 1 and 50 wt % of isotactic polypropylene with more than 15 and less than 100 regio defects (sum of 2,1-erithro, 2,1-threo insertions, and 3,1-isomerizations) per 10,000 propylene units in the polymer chain, an mmmmm pentad fraction of 0.85 or more, a weight average molecular weight (Mw) of at least 35 kg/mol, a melting peak temperature of 149° C. or higher, a heat of fusion ($\Delta Hf$) of at least 80 J/g, and wherein the difference between the DSC peak melting and the peak crystallization temperatures (Tmp−Tcp) is less than or equal to 0.907 times the melting peak temperature minus 99.64 (Tmp−Tcp≤0.907 Tmp−99.64)° C., and between 50 and 99 wt % of ethylene-propylene copolymer including between 10 wt % and 20 wt % randomly distributed ethylene with a melt flow rate of between 0.5 and 20,000 g/10 min.

In yet another form (differentiated iPP/differentiated EP copolymer), the novel blend of polypropylene and ethylene-propylene copolymer comprising: between 1 and 50 wt % of isotactic polypropylene with more than 15 and less than 100 regio detects (sum of 2,1-erithro, 2,1-threo insertions, and 3,1-isomerizations) per 10,000 propylene units in the polymer chain, an mmmmm pentad fraction of (185 or more, a weight average molecular weight (Mw) of at least 35 kg/mol, melting peak temperature of 149° C. or higher, a heat of fusion ($\Delta Hf$) of at least 80 J/g, and wherein the difference between the DSC peak melting and the peak crystallization temperatures (Tmp−Tcp) is less than or equal to 0.907 times the melting peak temperature minus 99.64 (Tmp−Tcp≤0.907 Tmp−99.64)° C., and between 50 and 99 wt % of ethylene-propylene copolymer including between 10 wt % and 20 wt % randomly distributed ethylene with a melt flow rate of between 0.5 and 20,000 g/10 min, wherein the copolymer is polymerized by a bulk homogeneous polymerization process, and wherein the total regio defects in the continuous propylene segments of the copolymer is between 40 and 150% greater than a copolymer of equivalent melt flow rate and wt % ethylene polymerized by a solution polymerization process.

In one form of the novel in-line process to produce such blends, the process includes providing two or more reactor trains configured in parallel and a high-pressure separator downstream fluidly connected to the two or more reactor trains configured in parallel, wherein one or more of the reactor trains produces polypropylene and one or more of the reactor trains produces ethylene-propylene copolymer. In one or more of the reactor trains configured in parallel 1) propylene, 2) one or more catalyst systems, and 3) optional one or more diluents or solvents, are contacted wherein the polymerization system for at least one of the reactor trains configured in parallel is at a temperature above the solid-fluid phase transition temperature, at a pressure no lower than 10 MPa below the cloud point pressure and less than 1500 MPa. In the other one or more reactor trains configured in parallel 1) propylene, 2) ethylene, 3) optional one or more comonomers comprising four or more carbon atoms, 4) one or more catalyst systems, and 5) optional one or more diluents or solvents, are contacted wherein at least one of the reactor trains is at a temperature of between 65° C. and 180° C. and at a pressure no lower than 10 MPa below the cloud point pressure of the polymerization system and less than 1500 MPa. The polymerization system for each reactor train is in its dense fluid state and comprises propylene, any ethylene present, any comonomer comprising four or more carbon atoms present, any diluent or solvent present, and the polymer product. The catalyst system for each reactor train comprises one or more catalyst precursors, one or more activators, and optionally, one or more catalyst supports. In each parallel reactor train is formed a reactor effluent including a homogeneous fluid phase polymer-monomer mixture. The reactor effluents comprising the homogeneous fluid phase polymer-monomer mixture from each parallel reactor train are combined to form a combined reactor effluent. The combined reactor effluent is then passed through the high-pressure separator for product blending and product-feed separation. In the high pressure separator, temperature and pressure are maintained above the solid-fluid phase transition point but below the cloud point pressure and temperature to form a fluid-fluid two-phase system comprising a polymer-rich phase and a monomer-rich phase. The monomer-rich phase is separated from the polymer-rich phase to form a polymer-enriched stream comprising a blend of polypropylene and ethylene-propylene copolymer and a separated monomer-rich stream for further processing to further remove any solvent/diluent and/or monomer to yield a polypropylene-(ethylene-propylene copolymer) product blend.

In another form of the novel in-line process to produce such blends, the process includes providing two or more reactor trains configured in parallel and two or more high-pressure separators fluidly connected to the two or more reactor trains configured in parallel, wherein one or more of the reactor trains produces polypropylene and one or more of the reactor trains produces ethylene-propylene copolymer. In one or more of the reactor trains configured in parallel 1) propylene, 2) one or more catalyst systems, and 3) optional one or more diluents or solvents, are contacted wherein the polymerization system for at least one of the reactor trains configured in parallel is at a temperature above the solid-fluid phase transition temperature, at a pressure no lower than 10 MPa below the cloud point pressure and less than 1500 MPa. In the other one or more reactor trains configured in parallel 1) propylene, 2) ethylene, 3) optional one or more comonomers comprising four or more carbon atoms, 4) one or more catalyst systems, and 4) optional one or more solvents, are contacted wherein at least one of the reactor trains is at a temperature of between 65° C. and 180° C. and at a pressure no lower than 10 MPa below the cloud point pressure of the polymerization system and less than 1500 MPa. The polymerization system for each reactor train is in its dense fluid state and comprises propylene, any ethylene present, any comonomer comprising four or more carbon atoms present, any diluent or solvent present, and the polymer product. The catalyst system for each reactor train comprises one or more catalyst precursors, one or more activators, and optionally, one or more catalyst supports. An unreduced reactor effluent including a homogenous fluid phase polymer-monomer mixture is formed in each parallel reactor train and is passed from one or more but not from all of the parallel reactor trains through one or more high-pressure separators. The temperature and pressure within the one or more high-pressure separators are maintained above the solid-fluid phase transition point but below the cloud point pressure and temperature to form one or more fluid-fluid two-phase systems with each two-phase system comprising a polymer-enriched phase and a monomer-rich phase. The monomer-rich phase is separated from the polymer-enriched phase in each of the one or more high-pressure separators to form one or more separated monomer-rich phases and one or more polymer-enriched phases. The one or more polymer-enriched phases from the one or more high-pressure separators are combined with the one or more unreduced reactor effluents from one or more parallel reactor trains to form a mixture of one or more polymer-enriched phases and the one or more unreduced reactor effluents from the one or more parallel reactor trains to form a combined effluent stream that comprises the polymeric blend components from all parallel reactor trains. The combined effluent stream is then passed into another high-pressure separator for product blending and product-feed separation where the temperature and pressure are maintained above the solid-fluid phase transition point but below the cloud point pressure and temperature to form a fluid-fluid two-phase system comprising a polymer-rich blend phase and a monomer-rich phase. The monomer-rich phase is separated from the polymer-rich blend phase to form a polymer-enriched stream comprising a blend of polypropylene and ethylene-propylene copolymer and a separated monomer-rich stream. The polymer-enriched stream is then further processed to further remove any solvent/diluent and/or monomer to yield a polypropylene-(ethylene-propylene copolymer) product blend.

In some embodiments, the polymerization is carried out in a dense homogeneous supercritical polymerization system, advantageously, in a dense bulk homogeneous supercritical polymerization system.

For producing the novel iPP in-line blend components, homogeneous propylene polymerization processes operating in a dense fluid state with elevated monomer concentrations (more than 2.5, or more than 3.0, or more than 3.5, or more than 4.0, or more than 5.0, or more than 10.0 mol/L in the reactor effluent) and reduced solvent concentrations (70 wt % or less, or 65 wt % or less, or 60 wt % or less, or 50 wt % or less, or 40 wt % or less in the reactor effluent) at temperatures above 90° C., or above 95° C., or above 100° C., or above 105° C., or above 110° C. and above 11 MPa, or above 13.8 MPa, or above 34.5 MPa using 2,4-substituted bridged bisindenyl metallocene catalysts activated with non-coordinating anion activators are particularly advantageous due to the combination of good reactor stability and the ability to deliver highly crystalline high MW isotactic polypropylenes.

The novel copolymer in-line blend components can be advantageously produced in a solution or in a homogeneous supercritical polymerization process. Increased monomer concentrations are sometimes advantageous because they afford higher MW/lower MFR products, or alternatively afford the same MW at higher operating temperatures, and reduce the inert loads in the recycle loop thus can reduce the recycle and cooling costs. When high polymer molecular weight is desired, the use of bulk homogeneous polymerization processes, such as hulk solution or bulk supercritical polymerization is particularly advantageous.

The above-disclosed in-line blending processes also comprehend the option for recycling the separated monomer-rich stream from the separator(s) to the one or more of the reactor trains producing ethylene-propylene copolymer, and thus eliminating the need for separating mixed monomer and optional solvent streams before recycling them to the appropriate reactor trains for polymer.

In essence, the in-line blending processes disclosed herein comprise a polymerization section and at least one monomer-polymer separator vessel, called the separator-blending vessel, or separator blender, or high-pressure separator. The separator-blending-vessel serves as both a separator and a blender for the polymer-containing reactor effluents of the two or more parallel reactor trains in the reactor bank in which the two reactor trains employ a dense homogeneous fluid polymerization system (i.e., defined as a homogeneous supercritical or a solution polymerization process). It is also beneficial to the proper operation of the in-line blending processes disclosed herein to bring the polymerization system in each reactor train effluent into a homogeneous state upstream of the separator-blending vessel. Therefore, when one or more in-line blending components is/are produced in a particle-forming polymerization process, such as, for example bulk propylene slurry polymerization with Ziegler-Natta or supported metallocene catalysts, the so-produced solid polymer pellets need to be homogeneously dissolved in the reactor effluent before entering the separator-blending vessel. This can be accomplished by, for example, pumping the reactor effluent slurry into a higher-temperature/higher-pressure dissolution zone that brings the reactor effluent above the solid-fluid phase transition temperature creating a stream in which the reaction product is homogeneously dissolved.

The methods of fluid phase in-line polymer blending of iPP and EP copolymer disclosed herein offer significant advantages relative to prior art methods of blending these polymers. One or more of the advantages of the disclosed method of in-line iPP and EP copolymer blending include, but are not limited to, improved polymer blend homogeneity because of molecular-level mixing of blend components, improved cost of manufacture because of savings from avoidance of the reprocessing cost associated with conventional off-line blending processes that start with the separately produced solid, pelletized polymer blend components, and because of the ease and simplicity of blending polymers at substantially reduced viscosities due to the presence of substantial amounts of monomers and optionally solvents in the blending step; flexibility of adjusting blend ratios and therefore blend properties in-line; flexibility in adjusting production rates of the blend components; flexibility in independently controlling for each reactor the residence time, monomer composition and conversion, catalyst choice, catalyst concentration, temperature and pressure; improved blend quality; flexibility in making a broader slate of iPP and EP copolymer blended products in the same plant; reduced process cost by utilizing the monomer-polymer separator(s) for product blending and, in some embodiments, for product buffering to allow better control of blend ratio.

The novel iPP and EP copolymer blends disclosed herein also yield advantageous properties including novel defect structures and higher peak crystallization temperatures for a given peak melting point, which allows for faster crystallization upon cooling during high speed polymer processing, such as to the production. The novel iPP-EP copolymer blends are also beneficial in applications requiring a combination of softness and flexibility, for example, non-woven fabrics.

Conventional EP Copolymer Blend Component

The EP copolymer blend components may be conventional in composition and properties, and made by supercritical, slurry or solution type process. For a description of conventional EP copolymers and conventional iPP-EP blends, refer to U.S. Pat. No. 6,642,316 and to S. Datta et al., Rubber World 229 (2003) 55, which are included herein by reference in their entirety. These conventional EP copolymer components may be in-line blended with differentiated or novel isotactic polypropylene blend components using the in-line blending processes disclosed herein to form novel iPP-EP copolymer blends.

For a description of catalyst systems used to produce conventional EP copolymers reference should be made to the following PCT patent publications, all of which are included herein by reference: WO 03/040095, WO 03/040201, WO 03/040202, WO 03/040233, WO 03/040442, and WO 04/041928. In addition, a description of conventional random propylene polymers may be found in WO 03/040095, WO 03/040201, WO 03/040202, WO 03/040233; WO 03/040442, and WO 04/041928, all of which are included herein by reference. Moreover, additional catalyst systems that may be useful herein to produce polymers useful as random propylene polymers and polymers useful as random propylene polymers include those described in *Macromolecules*, 2002, 35, 5742-5743, U.S. Pat. No. 6,878,790, WO 02/055566 and WO 02/0246247, which are also included herein by reference. An advantageous EP random copolymer used in the present invention is described in detail as the "Second Polymer Component (SPC)" in co-pending U.S. applications U.S. Ser. No. 60/133,966, filed May 13, 1999, and U.S. Ser. No. 60/342,854, filed Jun. 29, 1999, and described in further detail as the "Propylene Olefin Copolymer" in U.S. Ser. No. 90/346,460, filed Jul. 1, 1999, which are fully incorporated by reference herein. Random copolymers of propylene are available commercially under the trade name Vistamaxx™ 6100, (ExxonMobil, Baytown Tex.). Suitable examples include: Vistamaxx™ 6100, Vistamaxx™ 6200 and Vistamax™ M 3000.

Novel/Differentiated EP Copolymer Blend Component

Described below is the composition, process for making, and properties of novel and differentiated EP copolymer blend components for use in the in-line produced iPP and EP copolymer blends disclosed herein.

In one form of the present disclosure, provided is an advantageous continuous process to produce a novel or differentiated ethylene-propylene random copolymer blend component that includes (a) providing one or more parallel reactor trains for producing EP copolymer; (b) contacting in the reactors of the EP reactor train(s) 1) propylene monomer 2) one or more catalyst systems, 3) ethylene comonomer, and 4) optional one or more solvents, wherein the reactor train is at a temperature of between 65° C. and 180° C. and at a pressure no lower than 10 MPa below the cloud point pressure of the polymerization system and less than 1500 MPa, wherein the polymerization system for the EP reactor train(s) is/are in its dense fluid state and comprises the propylene monomer, the ethylene comonomer, any solvent present, and the polymer product, wherein the polymerization system comprises less than 40 wt % of the optional solvent, and (c) forming a polymer reactor effluent including a homogeneous, fluid phase polymer-monomer mixture in the reactor train; and wherein the resultant copolymer product comprises between 10 wt % and 20 wt % randomly distributed ethylene. The one or more catalyst systems for the reactor train comprise one or more catalyst precursors, one or more activators, and optionally, one or more catalyst supports. The one or more catalyst systems are chosen from Ziegler-Natta catalysts, metallocene catalysts, nonmetallocene metal-centered, heteroaryl ligand catalysts, late transition metal catalysts, and combinations thereof.

The one reactor or the two or more serially configured reactors also referred to herein as a reactor train) in which the bulk homogenous polymerization process occurs to produce the EP copolymer blend component may be chosen from tank type, loop type, tubular type and combinations thereof. When utilizing two or more serially configured reactors, a tubular reactor followed by a continuous stirred tank reactor or a tubular reactor followed by a loop reactor may be advantageous. In one form of the disclosed bulk polymerization processes for producing EP random copolymer blend components disclosed herein, the reactor train operates above the critical or pseudo-critical temperature and critical or pseudo-critical pressure of the polymerization system.

In another form, the disclosed polymerization process for producing EP random copolymer blend components operate at high monomer concentrations. Non-limiting exemplary monomer concentrations are greater than 2.0 mol/L, advantageously greater than 2.5 mol/L, or greater than 3.0 mol/L, or greater than 5 mol/L in the polymerization reactor, or in its effluent. Some forms operate with substantially neat monomer feeds, i.e. a bulk homogeneous polymerization system. Such bulk monomer feeds may yield higher monomer concentrations in the reactor. Non-limiting exemplary monomer concentrations in the reactor are less than or equal to 10 mol/L, or less than or equal to 12 mol/L, or less than or equal to 13 mol/L, or less than or equal to 14 mol/L, or less than or equal to 15 mol/L, or less than or equal to 16 mol/L, or less than or equal to 18 mol/L. Further details of bulk homogeneous polymerization systems are disclosed in Patent Application Nos. 60/876,193 and No. 60/905,247, herein incorporated by reference in their entirety.

Non-limiting exemplary process pressures utilized for making EP random copolymer blend components using the bulk homogeneous polymerization process disclosed herein are from 2 to 40 kpsi (138-2759 bar), or 2 to 15 kpsi (138-1034 bar), or 2 to 20 kpsi (138-1379 bar), or 3 to 15 kpsi (207-1034 bar), or 5 to 15 kpsi (345-1034 bar). Non-limiting exemplary lower pressure its for making the EP random copolymer blend components disclosed herein are 2, or 3, or 4, or 5, or 7, or 10 kpsi (138, 207, 276, 345, 483, or 690 bar, respectively). Non-limiting exemplary upper pressure limits for making EP random copolymer blend component are 5, or 7, or 10, or 15, or 20, or 30, or 40 kpsi (345, 483, 690, 1379, 2069, or 2759 bar, respectively).

Non-limiting exemplary process temperature ranges for making the EP random copolymer blend components disclosed herein are 65 to 180° C., or 65 to 140° C., or 70 to 180° C., or 75 to 150° C., or 80 to 150° C., or 80 to 140° C., or 90 to 135° C., or 100 to 130° C., or 110 to 125° C. Non-limiting exemplary lower temperature limits for making the EP random copolymer blend components disclosed herein are 65, or 70, or 75, or 80, or 85, or 90, or 100, or 110° C. Non-limiting exemplary upper temperature limits for making the EP random copolymers disclosed herein are 180, or 160, or 150, or 140, or 135, or 130, or 125° C. Noteworthy is that the process temperature ranges of the bulk homogenous polymerization process for making EP random copolymer blend components disclosed herein are significantly higher than the temperature ranges of the prior art solution processes, which typically do not exceed 90° C.

Non-limiting exemplary compositions on an ethylene/(ethylene propylene) basis (i.e., pure monomer basis) in the feed to the reactor making the EP random copolymer blend components disclosed herein range from 2 to 15 wt %, or 2 to 12 wt %, or 3 to 12 wt %, depending on the ethylene concentration of the desired iPP-EP copolymer product. Non-limiting exemplary compositions on an ethylene/(ethylene+propylene) basis, i.e., pure monomer basis in the effluent of the reactor making the EP random copolymer blend components disclosed herein may range from 0.5 to 10 wt %, or 1 to 10 wt %, or 1 to 8 wt %, or 2 to 8 wt %, depending on the ethylene concentration of the desired iPP-EP copolymer blend product. Non-limiting exemplary propylene conversions in a single pass through the reactor making the EP random copolymer blend components disclosed herein may range from 5 to 35%, or 5 to 30%, or 5 to 25%, or 7 to 25%, or 10 to 25%.

The ethylene conversion for a given feed composition and propylene conversion is governed by the ethylene/propylene reactivity ratio, defined as the ethylene/propylene molar ratio in the product divided by the ethylene/propylene molar ratio in the reactor. The ethylene/propylene reactivity ratio for the bulk homogeneous polymerization processes for producing EP random copolymer blend components disclosed herein may range from 1.3 to 6, or 1.5 to 5, or 2 to 5, and may be determined by analyzing the monomer composition of the polymerization system and the product. The former can be accomplished by analyzing the reactor content or the reactor feed and effluent by standard gas chromatographic methods. The latter can be performed by using $^{13}C$ nuclear magnetic resonance $^{13}C$ NMR) or infrared (IR) spectroscopy, as described later in the examples.

the bulk homogeneous polymerization processes for producing EP random copolymer blend components disclosed herein produce one or more advantages relative to the prior art solution processes. For example, prior art solution processes typically utilize 60 wt % or more, or 70 wt % or more, or 80 wt % or more inert solvent to keep the product polymer in a homogeneous dissolved state, to absorb reaction heat, and to keep viscosity low. However, such high inert solvent concentrations utilized in solution processes lower the monomer concentration in the reactor to less than 2.0 mol/L, or less than 1.5 mol/L, or less than 1.0 mol/L, or even less than 0.5 mol/L in the reactor and/or in its effluent. The lower monomer concentration in turn necessitates lowering the reactor temperature to deliver the desired product molecular weight required to achieve the desired melt flow rate related to melt viscosity. As mentioned before, maintaining lower reactor temperatures requires higher refrigeration capacity, which increases both the capital investment and the operation cost. In contrast, the disclosed bulk homogeneous polymerization processes for producing EP random copolymer blend components operate with high monomer concentrations (combined propylene monomer and ethylene comonomer), for example, greater than 2.0 mol/L, advantageously greater than 2.5 mol/L, or 3.0 mol/L, or 5.0 mol/L, or 8.0 or 10.0 mol/L in the polymerization reactor, and/or in its effluent. The combined propylene monomer and ethylene comonomer present in the combined feed to the reactor may be 40, or 50, or 60, or 75 wt % or more. These higher monomer concentrations in the polymerization reactor enables the production of EP random copolymer blend component at increased reactor temperatures allowing the reduction of capital investment and operation cost for the process.

The bulk homogeneous polymerization processes for producing EP random copolymer blend components disclosed herein operate with a bulk homogeneous polymerization system, such as bulk solution polymerization and bulk homogeneous supercritical polymerization. These processes substantially utilize the monomer as a solvent in order to keep the polymer in a homogeneous dissolved state, to reduce viscosity, and to absorb the heat of reaction. For the bulk homogeneous polymerization processes for producing EP random copolymer blend components disclosed herein, the reactor system may have monomer concentrations (propylene and ethylene) of less than or equal to 12 mol/L, or less than or equal to 13 mol/L, or less than or equal to 14 mol/L, or less than or equal to 15 mol/L, or less than or equal to 16 mol/L, or less than or equal to 18 mol/L. Small quantities of inert solvents/diluents may also be optionally present, but are advantageously a minority component in the reactor feed, and thus in the reactor. Hence, the total combined concentration of inert solvents for the bulk homogeneous polymerization processes for producing EP random copolymer blend components disclosed herein is typically is less than 60%, or less than 50%, or less than 40%, or less than 30%, or less than 25%, or less than 20%, or less than 15%, or less than 10% on a weight basis.

Some inert solvent components having more than three carbon atoms to may be added intentionally to the disclosed processes to function as solvent aids in small concentrations, but advantageously the disclosed processes use no such inert solvent in order to function as a solvent in the polymerization system. Inert solvents/diluents, however, may be present in the polymerization system disclosed herein due to build-up of inert components, like propane and ethane, present in the is monomer feed. Such inert solvents/diluents may also originate from the catalyst feed solution. As it will be appreciated by those skilled in the art, these components are present in the polymerization system fortuitously, i.e., as an unavoidable component of a feed stream but not with the intent of using their polymer solvating properties in the reactor itself. Advantageously, the concentration of inert solvents having more than three carbon atoms typically used as solvents in the bulk homogeneous polymerization processes for producing EP random copolymer blend component disclosed herein is less than 40 wt %, or less than 30 wt %, or less than 20 wt %, or 15 wt % or less than 10 wt %, or less than 5 wt %, or less than 2 wt %, or less than 1 wt %, or less than 0.5 wt %, or less than 0.1 wt %, or less than 0.01 wt % (also defined as substantially free of inert solvent) in the combined reactor feed (i.e., the total of fresh and recycle feed), or in the polymerization system in the reactor, or in the polymerization system leaving the reactor. Advantageously, the disclosed bulk homogeneous polymerization processes for producing EP random copolymer blend components disclosed herein operate in a polymerization system that is substantially free of inert solvents/diluents having more than three carbon atoms, thus operate without a dedicated solvent recycle and handling loop, which reduces plant capital investment and operating costs.

The higher monomer concentrations provided by the bulk homogeneous polymerization processes for producing EP random copolymer blend components disclosed herein also advantageously provides for increased molecular weight of the EP random copolymer component at otherwise similar reactor conditions. In such embodiments, the reaction conditions are similar to to those used in the prior art solution processes, but the products are of higher molecular weight affording lower melt flow rates while making EP copolymers with the same ethylene content.

In yet other embodiments, the disclosed bulk homogeneous is polymerization processes for making random EP copolymer blend components with 10 to 20 wt % ethylene content are operated at 15 to 30° C., or 20 to 30° C., or to 30° C. higher polymerization temperatures than the prior art solution process for producing EP copolymers with the same ethylene concentration and melt flow rate (MFR). The higher operating temperature also creates a novel combination of ethylene concentration, melt flow rate, and polymer microstructure as determined by the total regio defect concentration in the continuous propylene segments measured by $^{13}$C NMR. The bulk homogeneous polymerization processes for producing EP random copolymer blend components disclosed herein typically yield EP random copolymers with a 40 to 150% or 40 to 100% higher total regio defect concentration in the continuous propylene segments than the total regio defect concentration found in random EP copolymers of comparable ethylene content and melt flow rate made in prior art solution processes.

The combination of higher monomer concentration and higher operating temperatures provided by the disclosed bulk homogeneous polymerization processes, also provide significant increases in catalytic activity. In particular, catalytic activities for the disclosed bulk homogeneous polymerization processes, measured in turnover frequency (TOF), expressed as mole of monomers converted per mol catalytic metal per second, are 2 to 20 times, or 5 to 20 times, or 2 to 10 times or 3 to 10 times higher than prior art solution processes producing EP random copolymers with comparable ethylene concentration and melt flow rate. The higher catalytic activities of the disclosed bulk homogeneous polymerization processes in turn allows for smaller reactors, i.e., lower residence times, and/or lower catalyst concentrations and thus lower catalyst costs for making products with comparable ethylene concentration and melt flow rate. The optimum combination of reduction in reactor volume and/or reduction in catalyst usage may be determined by standard chemical engineering techniques.

Non-limiting exemplary reactor residence times for the disclosed bulk homogeneous polymerization processes are from 2 to 30 minutes, or 2 to 20 minutes, or 2 to 15 minutes, or 4 to 15 min, or 4 to 10 min. This reduced residence time also allows for a reduction in reactor size. Alternatively, or in combination thereof, the catalyst cost can be reduced by lowering the catalyst usage per unit polymer production with the disclosed bulk homogeneous polymerization processes.

In addition to propylene monomer and ethylene comonomer feeds to the reactor system, other comonomers may also be optionally fed to the reactors. Non-limiting exemplary optional comonomers include butene-1, pentene-1, hexene-1, octene-1, decene-1, dodecene-1, and combinations thereof. These optional comonomers may be incorporated into the EP copolymer blend component at from 0.5 to 10 mol %, or from 0.5 to 8 mol %, or 1 to 5 mol %. This allows for ethylene-propylene terpolymer products to be produced.

In another form of the present disclosure, provided are advantageous random ethylene-propylene copolymer blend components comprising between 10 wt % and 20 wt % randomly distributed ethylene with a melt flow rate of between 0.5 and 20,000 g/10 min, wherein the copolymer is polymerized by a bulk homogeneous polymerization process, and wherein the total regio defects in the continuous propylene segments of the copolymer is between 40 and 150% greater than a copolymer of equivalent melt flow rate and wt % ethylene polymerized by a solution polymerization process.

The bulk homogeneous polymerization processes for producing EP random copolymer blend components disclosed herein may produce copolymers with ethylene contents as measured by $^{13}$C NMR or IR methods (described in detail in the examples) ranging from 10 to 20 wt %, or 10 to 18 wt %, or 10 to 16 wt %. The bulk homogeneous polymerization processes for producing EP random copolymer blend components disclosed herein may produce copolymers with melt flow rates as measured by ASTM D1238 or ISO 1133 methods ranging from 0.5 to 20,000 g/10 min, or 0.5 to 5,000 g/10 min, or 1.0 to 2,000 g/10 min, or 1.0 to 1500 g/10 min. The total regio defect concentration in the continuous propylene segments of the EP random copolymer blend components produced using the bulk homogeneous polymerization process disclosed herein may be greater than 0.50 mol %, or greater than 0.55 mol %, or greater than 0.60 mol %, or greater than 0.65 mol %, or greater than 0.70 mol %. The analytical method for measuring the regio defect concentration is by $^{13}$C NMR as described in the examples in detail. As previously described, the EP random copolymer blend components disclosed herein may have a total regio defect concentration in the continuous propylene segments which is 40 to 150% higher, or 40 to 100% higher than the total regio defect concentration of EP copolymers of comparable ethylene content and melt flow rate produced in prior art solution processes. When measurable amount of crystallinity is present in the random EP copolymers made by the disclosed processes, their melting peak temperature as measured by differential scanning calorimetry or CSC (for the details of the DSC method see examples) may range from 35 to 80° C., or 40 to 70° C., or 45 to 60° C. When an optional comonomer chosen from butene-1, pentene-1, hexene-1, octene-1, decene-1, dodecene-1 and combinations thereof are added to the reactor feed stream, a propylene based random terpolymer product may be formed.

The detailed description below sets forth the details of the bulk homogenous polymerization processes (bulk homogeneous supercritical process and bulk solution process) where the processes and reactors previously described to for producing the novel EP random copolymer blend components disclosed herein are utilized. The advantageous processes for producing the EP random copolymer blend components disclosed herein include reactors that operate with a bulk homogeneous dense fluid phase. Polymerization processes that operate in a homogenous dense fluid phase use either inert solvents or the monomers or their mixtures as a solvent in their liquid or supercritical state. Hence, the one or more reactors disclosed herein operate with polymerization systems in their homogeneous supercritical or in their liquid state. The bulk polymerization processes disclosed herein also operate with less than 40%, or less than 30%, or less than 20 wt % or less than 10 wt % or less than 5 wt % of inert solvent present in the reactor, and in some embodiments, with less than 1 wt % of inert solvent. In one embodiment of the disclosed process, the reactors operate at bulk homogeneous supercritical conditions as has been disclosed in U.S. patent application Ser. Nos. 11/433,889 and 11/177004, herein incorporated by reference in their entirety.

Novel/Differentiated Copolymer Homogeneous Polymerization Process Details:

In one or more embodiments for producing the novel EP copolymer blend components, the process includes contacting, in a polymerization system, a propylene monomer, an ethylene comonomer with a catalyst, an activator, optional other comonomer (advantageously butene-1, hexene-1, or octene-1, or decene-1, or dodecene-1, or combinations thereof), and optionally inert solvent, at a temperature at or above 65° C., or 70° C., or 75° C., or 80° C., or 85° C., or 90° C., or 100° C., or 110° C., and at a pressure above 1.5 kpsi (103 bar, 10.3 MPa), or above 2 kpsi (138 bar, 13.8 MPa), or above 5 kpsi (345 bar, 34.5 MPa), or above 10 kpsi (690 bar, 69 MPa). The polymerization takes place in a bulk homogeneous polymerization system within the reactor.

In one or more embodiments, the density of the polymerization system is about 0.3 g/mL, or more. In one or more embodiments, the density of the polymerization system is about 0.4 g/mL, or more. In one or more embodiments, the density of the polymerization system is about 0.5 g/mL or more. In one or more embodiments, the density of the polymerization system is about 0.6 g/mL, or more. In one or more embodiments, the density of the polymerization system is of from 0.3 g/mL to 0.75 g/mL or from 0.30 to 0.70 g/mL.

In one or more embodiments, the steady state polymer yield (i.e., conversion of monomer to polymer product) per pass is at least 5 wt % of the total combined monomer fed to the reactor. In one or more embodiments, the conversion of monomer to polymer product in a single pass is at least 10 wt % of the monomer, in one or more embodiments, the conversion of monomer to polymer product in a single pass is at least 20 wt % of the monomer. In one or more embodiments, the conversion of monomer to polymer product in a single pass is at least 30 wt % of the monomer. In one or more embodiments, the conversion of monomer to polymer product in a single pass is at least 40 wt % of the monomer. In one or more embodiments, the conversion of monomer to polymer product in a single pass is at least 50 wt % of the monomer. In one or more embodiments, the conversion of monomer to polymer product in a single pass is at least 60 wt % of the monomer. In one or more embodiments, the conversion of monomer to polymer product in a single pass is at least 70 wt % of the total combined monomer fed to the reactor.

In one or more embodiments, the polymerization conditions are sufficient to keep the polymer product dissolved in the monomers present in the liquid state (i.e., "bulk solution polymerization"). In one or more embodiments, the polymerization conditions are sufficient to keep the polymer product dissolved in the monomers present in the dense supercritical fluid state (i.e., "bulk supercritical polymerization"). In one or more embodiments, the polymerization conditions are sufficient to form a single homogeneous dense fluid polymerization system comprising the monomers and less than 40 wt % inert solvent (i.e., bulk homogeneous supercritical or bulk homogeneous solution polymerization). In one or more embodiments, the critical or pseudo-critical temperature and pressure of the reactor blends are different from the critical values of the pure components, and thus supercritical operations at temperatures lower than the critical temperature of one or more of the pure monomers (e.g., 92° C. for propylene) are possible. In one or more embodiments, near-amorphous materials with low melting points as well as amorphous materials can be produced without fouling even below the critical temperature of the reactor blends, i.e., at temperatures that correspond to the condensed liquid state of the polymerization system in the reactor. In these instances, the operating temperature can be below the bubble-point of the reaction mixture and thus the reactor can operate at what is often referred to as liquid-filled conditions. In some instances, such operation mode could be desired to achieve high molecular weight (MW) and thus low melt flow rate (MFR), particularly in the manufacture of the EP random copolymers disclosed herein.

In one or more embodiments, the reaction temperature and pressure can be selected so that the polymerization system remains at a pressure below the polymers cloud point in the particular polymerization system, resulting in a two-phase polymerization system comprising a polymer-rich phase and a polymer-lean phase. Some embodiments that are below the polymer's cloud point nonetheless operate above the polymer's crystallization temperature.

In one or more embodiments, the polymerization temperature is above the cloud point of the polymerization system at the reactor pressure. More advantageously, the temperature is 2° C. or more above the cloud point of the polymerization system at the reactor pressure.

Non-limiting exemplary process temperature ranges for making the novel EP random copolymers disclosed herein are 65 to 180° C., or 65 to 140° C., or 70 to 180° C., or 75 to 150° C., or 80 to 150° C., or 80 to 140° C. or 90 to 135° C., or 100 to 130° C., or 110 to 125° C. Non-limiting exemplary lower temperature limits for making the EP random copolymers disclosed herein are 65, or 70, or 75, or 80, or 85, or 90° C., or 100° C., or 110° C. Non-limiting exemplary upper temperature is limits for making the EP random copolymers disclosed herein are 180, or 160, or 150, or 140, or 135, or 130, or 125° C.

In another embodiment, the temperature is between 65 and 180° C., between 65 and 140° C., between 70 and 180° C., between 75 and 150° C., between 80 and 150° C., or between 80 and 140° C. In another embodiment, the temperature is at or above 65, or 70, or 75, or 80, or 85, or 90° C., or 100° C., or 110° C. In another embodiment, the temperature is at or below 180, or 160, or 150, or 140, or 135, or 130, or 125° C. In one or more embodiments, the polymerization temperature is from 65° C. to 180° C. In one or more embodiments, the polymerization temperature is about 70° C. to about 180° C. In one or more embodiments, the polymerization temperature is 75° C. to 150° C. in one or more embodiments, the polymerization temperature is about 40° C. to about 105° C. In one or more embodiments, the polymerization temperature is 80° C. to 150° C. In one or more embodiments, the polymerization temperature is 80° C. to 140° C.

In one or more embodiments, the polymerization temperature is above the fluid-solid phase transition temperature (sometimes referred to as crystallization temperature) of the polymerization system at the reactor pressure. Advantageously, the temperature is at least 2° C. or at least 5° C. above the fluid-solid phase transition temperature of the polymerization system at the reactor pressure. More advantageously, the temperature is at least 10° C. above the fluid-solid phase transformation point of the polymerization system at the reactor pressure.

In one or more embodiments, the polymerization pressure is above the fluid-fluid phase transition pressure of the polymerization system at the reactor temperature, i.e., the reactor operates with a homogeneous dense fluid polymerization system. In one or more embodiments, the polymerization pressure is no lower than 10 MPa (100 bar) below, or no lower than 5 MPa (50 bar) below, or no lower than 2 MPa (20 bar) below, or no lower than 1 MPa (10 bar) below, or no lower than 0.1 MPa (1 bar) below, or no lower than 0.01 MPa (0.1 bar) below the cloud point of the polymerization system at the reactor temperature.

Novel/Differentiated EP Copolymer Blend Component Monomer and Comonomers:

Propylene monomer and ethylene comonomer are fed to the reactor(s) of the bulk homogeneous polymerization processes disclosed herein. The propylene monomer may have a purity of greater than 99 wt %, or greater than 99.5 wt % or greater than 99.9 wt %. The ethylene comonomer may have a purity of greater than 99 wt %, or greater than 99.5 wt % or greater than 99.9 wt %.

In one or more embodiments, one or more optional comonomers, in addition to the ethylene comonomer, may be fed to the reactor. For example, $C_4$ to $C_{12}$ aliphatic olefins, such as butenes, pentenes, hexenes, heptenes, octenes, nonenes, decenes, undecenes, and dodecenes, or aromatic-group-containing comonomers containing up to 30 carbon atoms can be used. Suitable aromatic-group-containing comonomers comprise at least one aromatic structure, advantageously from one to three, more advantageously a phenyl, indenyl, fluorenyl, or naphthyl moiety. The aromatic-group-containing comonomer further comprises at least one polymerizable double bond such that after polymerization, the aromatic structure will be pendant from the polymer backbone. The aromatic-group-containing comonomer can further be substituted with one or more hydrocarbyl groups including but not limited to $C_1$ to $C_{10}$ alkyl groups. Additionally two adjacent substitutions can be joined to form a ring structure. Advantageous aromatic-group-containing comonomers contain at least one aromatic structure appended to a polymerizable olefinic moiety. Particularly advantageous aromatic comonomers include styrene, alpha-methylstyrene, para-alkylstyrenes, vinyltoluenes, vinylnaphthalene, allyl benzene, and indene, especially styrene, paramethyl styrene, 4-phenyl-butene-1 and alkylbenzene.

In one or more embodiments, non-aromatic cyclic group containing comonomers can be used. These comonomers can contain up to 30 carbon atoms. Suitable non-aromatic cyclic group containing monomers advantageously have at least one polymerizable olefinic group that is either pendant on the cyclic structure or is part of the cyclic structure. The cyclic structure can also be further substituted by one or more hydrocarbyl groups such as, but not limited to, $C_1$ to $C_{10}$ alkyl groups. Advantageous non-aromatic cyclic group containing comonomers include vinylcyclohexane, vinylcyclohexene, vinylnorbornene, ethylidene norbornene, cyclopentadiene, cyclopentene, cyclohexene, cyclobutene, vinyladamantad the like.

In one or more embodiments, diolefin comonomer(s) can be used. Advantageous diolefin comonomers include any hydrocarbon structure, advantageously $C_4$ to $C_{30}$, having at least two unsaturated bonds, Wherein at least two of the unsaturated bonds are readily incorporated into a polymer by either a stereospecific or a non-stereospecific catalyst(s). It is further advantageous that the diolefin monomers be selected from alpha-omega diene comonomers (i.e. di-vinyl monomers). More advantageously, the diolefin comonomers are linear di-vinyl monomers, most advantageously those containing from 4 to 30 carbon atoms. Examples of advantageous dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly advantageous dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (weight-averaged molecular weight, Mw, less than 1000 g/mol). Advantageous cyclic dienes include cyclopentadiene, vinylnorbornene, norbornadiene, ethylidene norbornene, divinylbenzene, dicyclopentadiene or higher ring containing diolefins with or without substituents at various ring positions.

Novel/Differentiated EP Copolymer Blend Component Composition:

In an advantageous embodiment, the process described can be used to produce novel and differentiated random ethylene-propylene copolymer blend component with an ethylene content ranging from 10 to 20 wt %. Advantageous polymers produced herein also include terpolymers of ethylene, propylene and one or more of the optional comonomers previously described. In another embodiment the polymer is a copolymer comprising propylene and ethylene, and the copolymer comprises less than or equal to 20 wt % ethylene, less than or equal to 18 wt % ethylene, less than or equal to 16 wt % ethylene, or less than or equal to 14 wt % ethylene, or less than or equal to 12 wt % ethylene. In another embodiment, the polymer is an ethylene-propylene random terpolymer comprising propylene and ethylene and one or more of any of the comonomers listed above.

In another embodiment, the ethylene-propylene copolymer blend component produced herein is a terpolymer of propylene, ethylene and one or more $C_2$ or $C_4$ to $C_{20}$ linear, branched or cyclic monomers, advantageously one or more $C_2$ or $C_4$ to $C_{12}$ linear, branched or cyclic alpha-olefins. Advantageously, the terpolymer produced herein is a terpolymer of propylene, ethylene and one or more of butene, pentene, hexene, heptene, octene, nonene, decene, undecene, dodecene, 4-methyl-pentene-1,3-methyl-pentene-1, and 3,5, 5-trimethyl-hexene-1.

In another advantageous embodiment, the ethylene-propylene copolymer blend component produced herein can be a terpolymer of ethylene, propylene and one or more linear or branched $C_4$ to $C_o$ prochiral alpha-olefin or $C_5$ to $C_{30}$ ring-containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalysts.

In another embodiment, the ethylene-propylene copolymer blend component comprises propylene present at from 70 to 90 wt %, or 80 to 90 wt %, or 82 to 90 wt %, and ethylene present at from 10 to 20 wt %, or 10 to 18 wt %, or 10 to 16 wt %, and an optional comonomer present at from 0.5 to 10 wt %, or from 0.5 to 8 wt %, or 1 to 5 wt %.

Conventional Isotactic Polypropylene Blend Component

The isotactic polypropylene blend components may be conventional in composition, and made by gas phase, slurry, or solution type process and commercially available from virtually all large petrochemical corporations, like ExxonMobil Chemical Co., Basell, Novatec, Formosa, etc., under various trade names, such as Achieve, Metocene, etc. For a comprehensive description of conventional isotactic polypropylenes, refer to the PROPYLENE HANDBOOK, E. P. Moore, Ed., Hanser, New York, 1996. Off-line-produced conventional polypropylenes may be in-line blended after dissolving them in proper solvents, such as $C_6$ to $C_{10}$ hydrocarbons. However, due to the difficulty of such processes, in-line production of polypropylenes in homogeneous polymerization processes, such as solution or homogeneous supercritical polymerization is advantageous. Of these homogeneous processes, conventional solution processes operating with low propylene concentration (typically less than 2.01 mol/L or less than 1.5 mol/L, or less than 1.0 mol/L, or less than 0.5 mol/L in the reactor effluent) tend to make lower molecular weight conventional polypropylenes (see comparative examples disclosed herein). These conventional isotactic polypropylene components may be in-line blended with novel differentiated or novel EP copolymer blend components using the in-line blending processes disclosed herein to form novel iPP-EP copolymer blends.

Novel/Differentiated Isotactic PP Blend Component

Described below is the composition, process for making, and properties of novel differentiated isotactic polypropylene blend components for use in the in-line produced iPP and EP copolymer blends disclosed herein.

The novel isotactic polypropylene (iPP) blend component advantageously has a weight-average molecular weight (Mw) of 35,000 g/mol or more. In one or more embodiment, the Mw can be 50,000 g/mol or more; 75,000 g/mol or more; 100,000 g/mol or more; 125,000 g/mol or more; 150,000 g/mol or more; 200,000 g/mol or more; or 500,000 g/mol or more. The propylene homopolymer advantageously has an Mw ranging from about 35,000 to 1,000,000; alternately from 50,000 to 1,000,000; alternately from 75,000 to 750,000; alternately from 100,000 to 400,000 g/mol. Weight average molecular weights (Mw) are determined using Gel-Permeation Chromatography (GPC), as described in more detail below.

The propylene homopolymer advantageously has a peak melting point, also referred as peak melting temperature, or melting peak temperature (Tmp) of 149° C. or more, advantageously 150° C. or more, advantageously 151"C or more, or 152° C. or more, or 153° C. or more, or 154° C. or more, or 155° C. or more. In one or more embodiments, the peak melting temperature can range from about 149° C. to about 170° C., or from 150° C. to about 170° C., or from 151° C. to about 165° C., or from 152° C. to 165° C. Peak melting temperature (Tmp) is determined using Differential Scanning calorimetry (DSC), as described in more detail below.

In one or more embodiments, the homopolymer described herein has a peak melting temperature minus peak crystallization temperature (Tmp−Tcp) of less than or equal to (0.907 times Tmp) minus 99.64° C. (or expressed by the formula of Tmp−Tcp≤(0.907×Tmp)−99.64° C.), as measured on the homopolymer having 0 wt % nucleating agent, advantageously Tmp−Tcp≤(0.907×Tmp)−100.14° C., more advantageously Tmp−Tcp≤(0.907×Tmp)−100.64° C. In the current disclosure, the difference between the melting and crystallization peak temperatures (Trap Tcp) as measured by DSC will be also referred to as supercooling temperature and will be expressed in ° C.

In one or more embodiments, the propylene homopolymer advantageously has more than 15 and less than 100 regio defects (defined as the sum of 2,1-erythro, 2,1-threo insertion, and 3,1-isomerization) per 10,000 propylene units and mmmmm pentad fraction of at least 0.85, alternately more than 17 and less than 100 detects per 10,000 propylene units, alternately more than 20 or 30 or 40, but less than 95 regio defects per 10,000 propylene units. The regio defects are determined using $^{13}C$ NMR spectroscopy as described below.

The propylene homopolymer advantageously has a heat of fusion (ΔHf) of 80 J/g or more, or 90 J/g or more, or 100 J/g or more, or 110 J/g or more, or 120 J/g or more. Heat of fusion (Hf, or AHD is determined by using Differential Scanning calorimetry (DSC), as described in more detail below.

The disclosed propylene homopolymers have little or extremely low inorganic residues typically originating from the catalyst systems (i.e., from the catalyst precursors, activators, and optional supports) and the optional scavengers, such as, for example, alkyl aluminum compounds, or methyl aluminoxane (MAO), etc. In some embodiments, the polymer product has less than 1 wt % silica, or less than 0.1 wt % silica, or less than 100 wt ppm silica, or less than 10 wt ppm silica. In other embodiments, the polymer product contains less than less than 100 wt ppm Group-4 transition metal, or less than 10 wt ppm Group-4 metal. In a preferred embodiment, the disclosed homopolymers have a combined Group-4 transition metal (e.g., Ti, Zr, or Hf) and aluminum content of 100 wt ppm or less, or 50 wt ppm or less, or 10 weight ppm or less.

The disclosed propylene homopolymers have narrow molecular weight distribution (MWD) expressed as the ratio of the number and weight average molecular weights (Mw/Mn, measured by GPC with DRI detector) of 1.2 to 5, or 1.5 to 4, or 1.8 to 3.5 or 1.8 to 3, or 1.8 to 2.5. Advantageously, the Mw/Mn is greater than 1 and less than or equal to 5.

The propylene homopolymer advantageously has a melt viscosity of less than 10,000 centipoises (cps) at 180° C. as measured on a Brookfield viscometer, advantageously between 1000 to 3000 cps for some embodiments (such as packaging and adhesives) and advantageously between 5,000 and 10,000 for other applications.

The disclosed propylene homopolymers have a melt flow rate (MFR, ASTM D1238 at 230° C./2.16 kg) of 20,000 g/min or less, or 15,000 g/10 min or less, or 0.1 to 20,000, or 0.1, to 15,000, or 0.1 to 10,000, or 0.1 to 5,000, or 1 to 20,000, or 1 to 10,000, or 1 to 5,000, or 10 to 5,000, or 1 to 500, or 10 to 500 g/10 min.

The propylene homopolymer described herein advantageously has a crystallization half time (Tc-half), as measured by differential scanning calorimetry (DSC), in the absence of any nucleating agents (e.g. 0 wt %), at 126° C. of 12.0 minutes or less, preferably 12.0 to 3.9 minutes, preferably 11.5- to 3.4 minutes, preferably 11.0 to 2.9 minutes, more preferably 10.5 to 2.4 minutes.

Novel/Differentiated iPP Homogeneous Polymerization Process Details:

In one or more embodiments, the process to produce polypropylene described herein includes contacting propylene, in a polymerization system, with to one or more catalyst systems, at a temperature above 90° C. and at a pressure above 12 MPa, The polymerization advantageously takes place in a homogeneous polymerization system within a continuous polymerization reactor. In one or more embodiments, about 40 wt % or more propylene monomer, based on total weight of propylene monomer and optional inert solvent and/or inert diluent, and up to about 60 wt % inert solvent, based on total weight of propylene monomer and optional inert solvent and inert diluent, is fed into a polymerization reactor. Advantageously, about 28 wt % or more propylene monomer, based on total weight of the polymerization system, is present in the reactor effluent at steady state conditions. In one or more embodiments above or elsewhere herein, the monomer feed to the process can include one or more diluents. Scavengers and co-catalysts can also be included in the reactor feed.

In one or more embodiments, the monomer teed can contain 40 wt % or more, 45 wt % or more, or 50 wt % or more, 55 wt % or more, or 60 wt % or more, or 65 wt % or more, or 70 wt % or more, or 75 wt % or more, or 80 wt % or more, or 85 wt % or more, or 90 wt % or more propylene, based on total weight of propylene and optional inert solvents and/or inert diluents entering the reactor. In one or more embodiments, the monomer feed can contain monomer ranging from about 40 wt % to about 85 wt %, based on total weight of propylene and optional inert solvents and/or inert diluents entering the reactor. In one or more embodiments, the monomer feed can contain monomer ranging from about 40 wt % to about 75 wt %, based on total weight of monomer and optional inert solvents and/or inert diluents entering the reactor. In one or more embodiments, the monomer feed can contain propylene ranging from about 40 wt % to about 65 wt %, based on total weight of monomer and optional inert solvents and/or inert diluents entering the reactor.

In one or more embodiments, the polymerization system contains up to 60 wt % inert solvent. In one or more embodiments, the polymerization system contains more than 35 wt % and less than 60 wt % inert solvent or more than 35 and less than 65 wt % inert solvent, or more than 35 and less than 70 wt % inert solvent. In one or more embodiments, the polymerization system contains of from 40 wt % to 60 wt % inert solvent. In one or more embodiments, the inert solvent content of the polymerization system can range from a low of about 40 wt %, 45 wt %, or 50 wt %, or 60 wt %, or 65 wt % to a high of about 65 wt %. The inert solvent typically comprises hydrocarbons containing from 4 to 100 carbon atoms, advantageously from 4 to 8 carbon atoms. In certain embodiments, the inert solvent is or includes hexane isomers.

Not wishing to be bound by theory, it is believed that the high concentration of propylene increases the molecular weight of the product or allows higher-temperature operations while making the same polymer grade, thus enabling the production of polymer grades otherwise inaccessible, or reduces the cost of monomer recycle and reactor cooling. Increased concentration of solvents, on the other hand, depresses the cloud point of the polymerization system allowing homogeneous reactor operations at lower pressures, which in turn reduces the investment and compression costs. Therefore, there is an optimum monomer/solvent concentration for achieving the lowest production cost of a given polypropylene grade at a given location and at a given time. This optimum depends on many factors, among other things, on the cost of reactor construction, the cost of energy and cooling, etc. The optimum solvent composition and concentration for any given product slate and location can be determined by standard methods known in the art of chemical engineering.

In one or more embodiments, the density of the polymerization system is about 0.3 glint, or more, or about 0.4 g/mL or more, or about 0.5 g/m or more, or about 0.6 g/mL or more.

In one or more embodiments, the steady state polymer yield (i.e. conversion of propylene monomer to polymer product in a single pass through the reactor is at least 5 wt % of the propylene monomer fed to the reactor, in one or more embodiments, the conversion of propylene monomer to polymer product in a single pass through the reactor is at least 10%. In one or more embodiments, the conversion of propylene monomer to polymer product in a single pass through the reactor is at least 20%, or at least 30%, or at least 40% but less than 90%, or less than 80%, or less than 70% in a single pass through the reactor.

In one or more embodiments, the polymerization conditions are sufficient to maintain the polymerization system in a single, homogeneous fluid state. For example, the minimum reaction temperature and pressure can be selected so that the polymer produced, and the polymerization system that solvates it, remain single phase, i.e. above the polymerization system's cloud point and above its solid-fluid phase transition temperature and pressure with that polymer. Also, lower temperatures generally favor higher crystallinity and higher molecular weight, which are often key product attributes to meet. Furthermore, for homogeneous polymerization processes, the lower limits of reaction temperature can also be determined by the solid-fluid phase transition temperature. Reactors operated below the solid-fluid phase transition temperature of the reaction mixture can lead to operation problems due to fouling. For the production of highly crystalline polypropylenes (melting peak temperatures >150° C.) in homogeneous polymerization processes, the minimum operating temperature is about 93 to 100° C. The application of certain inert solvents can further reduce the minimum operation temperature of the fouling-free operation regime, although the substantial presence of inert solvents can reduce polymerization rate, product molecular weight, and can depress the melting peak temperature. The upper limit for temperature can be determined by the product properties that are strongly influenced by the reaction temperature. Since often polymers with higher molecular weights and/or higher melting temperatures are desired, high polymerization temperatures (>200° C.) are generally not advantageous. Increased temperatures can also degrade many known catalytic systems, providing another reason for avoiding excessive polymerization temperatures. From this perspective, temperatures below 250° C. are useful. Obviously, the optimum reactor conditions are influenced by the product specifications and reactor operation issues as outlined above. Advantageously, the polymerization temperatures for the production of the disclosed polypropylenes are typically between 90 and 200° C., or between 90 and 180° C., or between 90 and 150° C., or between 93 and 150° C., or between 93 and 140° C., or between 95 and 140° C.

In one or more embodiments, the polymerization conditions are sufficient to dissolve the polymer product essentially in the monomer, which is present in the liquid state. These embodiments fall into the category of "bulk solution polymerization". In other embodiments, the polymerization conditions are sufficient to dissolve the polymer product essentially in the monomer, which is present in the supercritical state. These embodiments fall into the category of "bulk supercritical polymerization". The polymerization system can form one single fluid phase or two fluid phases.

In one or more embodiments, the reaction temperature and pressure can be selected so that the polymerization system remains at a pressure below the polymer's cloud point in the particular polymerization system, resulting in a two phase polymerization system forming a polymer-rich phase and a polymer-lean phase. Some embodiments that are below the polymer's cloud point nonetheless operate above the polymer's crystallization temperature. The terms "two-phase system" or "two-phase polymerization system" refer to a polymerization system having two and, advantageously, only two phases. In certain embodiments, the two phases are referenced as a "first phase" and a "second phase." In certain embodiments, the first phase is or includes a "monomer phase," which includes monomer(s) and can also include diluent and some or all the product of polymerization. In certain embodiments, the second phase is or includes a solid phase, which can include products of polymerization, e.g., macromers and polymer product, but not monomers, e.g., propylene. While operations with such two-phase polymerization system is feasible, they may cause operability issues, particularly downstream of the reactor, thus reactor operations above the cloud point, i.e., in a single-phase polymerization system are advantageous over the two-phase polymerization system.

In the disclosed processes for making highly crystalline polypropylenes with the above-described melting and supercooling properties and defect structure, the reaction pressure can be no lower than the solid-fluid phase transition pressure of the polymer-containing dense fluid polymerization system at the reactor temperature. In another embodiment, the pressure is no lower than 10 MPa below the cloud point of the fluid reaction medium at the reactor temperature. In another embodiment, the pressure is between 12 and 1500 MPa, or between 12 and 207 MPa, or between 12 and 138 MPa, or between 69 MPa, or between 12 and 55 MPa, or between 34.5 and 138 MPa, or between 34.5 and 83 MPa, between 12 and 13.8 MPa. In another embodiment, the pressure is above 12, 20.7, or 34.5 MPa. In another embodiment, the pressure is below 1500, 500, 207, 138, 83, 69, 55, or 118 MPa.

Novel/Differentiated Isotactic Polypropylene Polymerization Reactors:

Polymerizations for the one or more iPP parallel reactor trains may be carried out either in a single reactor, or in two or more reactors configured in series or parallel. The catalyst system can be delivered as a solution or slurry, either separately to the reactor, activated in-line just prior to the reactor, or preactivated and pumped as an activated solution or slurry to the reactor. Since heterogeneous (solid) catalysts are often difficult to handle in disclosed homogeneous polymerization processes (they tend to cause plugging and increased wear), advantageous catalyst systems are soluble in the polymerization system. In one embodiment, two solutions, one comprising the one or more catalyst precursor compounds and another comprising the activator, are blended in-line either in or prior to feeding them to the reactor. In other embodiments, the one or more catalyst precursor compounds are premixed with the one or more activators in solution, and a solution of the already activated catalyst is fed to the reactor.

In any operation mode, the catalyst system may comprise one, or more than one catalyst precursor and one or more activator. In both single- and multi-reactor operations, the one or more catalyst systems may be introduced at one point or at multiple points to the one or more polymerization reactors. Various feed configurations can be used depending on such factors as the desired product properties, such as, for example, molecular weight distribution, or catalyst stability. Such feed configurations are well known in the art of chemical engineering and can be readily optimized for the desired production scale and product properties using known engineering techniques.

In one or more embodiments, polymerization can occur in high-pressure reactors, where, advantageously, the reactor is substantially unreactive with the polymerization reaction components and is able to withstand the high pressures and temperatures that occur during the polymerization reaction. Such reactors are known as high-pressure reactors for purposes of this disclosure. Withstanding these high (typically higher than 13.8 or higher than 34.5, or higher than 69.0 MPa, or higher than 137.9 MPa) pressures and temperatures will allow the reactor to maintain the polymerization system in its homogeneous condition. Suitable reaction vessels include those known in the art to maintain high-pressure polymerization reactions. Suitable reactors are selected from autoclave, pump-around loop, autoclave, tubular, and combinations thereof.

Autoclave reactors may be operated in either a batch or continuous mode, although the continuous mode is advantageous. Tubular reactors always operate in continuous mode. Typically, autoclave reactors have length-to-diameter ratios of 1:1 to 20:1 and are fitted with a high-speed (up to 2000 RPM) multiblade stirrer and baffles arranged for optimal mixing. Commercial autoclave pressures are typically greater than 5 MPa with a maximum of typically less than MPa. The maximum pressure of commercial autoclaves, however, may become higher with advances in mechanical and material science technologies.

When the autoclave has a low length-to-diameter ratio (such as less than four), the feed streams may be injected at one position along the length of the is reactor. Reactors with large diameters may have multiple injection ports at nearly the same or different positions along the length of the reactor. When they are positioned at the same length of the reactor, the injection ports are radially distributed to allow for faster intermixing of the teed components with the reactor content. In the case of stirred tank reactors, the separate introduction of the catalyst and monomer may be advantageous in preventing the possible formation of hot spots in the unstirred feed zone between the mixing point and the stirred zone of the reactor. Injections at two or more positions along the length of the reactor is also possible and may be advantageous. In one exemplary embodiment, in reactors where the length-to-diameter ratio is from 4 to 20, the reactor may contain up to six different injection positions along the reactor length with multiple ports at some or each of the lengths.

Additionally, in the larger autoclaves, one or more lateral mixing devices may support the high-speed stirrer. These mixing devices can also divide the autoclave into two or more zones. Mixing blades on the stirrer may differ from zone to zone to allow for a different degree of plug flow and back mixing, largely independently, in the separate zones. Two or more autoclaves with one or more zones may connect in a series reactor cascade to increase residence time or to tailor polymer structure in a reactor train producing a polymer blending component. As previously described, a series reactor cascade or configuration consists of two or more reactors connected in series, in which the effluent of at least one upstream reactor is fed to the next reactor downstream in the cascade. Besides the effluent of the upstream reactor(s), the feed of any reactor in the series reactor cascade of a reactor train can be augmented with any combination of additional monomer, catalyst, or solvent fresh or recycled feed streams. Therefore, it should be understood that the polymer blending component leaving a reactor train of the process disclosed herein may itself be a blend of the same polymer with increased molecular weight and/or compositional dispersion or even a blend of homo- and copolymers.

Tubular reactors may also be used in the processes disclosed herein and more particularly tubular reactors capable of operating up to about 350 MPa. Tubular reactors are fitted with external cooling and one or more injection points along the (tubular) reaction zone. As in autoclaves, these injection points serve as entry points for monomers (such as propylene), one or more comonomer, catalyst, or mixtures of these. In tubular reactors, external cooling often allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Alternatively, tubular reactors may be fabricated with smooth, unpolished internal surfaces to address wall deposits. Tubular reactors generally may operate at pressures of up to 360 MPa, may have lengths of 100-2000 meters or 100-4000 meters, and may have internal diameters of less than 12.5 cm. Typically, tubular reactors have length-to-diameter ratios of 10:1 to 50,000:1 and include up to 10 different injection positions along its length.

Reactor trains that pair autoclaves with tubular reactors are also contemplated within the scope of the polymerization processes disclosed herein for making highly crystalline polypropylenes. In this reactor system, the autoclave typically precedes the tubular reactor or the two types of reactors form separate trains of a parallel reactor configuration. Such reactor systems may have injection of additional catalyst and/or feed components at several points in the autoclave, and more particularly along the tube length. In both autoclaves and tubular reactors, at injection, feeds are typically cooled to near ambient temperature or below to provide maximum cooling and thus maximum polymer production within the limits of maximum operating temperature. In autoclave operation, a preheater may operate at startup, but not after the reaction reaches steady state if the first mixing zone has some back-mixing characteristics. In tubular reactors, the first section of double-jacketed tubing may be heated (especially at start ups) rather than cooled and may operate continuously. A well-designed tubular reactor is characterized by plug flow wherein plug flow refers to a flow pattern with minimal radial flow rate differences. In both multizone autoclaves and tubular reactors, catalyst can not only be injected at the inlet, but also optionally at one or more points along the reactor. The catalyst feeds injected at the inlet and other injection points can be the same or different in terms of content, density, and concentration. Catalyst feed selection allows polymer design tailoring within a given reactor or reactor train and/or maintaining the desired productivity profile along the reactor length.

At the reactor outlet valve, the pressure drops to begin the separation of polymer and unreacted monomer, co-monomers, solvents and inerts, such as for example ethane, propane, hexane, and toluene. More particularly, at the reactor outlet valve, the pressure drops to levels below that which critical phase separation allowing for a polymer-rich phase and a polymer-lean phase in the downstream separation vessel. Typically, conditions remain above the polymer product's crystallization temperature. The autoclave or tubular reactor effluent may be depressurized on entering the downstream high-pressure separator (HPS). The temperature in the separation vessel is maintained above the solid-fluid phase separation temperature.

In addition to autoclave reactors, tubular reactors, or a combination of these reactors, loop-type reactors may be utilized in the polymerization processes disclosed herein. In this reactor type, monomer enters and polymer exits continuously at different points along the loop, while an in-line pump continuously circulates the contents (reaction liquid). The feed/product takeoff to rates control the total average residence time. A cooling jacket removes reaction heat from the loop. Typically feed inlet temperatures are near to or below ambient temperatures to provide cooling to the exothermic reaction in the reactor operating above the crystallization temperature of the polymer product. The loop reactor may have a diameter of 41 to 61 cm and a length of 100 to 200 meters and may operate at pressures of 25 to 30 MPa. In addition, an in-line pump may continuously circulate the polymerization system through the loop reactor.

The polymerization processes of polymerization processes disclosed herein may have residence times in the reactors as short as 0.5 seconds and as long as several hours, alternatively from 1 sec to 120 min, alternatively from 1 second to 60 minutes, alternatively from 5 seconds to 30 minutes, alternatively from 30 seconds to 30 minutes, alternatively from 1 minute to 60 minutes, and alternatively from 1 minute to 30 minutes. More particularly, the residence time may be selected from 10, or 30, or 45, or 50, seconds, or 1, or 5, or 10, or 15, or 20, or 25, or 30 or 60 or 120 minutes, Maximum residence times may be selected from 1, or 5, or 10, or 15, or 30, or 45, or 60, or 120 minutes.

The monomer-to-polymer conversion rate (also referred to as the conversion rate) is calculated by dividing the total quantity of polymer that is collected during the reaction time by the amount of monomer added to the reaction. Lower conversions may be advantageous to limit viscosity although increase the cost of monomer recycle. The optimum total monomer conversion thus will depend on reactor design, product slate, process configuration, etc., and can be determined by standard engineering techniques. Total monomer conversion during a single pass through any individual reactor of the fluid phase in-line process for blending disclosed herein may be up to 90%, or below 80%, or below 60% or 3 to 80%, or 5 to 80%, or 10 to 80%, or 15 to 80%, or 20 to 80%, or 25 to 60%, or 3 to 60%, or 5 to 60%, or 10 to 60%, or 15 to 60%, or 20 to 60%, or 10 to 50%, or 5 to 40%, or 10 to 40%, or 40 to 50%, or 15 to 40%, or 20 to 40%, or 30 to 40% or greater than 5%, or greater than 10%.

Advantageously, catalyst productivities range from 100 to 500,000 kg PP/(kg catalyst hr). This high level of catalyst productivity in combination of using unsupported catalysts, can result in low residual inorganic residues in the polymer product. In some embodiments, the polymer product has less than 1 weight % silica, or less than 0.1 wt % silica, or less than 100 wt ppm silica, or less than 10 wt ppm silica. In other embodiments, the polymer product contains less than less than 100 wt ppm Group-4 transition metal, or less than 10 wt ppm Group-4 metal. In a preferred embodiment, the disclosed homopolymers have a combined Group-4 transition metal (e.g., Ti, Zr, or HO and aluminum content of 100 wt ppm or less, or 50 with ppm or less, or 10 weight ppm or less.

Novel/Differentiated Isotactic Polypropylene Reaction Conditions:

The reaction temperature can be above the solid-fluid phase transition temperature of the polymer-containing fluid reaction medium at the reactor pressure, advantageously at least 5° C. above the solid-fluid phase transition temperature of the polymer-containing fluid reaction medium at the reactor pressure. More advantageously, at least 1.0° C. above the solid-fluid phase transformation point of the polymer-containing fluid reaction medium at the reactor pressure. In another embodiment, the temperature is above the cloud point of the single-phase fluid reaction medium at the reactor pressure. More advantageously 2° C. or more above the cloud point of the fluid reaction medium at the reactor pressure. In another embodiment, the temperature is between 50 and 350° C., between 60 and 250° C., between 70 and 250° C., or between 80 and 250° C. In another embodiment, the temperature is above 50, 60, 70, 80, 90, 95, 100, 110, or 120° C. In another embodiment, the temperature is below 350, 250, 240, 230, 220, 210, or 200° C. In another embodiment, the cloud point temperature is above the supercritical temperature of the polymerization system. In another embodiment, the cloud point temperature is between 50 and 350° C., between 60 and 250° C., between 70 and 250° C., or between 80 and 250° C. In another embodiment, the cloud point temperature is above 50, 60, 70, 80, 90, 95, 100, 110, or 120° C. In another embodiment, the cloud point temperature is below 350, 250, 240, 230, 220, 210, or 200° C.

The reaction pressure can be no lower than the crystallization phase transition pressure of the polymer-containing fluid reaction medium at the reactor is temperature. In another embodiment, the pressure is no lower than 10 MPa below the cloud point of the fluid reaction medium at the reactor temperature. In another embodiment, the pressure is between 10 and 500 MPa, between 10 and 300 MPa, or between 20 and 250 MPa. In another embodiment, the pressure is above 10, 20, or 30 MPa. In another embodiment, the pressure is below 1500, 500, 300, 250, or 200 MPa. In another embodiment, the cloud point pressure is between 10 and 500 MPa, between 10 and 300 MPa, or between 20 and 250 MPa. In another embodiment, the cloud point pressure is above 10, 20, or 30 MPa. In another embodiment, the cloud point pressure is below 1500, 500, 300, 250, or 200 MPa.

Isotactic PP-EP Copolymer Blend Formulations

Many different types of iPP and EP copolymer blends may be made by the fluid phase in-line blending process disclosed herein. A major fraction of a blend is defined as 50% or more by weight of the blend. A minor fraction of a blend is defined as less than 50% by weight of the blend.

In some forms the iPP and EP copolymer blends produced by the processes disclosed herein include a major fraction of the EP copolymer component, wherein the EP copolymer component may be from 50 to 99 wt %, based upon the weight of the polymers in the blend, or 55 to 98 wt %, or 60 to 95 wt %, or 65 to 90 wt %, or 70 to 85 wt %, or 75 to 80 wt %, with the iPP and any polymer additives constituting the remainder of the blend. Hence the iPP blend component will generally constitute a minor fraction of the blend, wherein the iPP component may be from 1 to 50 wt %, based upon the weight of the polymers in the blend, or 2 to 45 wt %, or 5 to 40 wt %, or 10 to 35 wt %, or 15 to 30 wt %, or 20 to 25 Wt %.

In one embodiment of the novel iPP-EP copolymer blends disclosed herein, the blend includes a novel or differentiated EP copolymer component described above in combination with a conventional isotactic polypropylene component. In particular, the blend includes between 50 and 99 wt % of an ethylene-propylene copolymer component including between 10 wt % and 20 wt % randomly distributed ethylene with a melt flow rate of between 0.5 and 20,000 g/10 min, wherein the copolymer is polymerized by a bulk homogeneous polymerization process, and wherein the total regio defects in the continuous propylene segments of the copolymer is between 40 and 150% greater than a copolymer of equivalent melt flow rate and wt % ethylene polymerized by a solution polymerization process, and between 1 and 50 wt % of isotactic polypropylene with a melt flow rate of between 0.5 and 20,000 g/10 min. In another form of this embodiment, the total regio defects in the continuous propylene segments of the EP copolymer may be between 40 and 100% greater than a copolymer of equivalent melt flow rate and wt % ethylene polymerized by a solution polymerization process. In yet another form of this embodiment, the melt flow rate of the EP copolymer may be between 0.5 and 5,000 g/10 min. In still yet another form of this embodiment, the total regio defects in the continuous propylene segments of the EP copolymer may be greater than 0.50 mol %, or greater than 0.70 mol %. In still yet another form of this embodiment, the peak melting temperature of the EP copolymer may be between 35° and 80° C. The EP copolymer component may also optionally comprise between 0.5 wt % and 50 wt % of randomly distributed butene-1, pentene-1, hexene-1, octene-1, decene-1, or combinations thereof.

In another embodiment of the novel iPP-EP copolymer blends disclosed herein, the blend includes a novel or differentiated isotactic polypropylene in combination with a conventional ethylene-propylene copolymer. In particular, the blend includes between 1 and 50 wt % of isotactic polypropylene with a melt flow rate of between 0.5 and 20,000 g/10 min and a melting peak temperature of 145° C. or higher, and Wherein the difference between the DSC peak melting and the peak crystallization temperatures is less than or equal to 0.5333 times the melting peak temperature minus 41.333° C., and between 50 and 99 wt % of ethylene-propylene copolymer including between 10 wt % and 20 wt % randomly distributed ethylene with a melt flow rate of between 0.5 and 20,000 g/10 min. In another form of this embodiment, the melt flow rate of the isotactic polypropylene is between 10 and 100 g/10 min. In yet another form of this embodiment, the total regio defects in the continuous propylene segments of the isotactic polypropylene is greater than 15 and less than 100 regio defects per 10,000 propylene units in the polymer chain, or greater than 30 and less than 100 regio defects per 10,000 propylene units in the polymer chain. In still yet another form or this embodiment, the DSC peak crystallization temperature of the isotactic polypropylene is greater than 109° C. In still yet another form or this embodiment, the isotactic polypropylene has a DSC peak melting temperature of 150° C. or higher, and a weight-averaged molecular weight of 35 kg/mol or higher, or 80 kg/mol or higher.

In yet another embodiment of the novel iPP-EP copolymer blends disclosed herein, the blend includes novel/differentiated isotactic polypropylene components in combination with novel/differentiated ethylene-propylene copolymer components. In particular, the blend includes between 1 and 50 wt % of isotactic polypropylene with a melt flow rate of between 0.5 and 20,000 g/10 min and a melting peak temperature of 145° C. or higher, and wherein the difference between the DSC peak melting and the peak crystallization temperatures is less than or equal to 0.5333 times the melting peak temperature minus 41.333° C., and between 50 and 99 wt % of ethylene-propylene copolymer including between 10 wt % and 20 wt % randomly distributed ethylene with a melt flow rate of between 0.5 and 20,000 g/10 min, wherein the copolymer is polymerized by a bulk homogeneous polymerization process, and wherein the total regio defects in the continuous propylene segments of the copolymer is between 40 and 150% greater than a copolymer of equivalent melt flow rate and wt % ethylene polymerized by a solution polymerization process. In another form of this embodiment, the melt flow rate of the isotactic polypropylene may be between 10 and 5,000 g/min, or 10 and 150 g/10 min, or 10 and 100 g/10 min. In another form of this embodiment, the total regio defects in the continuous propylene segments of the isotactic polypropylene may be greater than 15 and less than 100 regio defects per 10,000 propylene units in the polymer chain, or greater than 30 and less than 100 regio defects per 10,000 propylene units in the polymer chain. In another form of this embodiment, the DSC peak crystallization temperature of the isotactic polypropylene may be greater than 109° C. In another form of this embodiment, the isotactic polypropylene may have a DSC peak melting temperature of 150° C. or higher, and a weight-averaged molecular weight of 35 kg/mol or higher, or 80 kg/mol or higher. In another form of this embodiment, the total regio defects in the continuous propylene segments of the EP copolymer may best between 40 and 100% greater than a copolymer of equivalent melt flow rate and wt % ethylene polymerized by a solution polymerization process. In yet another form of this embodiment, the melt flow rate of the EP copolymer may be between 0.5 and 5,000 g/10 min. In still yet another form of this embodiment, the total regio defects in the continuous propylene segments of the EP copolymer may be greater than 0.50 mol %, or greater than 0.70 mol %. In still yet another form of this embodiment, the peak melting temperature of the EP copolymer may be between 35° and 80° C. The EP copolymer component may also optionally comprise between 0.5 wt % and 50 wt % of randomly distributed butene-1, pentene-1, hexene-1, octene-1, decene-1, or combinations thereof.

In another form, in-line iPP-EP copolymer blends are produced from propylene-based polymers made at homogeneous polymerization conditions, particularly at bulk homogeneous polymerization conditions, such as bulk homogeneous supercritical or bulk solution polymerization, and comprise the following:

(a) 10 to 20 wt % of isotactic polypropylene with 0.8 to 20,000 g/10 min MFR and melting peak temperatures of 80 to 165° C. plus 80 to 90 wt % crystallizable ethylene-propylene copolymer comprising 10 to 16 wt % ethylene content and 0.8 to 100 g/10 min M FR; or (b) 15 to 50 wt % of isotactic polypropylene with 0.8 to 20,000 g/10 min MFR and melting peak temperatures of 80 to 165° C. plus 50 to 85 wt % propylene copolymer of isotactic polypropylene crystallinity comprising 1 to 20 wt % ethylene and 0.8 to 100 g/10 min MFR; or (c) 10 to 30 wt % of isotactic polypropylene with 0.8 to 20,000 g/10 min MFR and melting peak temperatures of 80 to 165° C. plus 90 to 70 wt % low-crystallinity (0 to 30 J/g) EP copolymer with MFR of 0.8 to 500 g/10 min.

The novel iPP and EP copolymer blends produced by the fluid phase in-line blending process disclosed herein may be used to provide bi- or multi-modality to the distributions of the molecular characteristics of resins encompassed herein. The result of such bimodality is to produce an improved suite of properties in the blend as compared to any of the polymer components alone. Processing ease and melt strength may be improved by such blending as well as the balance between stiffness-toughness, heat resistance, tolerance of exposure to high energy radiation and other properties of the resins.

One non-limiting example of an iPP and EP copolymer blend made by the fluid phase in-line blending process disclosed herein includes a major fraction of a highly crystalline moderate molecular weight iPP and a minor fraction of a very high molecular weight, elastomeric EP copolymer with low or no inherent crystallinity. Another non-limiting example of a useful polymer blend made by the fluid phase in-line blending process disclosed herein includes a major fraction of a soft, tough, low melting EP copolymer with a minor fraction of a highly crystalline, high melting iPP. Still another non-limiting example of a useful iPP and EP copolymer blend made by the fluid phase in-line blending process disclosed herein includes a major fraction of a highly crystalline iPP with a minor fraction of a low or non-crystalline EP copolymer where the low or non-crystalline polymer is non-elastomeric.

Isotactic PP-EP Copolymer Blend Applications

The novel iPP and EP copolymer blends disclosed herein provide for improved properties, and hence may be used in any known thermoplastic or elastomer application. Non-limiting examples include uses in molded parts, films, tapes, sheets, tubing, hose, sheeting, wire and cable coating, adhesives, shoe soles, bumpers, gaskets, bellows, films, fibers, elastic fibers, nonwovens, spunbonds, sealants, surgical gowns and medical devices.

One such exemplary, but non-limiting application, is in medical applications requiring improved resistance to sterilizing doses of high-energy radiation. A polymer blend useful for this particular application may include from 75 to 99 wt % moderate molecular weight iPP blend component with 1 to 25 wt % of a propylene-ethylene copolymer containing from 8 to 16 wt % ethylene. The high propylene copolymer component of the blend provides superior initial ductility as well as retention of ductility and tolerance of the sterilizing radiation to the blend while the homopolymer component imparts excellent strength, stiffness and resistance to deformation at elevated temperature to the blend. Polymer blends of iPP blend component and propylene-ethylene copolymer are generally clearer or nearly as clear as the unblended iPP blend component.

Another exemplary, but non-limiting application of where the polymer blends made by the fluid phase in-line blending process disclosed herein find application is in various conversion processes. In particular, by combining high and low molecular weight propylene polymers in either similar or different proportion, the molecular weight distribution of the blend may be significantly broader than of either individual component. The ratio for blending the high and low molecular weight propylene polymers depends upon the desired final melt flow rate and molecular weight distribution. Such broader molecular weight distribution polymers are easier to extrusion blow mold, blow into film, thermoform, orient into film, and stretch blow mold than narrower molecular weight distribution polymers. Optionally, one of the polymer components can have long chain branching introduced through addition of a small quantity of alpha-omega-diene.

Still another exemplary, but non-limiting application of where the polymer blends made by the fluid phase in-line blending process disclosed herein find application is in devices and packaging materials requiring good impact resistance, and particularly in low temperature environments. Polymer blends useful for this particular application may include from 60 to 99 wt % of a stiff iPP blend component and/or a relatively stiff, low comonomer containing propylene copolymer and 1 to 40 wt % of a propylene copolymer containing 5 to 20 wt % of comonomer, or comonomer-propylene elastomer (like ethylene-propylene rubber). In applications requiring clarity, incorporating into the iPP and EP copolymer polymer blend a minor fraction of a highly compatible propylene copolymer known to have a minimal deleterious effect or even a positive effect on the clarity of blends with polypropylene may provide for such. Compatible propylene copolymers are exemplified by propylene-ethylene copolymers containing less than 16 wt %, less than 11 wt %, or less than 6 wt % ethylene units.

Still yet another exemplary, but non-limiting application of where the iPP and EP copolymer blends made by the fluid phase in-line blending process disclosed herein find application are those where materials requiring a combination of stiffness and impact resistance and/or a combination of heat resistance and impact resistance. A polymer blend useful for these applications are similar in composition to the blends specified for impact resistant devices and packages. More particularly, polymer blends useful for this particular application may include from 60 to 99 wt % of a stiff iPP blend component and/or a relatively to stiff, low comonomer containing propylene copolymer and 1 to 40 wt % of a propylene copolymer containing 5 to 20 wt % of ethylene comonomer, or comonomer-propylene elastomer (like ethylene-propylene rubber). The stiffness and heat resistance may be increased by increasing the homopolymer or stiff copolymer portion of the polymer blend. Correspondingly, the impact resistance may be improved by increasing the propylene copolymer or ethylene-propylene rubber portion of the blend. The desired balance of product attributes may be accomplished by a careful balancing of the two components.

Still yet another exemplary, but non-limiting application of where the iPP and EP copolymer blends made by the fluid phase in-line blending process disclosed herein find application are those where a device and/or package must be sterilized by high temperature and also must be soft and able to withstand impact abuse even at low temperatures. Polymer blends useful for this particular application may include from 75 to 99 wt % of one or more stiff iPP homopolymer and/or EP copolymer components and 1 to 25 wt % of one or more low to no crystallinity propylene copolymers, and ethylene-propylene rubbers. Where increasing softness of packages and device is desired, one may use a greater fraction of the one or more soft components in the blend and smaller fraction of the one or more stiff components in the blend. Polymer blends useful for this particular application may also include a major fraction of the soft components and minor fraction of the stiff components. Hence the range of iPP and EP copolymer blends may include 1 to 50 wt % of the stiff polymer component and 50 to 99 wt % of the soft polymer component.

Still yet another exemplary, but non-limiting application of where the iPP and EP copolymer blends made by the fluid phase in-line blending process disclosed herein find application are films which are required to melt and form a seal at relatively low elevated temperature yet still maintain integrity at much higher temperature. The range of blend compositions previously specified for soft, elevated temperature resistant devices and/or packages would apply for this particular type of film application. Similar relationships between competing properties and the relative usages of the relative components would also apply for this application. More particularly, a greater fraction of the stiff polymer component may increase the seal integrity at higher temperatures, whereas a greater fraction of the soft polymer component may improve seal formation at lower temperatures and seal strength at normal temperatures.

As will be appreciated by one skilled in the art of polymer engineering, variations to the aforementioned polymer blends and their advantageous applications may be made without deviating from the spirit of the polymer blends provided by fluid phase in-line blending process disclosed herein. Set forth below are further details for composition of matter, properties and methods of making the ethylene-propylene copolymer blend component and the isotactic polypropylene blend component previously described.

In-Line Blending Process Overview

The in-line blending processes disclosed herein relate to making the novel iPP-EP copolymer polymer blends disclosed above. In particular, disclosed herein are advantageous processes for direct in-line iPP-EP copolymer blend production in an integrated multi-reactor polymerization wherein the blending step is achieved downstream of the reactors in a separator-blending vessel (also referred to as the high-pressure separator, or as separator-blender). The production of polymer blends in the polymerization plant is facilitated when the polymer blend components are dissolved in the polymerization system since the small-molecule component(s), such as monomer(s) and optional solvent(s)/diluent(s) of the polymerization system reduce(s) viscosity thus allowing molecular level blending in a low shear process. Hence, using the reactor effluents wherein the polymer blending components are present in a dissolved fluid state may be advantageous to downstream blending operations. The polymerization reactors advantageously may be of the homogeneous supercritical process, the solution process type, or a combination thereof in order to provide the precursor polymer for blending in a dissolved fluid state in the direct reactor effluents suitable for in-line blending without further processing. Bulk homogeneous supercritical and bulk solution polymerization processes are particularly useful for producing blend components due to the simplicity of the monomer recycle loop and due to the enhancements in reactor productivity and product properties, such as molecular weight and melting behavior, as will become apparent from the following discussions. The processes disclosed herein can also utilize certain other polymerization reactors making in-line blend components, for example, in the form of a slurry, wherein the iPP or EP copolymer blend component form solid pellets in a dense fluid polymerization system. In such instances, a dissolution stage is added between the polymerization reactor train and the separator-blending vessel. This dissolution stage typically consists of a pump followed by a heater to bring the reactor effluent above the solid-fluid phase transition conditions affording a stream that contains the polymer blending component homogeneously dissolved in the dense fluid polymerization system. In order to facilitate the dissolution of the polymer pellets, increased shearing may be applied, which typically is provided by stirring or by pumping. Because of the added processing and investment costs of such reactor operations, homogeneous polymerization processes, such as homogeneous supercritical or solution polymerization, are typically cost-advantaged and thus advantageous to produce the in-line polymer blending components.

Figure 10:
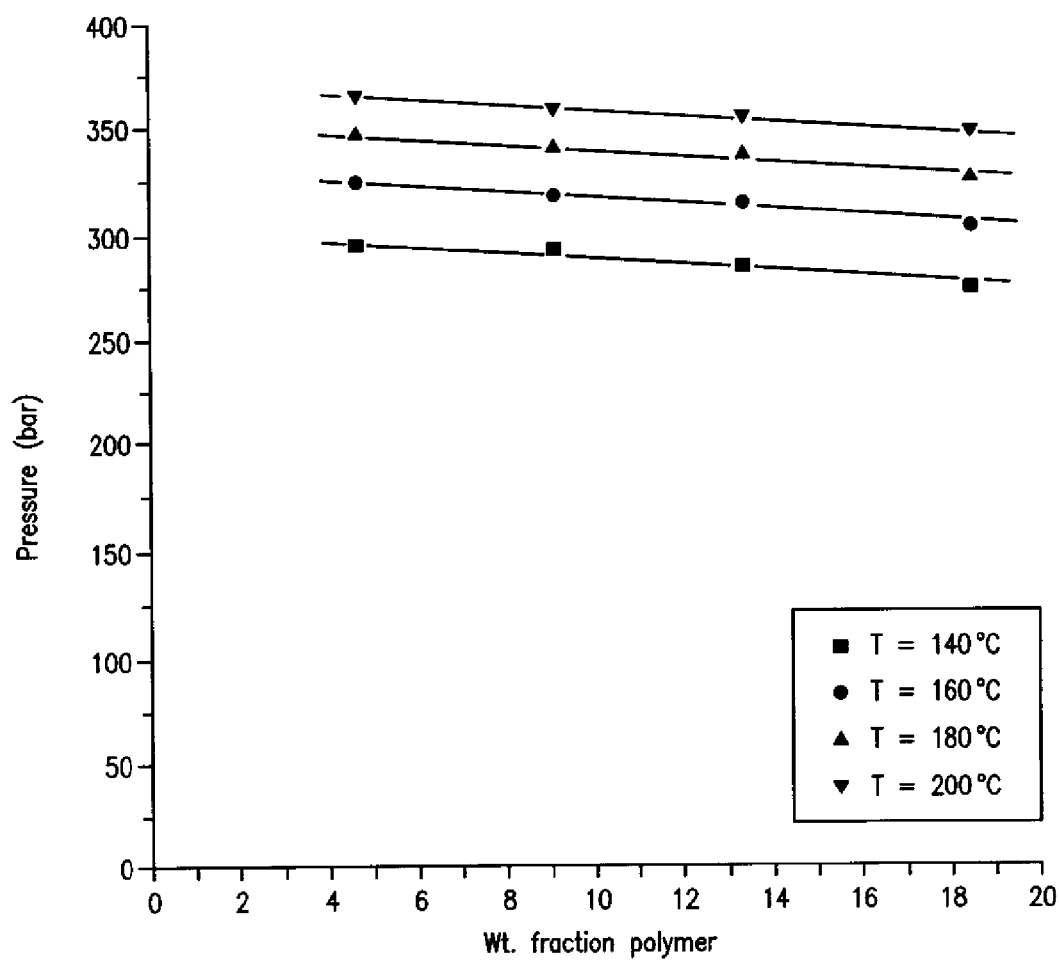
FIG. 10 presents cloud point isotherms for Polymer PP 4062 dissolved in bulk propylene.
Figure 11:
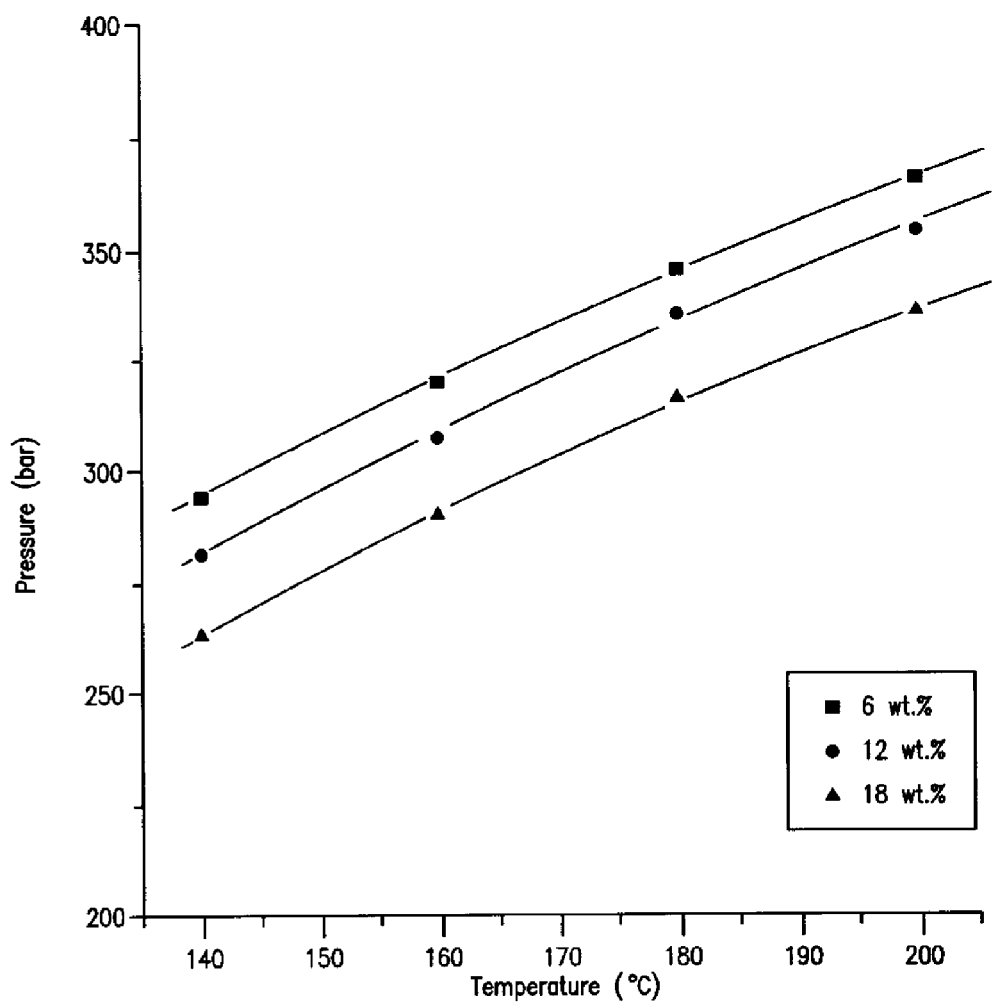
FIG. 11 presents cloud point isotherms for Polymer Achieve™ 1635 dissolved in bulk propylene.
Figure 12:
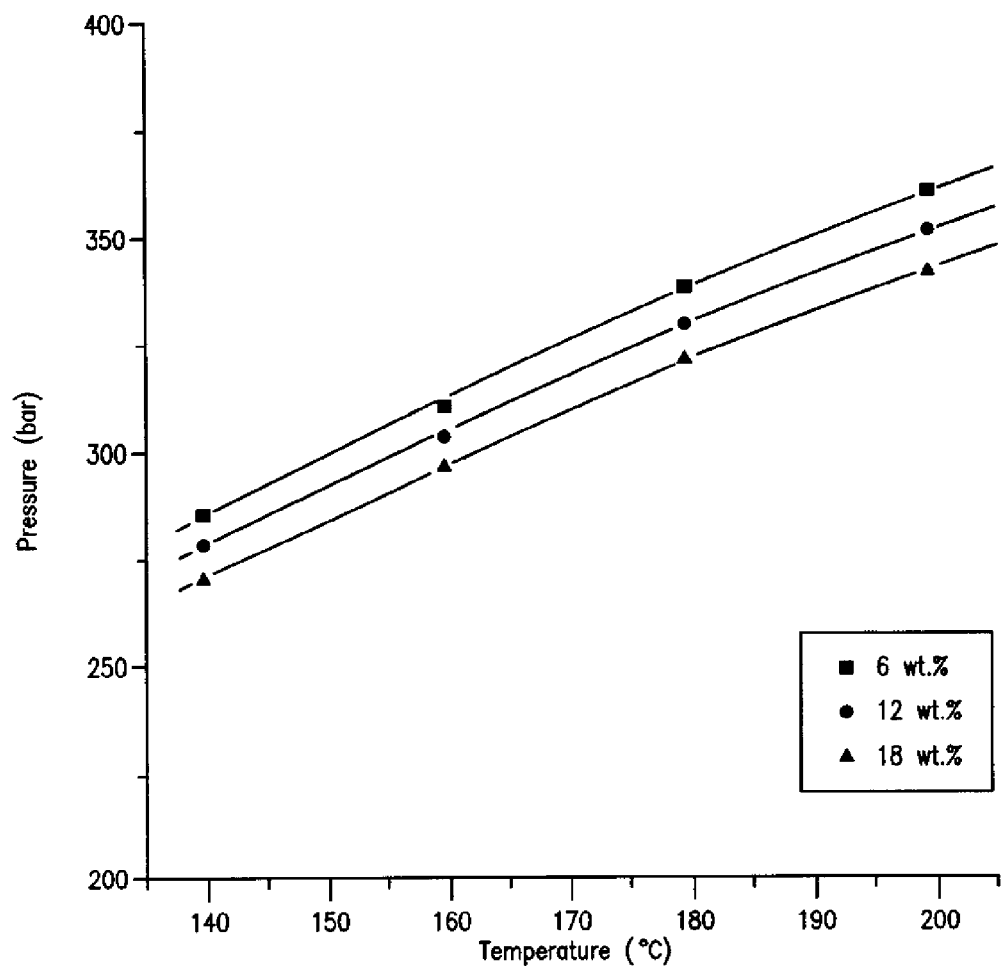
FIG. 12 presents cloud point isotherms for Polymer PP 45379 dissolved in bulk propylene.
Figure 13:
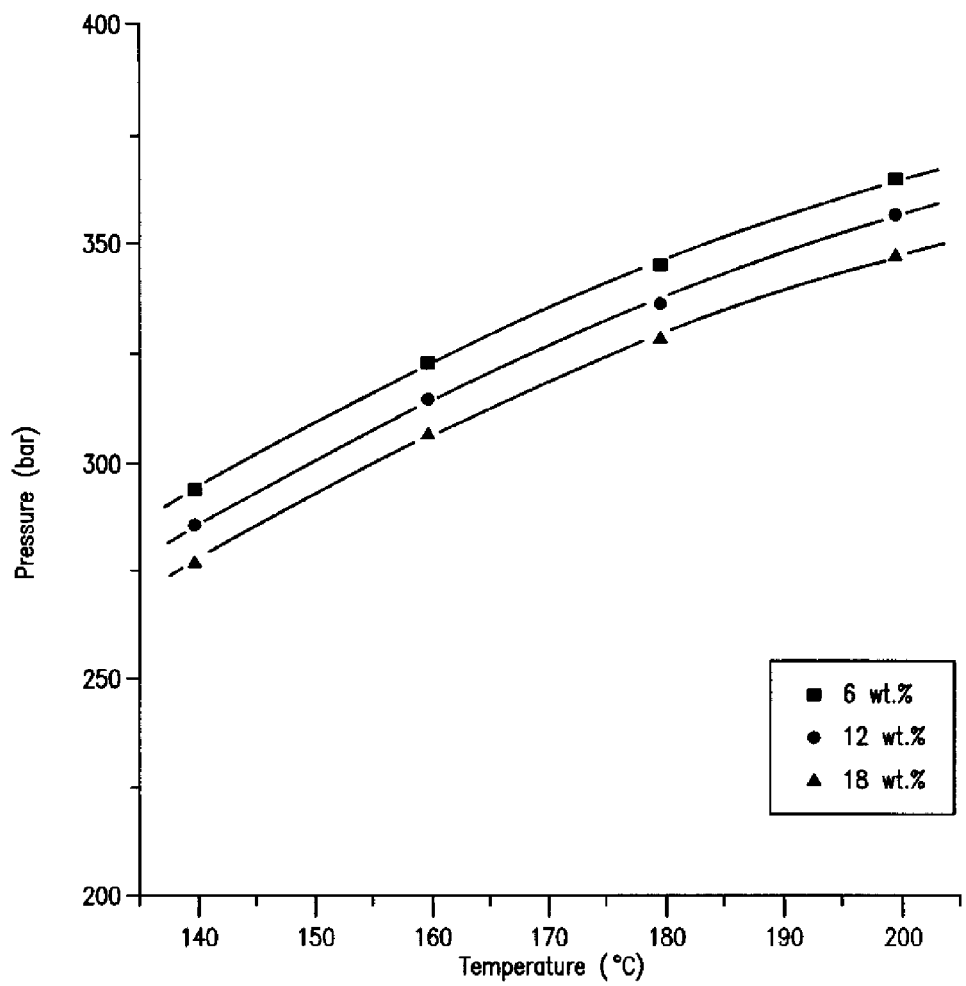
FIG. 13 presents cloud point isotherms for Polymer PP 4062 dissolved in bulk propylene.
Figure 14:
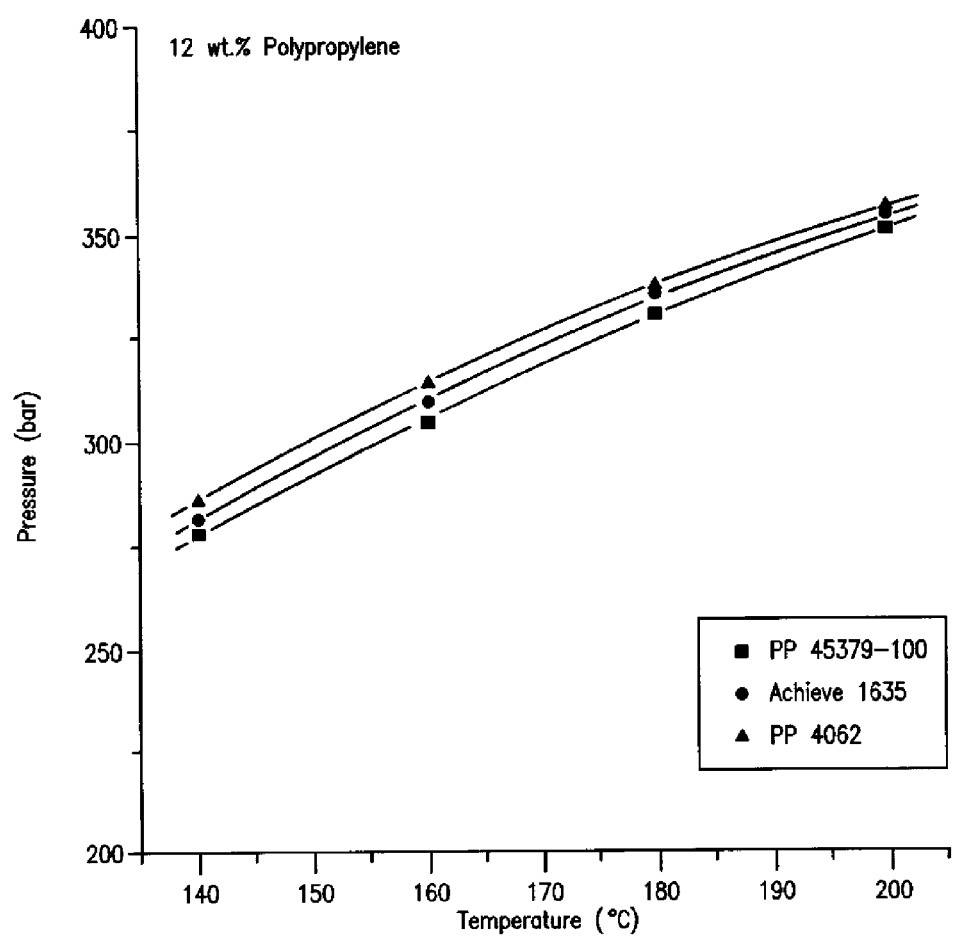
FIG. 14 presents a comparison of isopleths for PP 45379, Achieve™ 1635, and PP 4062 dissolved in bulk propylene.
Figure 15:
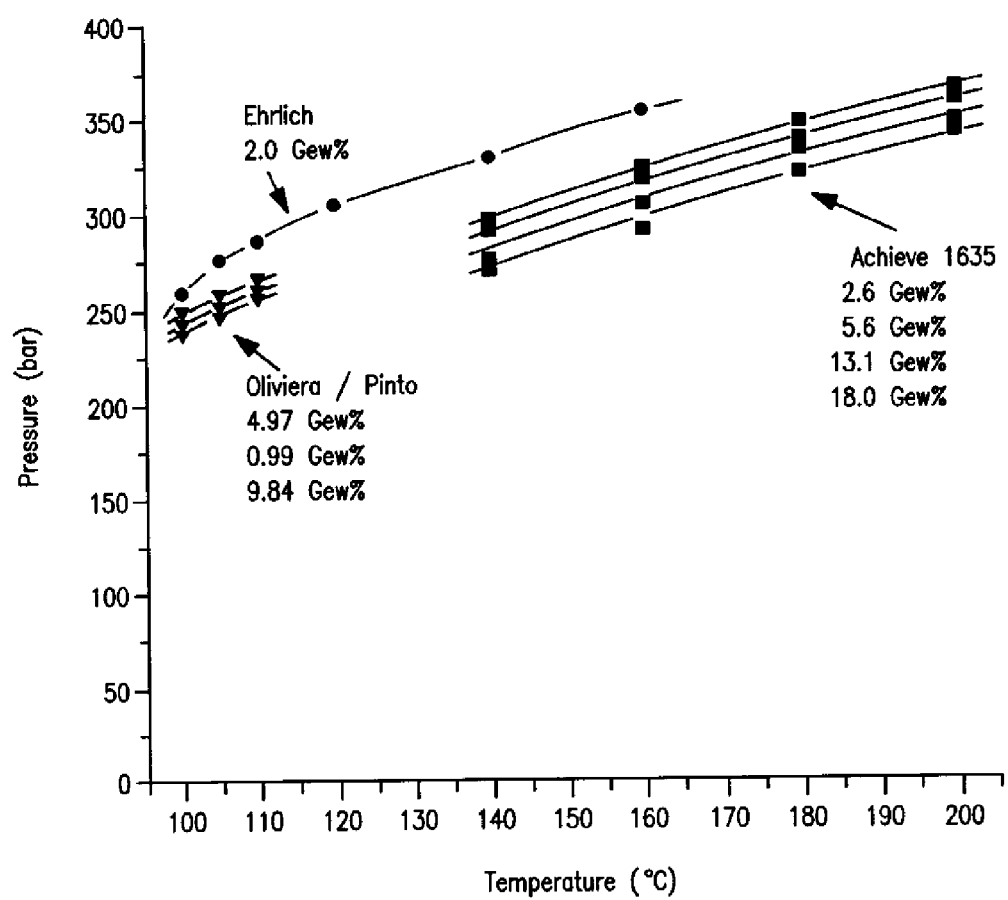
FIG. 15 presents a comparison of isopleths for Achieve™ 1635 and literature data as described in J. Vladimir Oliveira, C. Dariva and J. C. Pinto, Ind. Eng, Chem. Res. 29, 2000, 4627.
Figure 16:
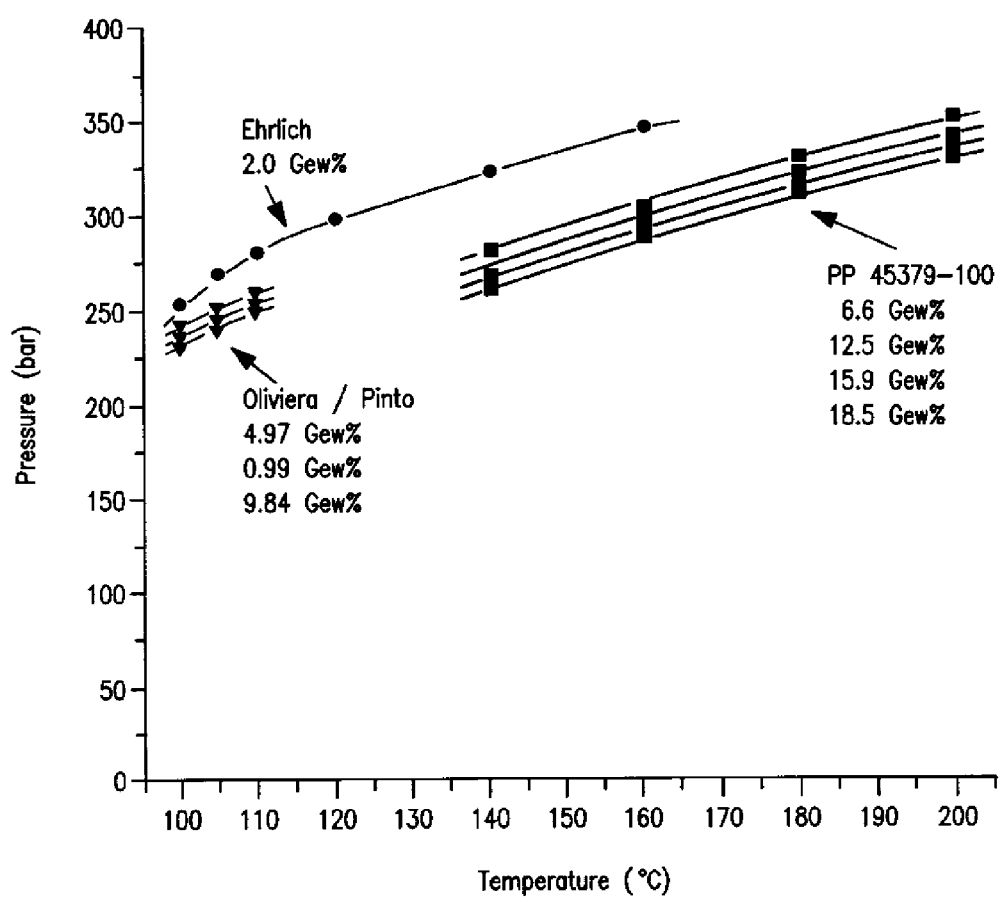
FIG. 16 presents a comparison of isopleths for PP 45379 and literature data as described in J. Vladimir Oliveira, C. Dariva and J. C. Pinto, Ind. Eng, Chem. Res. 29 (2000), 4627.
Figure 17:
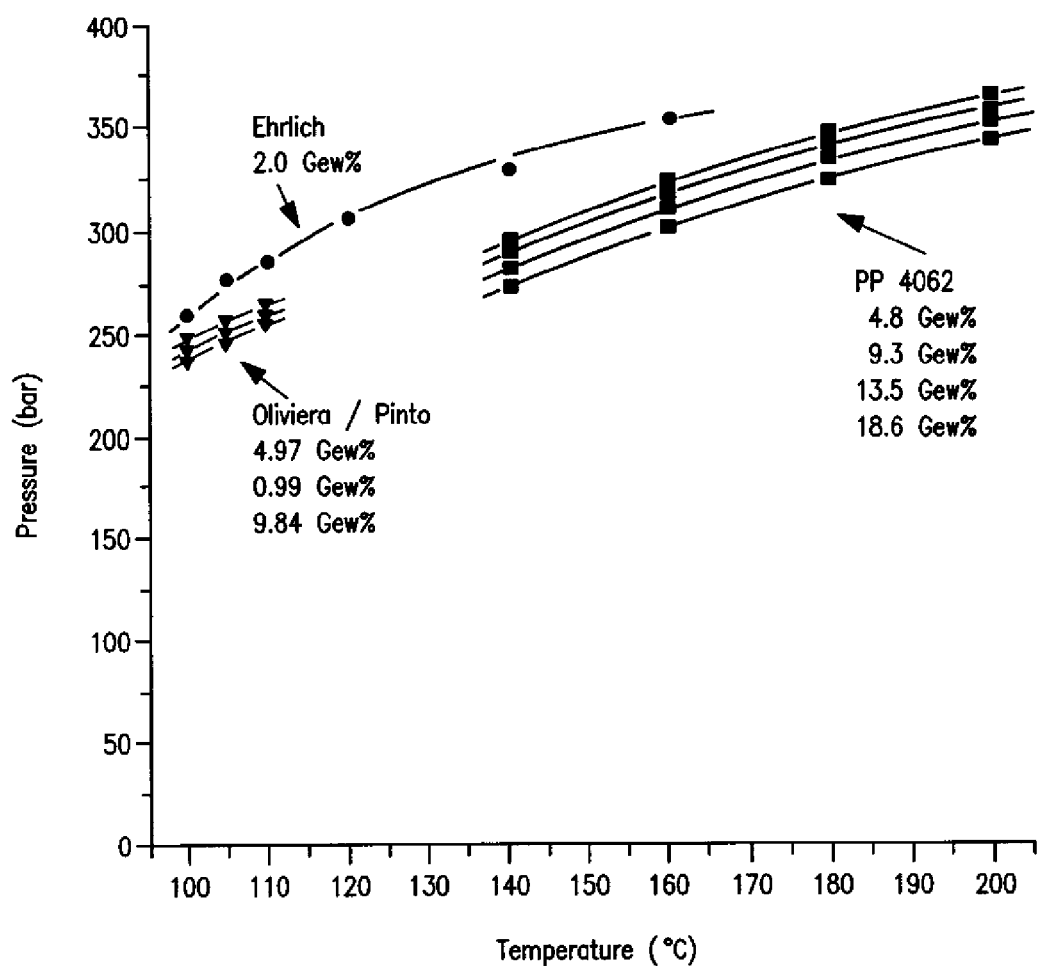
FIG. 17 presents a comparison of isopleths for PP 4062 and literature data as described in J. Vladimir Oliveira, C. Dariva and J. C. Pinto, Ind. Eng, Chem. Res. 29, 2000, 4627.
Figure 18:
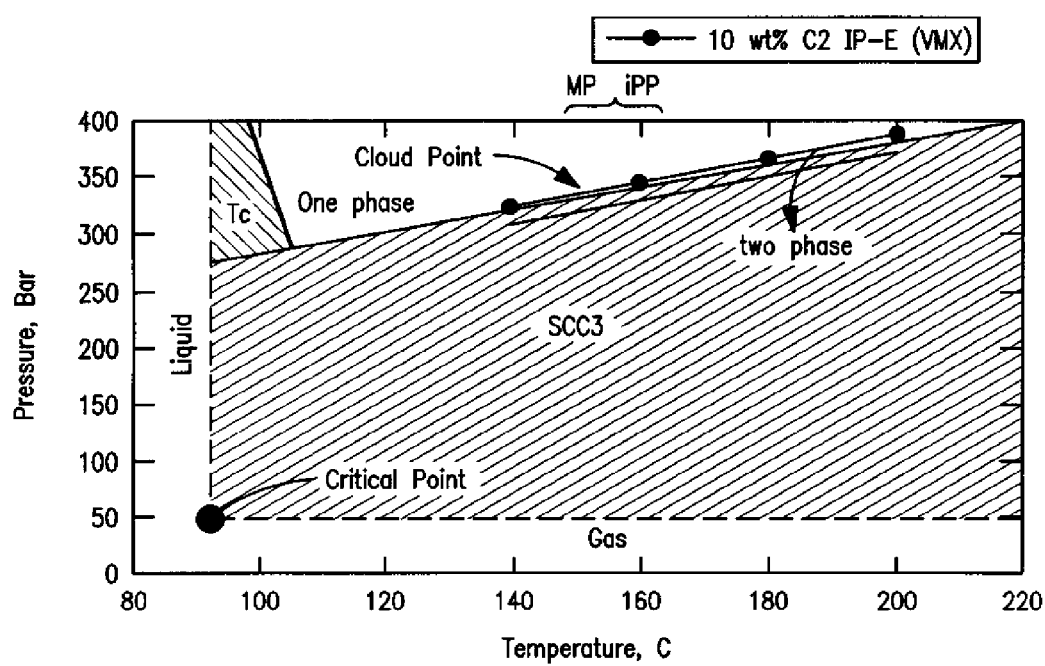
FIG. 18 presents a basic phase diagram for mixture of propylene monomer with selected polymers (isotactic polypropylene—iPP, syndiotactic polypropylene—sPP, atactic polypropylene—aPP, or propylene-ethylene copolymer)
Figure 19:
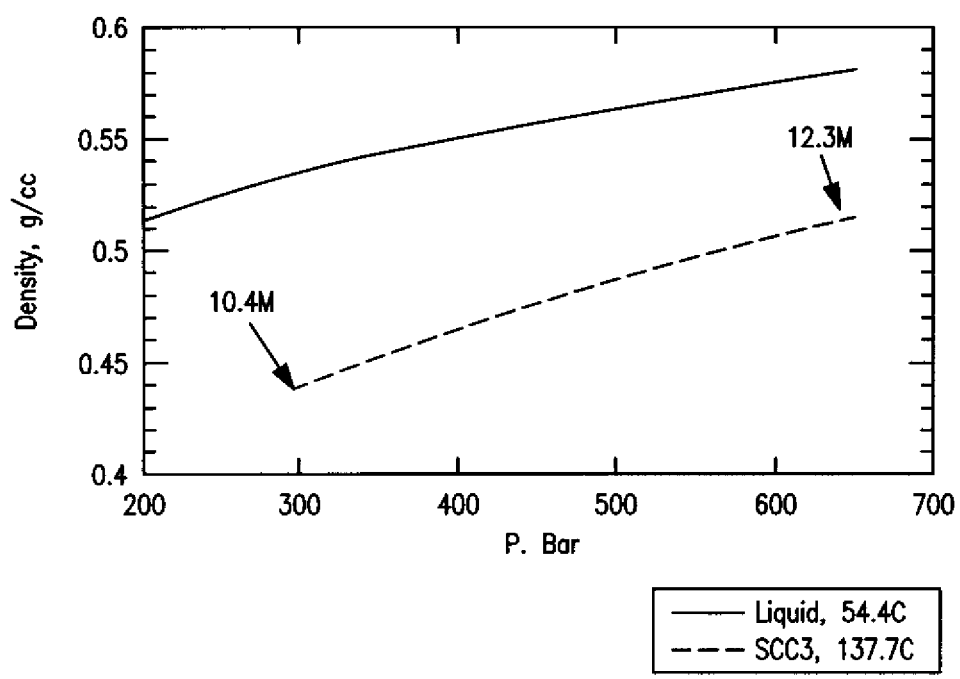
FIG. 19 presents a comparison of the density of supercritical propylene at 137.7° C. with liquid propylene at 54.4° C.

The in-line blending process for iPP-EP copolymer blends disclosed herein requires an upstream polymerization process that provides the two or more blend components in a homogeneous fluid state, wherein at least one of the blend components is in its supercritical state. Therefore, if the polymerization reaction for one component is carried out at conditions that form particles, such as, for example, slurry polymerization, an additional step is required to bring the in-line polymer blending component into a dissolved fluid state before feeding the polymer-containing stream to the separator-blender section of the invention to process (see FIG. 10). This can be accomplished by, for example, heating the reactor effluent above the solid-liquid phase transition temperature. However, for simpler and thus lower cost operations, the polymerization reaction is typically carried out at conditions where the product polymer(s) is/are dissolved in the dense fluid polymerization system comprising one or more monomers, the polymeric product(s), and—optionally—one or more inert solvents, and—optionally—one or more scavengers. Fluid-phase operations have some further advantages from certain product quality and operation stability perspectives since they do not require supported catalysts that significantly increase the ash level of the products and can cause fouling and excessive wear of downstream process hardware. The fluid reaction medium may form one single fluid phase or two fluid phases in the reactor. For more robust and simpler reactor operations, conditions affording a single fluid phase in the reactor, i.e. operating above the cloud point conditions, are advantageous.

In one embodiment of the iPP-EP copolymer blending processes disclosed herein, the blending of two or more reactor effluent streams containing the dissolved polymer blend components occurs simultaneously with product separation in a single downstream separator-H ending vessel. The separator-blender operates at conditions that lead to the formation of two fluid phases: the upper one essentially consisting of the low-molecular weight components of the polymerization systems, predominantly the monomer(s) and the optional solvent(s), while the lower one is a polymer-rich phase. In order to create the conditions that lead to the formation of two fluid phases in the separator-blender, the temperatures of the reactor effluents are often first increased to provide the heat for staying above the solid-fluid phase transition temperature of the to-be-formed polymer-rich fluid phase. After adjusting the heat contents of the reactor effluents, their pressures are typically reduced to bring the temperature and pressure of the combined effluent stream to a condition that corresponds to two fluid (liquid-liquid or supercritical fluid-supercritical fluid) phases in the phase diagram. The blending process may be aided by optional static mixer(s) downstream of the mixing point of the polymer-containing effluents but upstream of the separator-blending vessel. The homogeneous fluid blending of the individual polymer components and the separation of the monomer- and polymer-rich phases are accomplished in the same vessel eliminating the need for a separate blending vessel and blending process step. The bulk of the monomer(s) and the optional solvent(s) separated from the polymer is/are then recycled back into the polymerization reactor bank of the plant.

In another embodiment of the in-line iPP-EP copolymer blending processes disclosed herein, one or more reactor effluent streams containing the dissolved polymer blend components are fed to independent separators or separation vessels (also referred to as single-stream high-pressure separators) upstream of the separator-blending vessel for separation of a polymer-enriched stream from some fraction of the monomer and the optional solvent/diluent content of the said streams. Such single-stream high-pressure separators deployed upstream of the separator-blending vessel (high-pressure separator) in essence afford a partial recovery of the monomer and the optional solvent present in the reactor effluent thus allowing their recovery and recycle before being mixed with monomers and optional solvents used in other reactor trains. Such processes may be advantageous by eliminating the need for separating mixed monomer and optional solvent streams before recycling them to the appropriate reactor trains of the reactor bank. The polymer-enriched streams from each of these single-stream separators are blended in one of a separator vessels that serves both as a separator for one of the reactor trains and as a blender for the entire reactor bank (separator-blending vessel). In this embodiment, the operation conditions of the single-stream separator(s) upstream of the separator-blending vessel may be adjusted to yield polymer-enriched stream(s) that still contain(s) enough low molecular weight component(s), such as monomer(s) and optional inert solvent(s) to keep the viscosity of these streams much below that of the essentially pure molten polymer(s) thus facilitating the mixing of the blending polymer components in the separator-blender. The separator(s) feeding the separator-blending vessel may also serve as buffer vessel(s) affording an improved control of the blend ratio by compensating for the small but inevitable fluctuations in the production of the individual in-line blend components. The buffer capacity of these vessels is defined by the volume between the maximum and minimum levels of the separated polymer-enriched lower phase.

As opposed to using a cascade of series reactors for the in-line blending of iPP and EP copolymer, the blending processes disclosed herein provide for the individual iPP and EP copolymer components of the polymer blend to be made in a bank of parallel reactors. Such direct blend production may be advantageously achieved in polymerization processes that operate in a homogeneous dense fluid phase, i.e. above the fluid-solid phase transition limits. The inventive process has at least one reactor train that operates in the homogeneous dense fluid phase in its supercritical state. Polymerization processes that operate in a homogenous dense fluid phase use either inert solvent(s) or monomer(s) or their mixtures as a solvent/diluent in their liquid or supercritical state. Hence, such parallel reactors operate with polymerization systems in their homogeneous supercritical or in their liquid state. In both the supercritical and liquid operation modes, the process shall be a bulk polymerization process operating with less than 40 wt %, or less than 30 wt %, or less than 20 wt %, or less than 10 wt %, or less than 5 wt % of inert solvent present in the reactor, and in some embodiments, essentially free (less than 1 wt %) of inert solvents. In one embodiment of the disclosed process, the reactors operate at bulk homogeneous supercritical conditions as has been disclosed in U.S. patent application Ser. Nos. 11/433,889 and 11/177,004, herein incorporated by reference in their entirety.

In another embodiment, one or more of the reactors included in the parallel bank of reactors operate in the homogeneous supercritical state and one or more of the reactors included in the parallel bank of reactors operate in the bulk solution state (combination of bulk solution process and homogeneous supercritical process reactors). Both solution and homogeneous supercritical polymerization processes provide polymers dissolved in a fluid state, which is required for the downstream in-line blending of polymers. Both solution and homogeneous supercritical polymerization processes providing polymers in a homogeneous fluid state may be performed in a bulk monomer phase using essentially pure monomer(s) as solvent. The solution process provides for a polymer-containing liquid phase either in an inert solvent or in the essentially neat monomer or in their mixture in their liquid state. The homogeneous supercritical process provides for the polymeric fluid state by dissolving the polymeric product either in an inert solvent or in the essentially neat monomer or in their mixture in their supercritical state.

In another embodiment, one or more reactors included in the parallel reactor bank operate in homogeneous supercritical mode and one or more reactor trains operate in the slurry mode (combination of slurry and homogeneous supercritical or combination of slurry and solution processes). The dense fluid phase(s) of the slurry polymerization process(es) deployed in one or more trains of the invention in-line blending process can be either in its/their liquid or in its/their supercritical state. Before bringing the effluent(s) of the slurry train(s) to the separator-blending vessel (high-pressure separator) of the in-line blending process of the invention, the effluents are treated to fully dissolve the slurried polymer blend component. Aside this dissolution step, the other aspects of the in-line blending process disclosed herein are not affected by having particle-forming polymerization reactors in the reactor bank. This embodiment may provide product advantages in certain applications due to the ability of the slurry process to produce certain highly crystalline isotactic PP blend components, such as isotactic polypropylene made with Ziegler-Natta catalysts. It is, however, typically more expensive due to the added processing and investment cost. The optimal choice between the different reactor configurations of the invention process depends on the target product slate or even on some production site-specific issues, like, for example, the utilization of existing polymerization facilities. The optimal configuration can be determined by standard techniques well known in the art of chemical engineering.

The parallel reactor configuration disclosed herein permits for flexibility in independently controlling for each reactor the residence time, monomer composition and conversion, catalyst choice, and catalyst concentration not available in a series reactor configuration for blending of iPP and EP copolymer blend components. It also makes the independent control of reaction temperature and pressure easier thus enhancing the control of the polymerization processes yielding the individual in-line iPP and EP copolymer blend components.

U.S. patent application Ser. Nos. 11/433,889 and 11/177,004 disclose a flexible homogeneous polymerization platform for the homogeneous supercritical propylene polymerization process (also referred to herein as the "supercritical process"). In the referred supercritical propylene polymerization process, polymerization is carried out in a substantially supercritical monomer medium, thus it is a bulk homogeneous supercritical polymerization process. The polymer is in a homogeneously dissolved state in the reactor and in the reactor effluent thus making the reactor effluent suitable for a direct downstream blending operation prior to recovering the polymeric products in their solid pelletized or baled form, U.S. patent application Ser. Nos. 11/433,889 and 11/177,004 also teach that the supercritical polymerization process provides an advantageous means to the so-called solution processes in its ability to produce highly crystalline, high molecular weight (i.e. low melt-flow rate) isotactic iPP blend components. Unlike gas phase and slurry polymerization processes, the supercritical process may also produce ethylene-propylene copolymers and iPP blend components with reduced tacticity, and thus reduced polymer melting point without fouling. As previously referenced, U.S. patent application Ser. Nos. 11/433,889 and 11/177,004 are incorporated by reference in their entirety herein.

Advantageous iPP-EP copolymer blends are often composed of a blend of (a) highly crystalline component(s) and (a) low crystallinity component(s). Slurry and gas phase polymerization processes may provide for high molecular weight, highly crystalline polymers, but not for low crystallinity products because the polymer pellets stick together causing fouling of the reactor. Fouling often makes the production of soft materials, such as, for example, ethylene propylene copolymers commercially impractical, particularly when the ethylene content exceeds approximately 9 to 10 wt %. In contrast, solution polymerization processes has no such limitation and may provide for low crystallinity products because the polymer is present in solution in the reactor, and therefore cannot foul it. However, the solution process has limitations in producing highly crystalline, high molecular weight products with higher melting point. One particularly relevant limitation of the solution process is that it typically cannot produce high MW products that also have high melting point, and if it could, such products tend to crystallize in the reactor and cause fouling. In contrast, the homogeneous supercritical process may provide for both high crystallinity/high melting point and low crystallinity/low melting point polymers without fouling. It also generates the polymer blend components in a dissolved state in the polymerization system allowing direct blending without the need for a dissolution step. These attributes make it a particularly advantageous polymerization process for the in-line iPP-EP copolymer blending processes disclosed herein. Notwithstanding, any combination of polymerization processes operating with dense polymerization systems may be deployed in the in-line blending processes disclosed herein as long as at least one of the reactor trains operates with a homogeneous polymerization system. Homogeneous operation is ensured by operating above the solid-fluid phase transition point, advantageously not lower than 10 MPa below the cloud point of the polymerization system.

The monomers for use in the bank of parallel reactors disclosed herein are propylene, ethylene, and optional one or more comonomers comprising four or more carbon atoms. Non-limiting exemplary optional one or more comonomers comprising four or more carbon atoms include butene-1, pentene-1, hexene-1, octene-1, decene-1, dodecene-1, and combinations thereof. Exemplary, but not limiting, non-polymerizing (inert) fluid components serving as diluents/solvents include light paraffinic and aromatic hydrocarbons and their blends, such as butanes, pentanes, hexanes, heptanes, octanes, toluene, xylenes, cyclopentane, cyclohexane, fluorocarbons, hydrofluorocarbons, etc.

The conditions in the polymerization reactors of the aforementioned olefin polymerization process may be established such that the entire reactor content, including the monomer(s), optional non-polymerizing fluid, catalyst system(s), optional scavenger(s) and polymeric products, is in a homogeneous fluid, and advantageously in a single homogeneous fluid state. In one form, the conditions in at least one of the reactors of the aforementioned process are set such that the contents are in their supercritical fluid state, and advantageously in a single homogeneous supercritical fluid state.

The upper limit for temperature is determined by the product properties that are strongly influenced by the reaction temperature. Since often polymers with higher molecular weights and/or higher melting points are desired, high polymerization temperatures (>250° C.) are generally not advantageous. Increased temperatures can also degrade most known catalytic systems, providing another reason for avoiding excessive polymerization temperatures. At the current state of the art of polymerization, polymerization temperatures above 350° C. are not recommended. For the slurry polymerization processes, the upper temperature limits of polymerization are also influenced by the solid-fluid phase transition conditions since running near the solid-fluid phase transition line leads to fouling. For that reason, slurry operations not higher than 5° C. below the solid-fluid phase transition are advantageous, not higher than 10° C. below the solid-fluid phase transition are particularly advantageous.

The lower limits of reaction temperature are determined by the desired polymer properties. Lower temperatures generally favor higher crystallinity and higher molecular weight. For homogeneous polymerization processes, the lower limits of reaction temperature are also determined by the solid-fluid phase transition temperature. Running the reactors below the solid fluid phase transition temperature of the reaction mixture may lead to operation problems clue to fouling. For the production of highly crystalline polypropylenes (melting peak temperatures >150° C.) in bulk homogeneous supercritical polymerization processes, the minimum operating temperature is about 95 to 100° C. In the production of lower melting copolymers, such as ethylene propylene copolymers, significantly lower reactor temperatures, e.g., 90° C. or even lower, may be readily used without fouling. The application of certain inert solvents may further reduce the minimum operation temperature of the fouling-free operation regime, although, as discussed earlier, the substantial presence of inert solvents also tends to limit the product molecular weight and often the melting peak temperature. It also increases production cost due to the need for solvent handling.

The critical temperature and pressure of the polymerization systems are different from the critical values of pure components, and thus supercritical operations at temperatures lower than the critical temperature of pure propylene and $C_4$ plus monomers (e.g., 92° C. for propylene) are possible and disclosed herein. Additionally, near-amorphous and amorphous materials with low melting points may be produced without fouling even below the critical temperature of the reactor blends, i.e., at temperatures that correspond to the condensed liquid state of the polymerization system in the reactor. In these instances, the operation temperature may be below the bubble point of the reaction mixture and thus the reactor operates at what is often referred to as liquid-filled conditions. In some instances, such operation mode could be desired to achieve high molecular weight (MW) and thus low melt flow rate (MFR), particularly in the manufacture of copolymers, such as propylene-ethylene copolymers. Thus, reactor operations under conditions at which the polymeric products are dissolved in the monomer or monomer blend present in its liquid state, also known as bulk solution polymerization, are also disclosed herein.

Total Monomer Conversion for Homogeneous Fluid Phase Polymerizations:

Increasing the conversion of the total monomer feed in a single-pass in the individual reactor trains of the parallel reactor bank can reduce the monomer recycle ratio thus can reduce the cost of monomer recycle. Increasing monomer recycle ratios (i.e., the ratio of recycled/total monomer feed to the reactor train) require the treatment and recycle of larger monomer volumes per unit polymer production, which increases production cost. Therefore, higher monomer conversion (lower recycle ratios) often provides for improved process economics. However, because high polymer content in the polymerization system, particularly in homogeneous polymerization systems, yields high viscosities, which correspondingly may make reactor mixing, heat transfer, and downstream product handling difficult, the monomer conversion in a single pass has practical operation limits. The viscosity of monomer-polymer blends and thus the practical conversion limits can be readily established by standard engineering methods known in the art (M. Kinzl, G. Luft, R. Horst, B. A. Wolf, J. Rheol. 47 (2003) 869). Single-pass conversions also depend on operating conditions and product properties. Therefore, monomer conversion may also be constrained by the desire to increase the molecular weight of the blend component made in the given reactor train. Exemplary, but not limiting, total monomer single pass conversions are below 90%, more particularly below 80% and still more particularly below 60%. Total monomer conversion is defined as the weight of polymer made in a reactor or in a reactor train divided by the combined weight of monomers and comonomers in the feed to the reactor or reactor train. It should be understood that while high total monomer conversion is often limited by product viscosity or by product property targets, the conversion of some highly reactive monomer components present in some monomer feed blends may be higher than 90%. For example, the single-pass conversion of ethylene in ethylene-propylene or in ethylene-higher olefin feed blends may be nearly complete (approaching 100%) and is disclosed herein.

As mentioned above, another factor limiting the total monomer conversion is the MW-decreasing effect of conversion. Therefore, the production of polymer blend components with high MW requires the moderation of monomer conversion in a single pass beyond that of what viscosity and other practical operation considerations would dictate. Hence, for the production of blend components with high molecular weight (particularly those with higher than >200 kg/mol weight-averaged molecular weight $-M_w$), the total monomer conversion may need to be below 30%. Again, the conversion of some highly reactive components in a monomer feed blend may be higher, and may even approach 100%.

The single-pass conversion in the polymerization reactors disclosed herein may be adjusted by the combination of catalyst concentration and total feed flow rate. The total feed rate determines the average residence time (in a back-mixed reactor equal to the reactor volume divided by the total volumetric flow rate of the effluent). The same conversion may be achieved at lower residence time by increasing the catalyst concentration in the feed and vice versa. Lower catalyst concentration may reduce catalyst cost, but may also reduce volumetric productivity thus requiring higher residence times, and ultimately a larger reactor and thus higher investment cost for the same polymer production capacity. The optimum balance between residence time/reactor volumes and catalyst concentration may be determined by standard engineering methods known in the art. A wide-range of iPP and EP copolymer blend components may be produced in the reactors disclosed herein at reactor residence times ranging from 1 sec to 120 min, particularly from 1 sec to 60 min, more particularly from 5 sec to 30 min, still more particularly from 30 sec to 30 min, and yet still more particularly from 1 min to 30 min. In yet another form of the in-line blending process embodiments disclosed herein, the residence time in the reactors disclosed herein may be less than 120, or less than 60, or less than 30, or less than 20, or less than 10, or less than 5, or less than 1 minute(s).

In certain embodiments, at least one of the reactor trains of the disclosed process operates at supercritical conditions advantageously at homogeneous supercritical conditions, or bulk homogeneous supercritical conditions. The residence times in the supercritical polymerization reactors, particularly in the bulk homogeneous supercritical reactors disclosed herein are generally lower than the residence times in solution, gas phase, and slurry processes due to the high reaction rates achieved at the conditions of the supercritical polymerization process. In-line blending processes disclosed herein applying bulk homogeneous supercritical polymerization often choose residence times between 1 and 60 min, and more particularly between 1 and 30 min.

The polymerization reactors of the in-line blending processes disclosed herein may be grouped into reactor(s) making a single blending component, called the reactor train. The reactors of the parallel reactor trains producing all the polymer blend components are referred to as reactor bank. The reactors in the individual trains and in the entire bank can be of any type useful for making polymers (for a review of different polymerization reactors see Reactor Technology by B. L. Tanny in the Encyclopedia of Polymer Sci. and Eng., Vol. 14, H. F. Mark et al., Eds., Wiley, New York, 1988, and J B P Soares, L C Simon in the HANDBOOK OF POLYMER REACTION ENGINEERING, T. Meyer and J. Keurenties, Eds., Wiley-VCH, Weinheim, 2005, p. 365-430.) and can be constructed the same way or can be different. The optimal reactor type and configuration can be determined by standard techniques well known in the art of polymer reactor engineering.

It should be recognized that the catalytic activity and thus the volumetric productivity in the individual reactors may be different. If the reactor effluents for in-line blending are directly blended, the catalytic activity and the volumetric productivity may determine the reactor sizes required for the production of the individual polymer blend components. In order to reduce cost, a single plant may need to produce several polymer blends with different polymer components blended over a range of blend ratios. Consequently, a parallel reactor bank will often have reactors of different sizes allowing for a flexible and thus more cost effective configuration for the production of different polymer blend grades. The optimal reactor volumes may be determined from the combination of the composition of the target polymer blends and the volumetric reactor productivity data using optimization methods known in the art of chemical engineering.

In commercial practice, reactor productivity tends to vary to some degree, which in turn may lead to the corresponding level of variability in polymer blend ratios. In one embodiment, buffer tanks may be added to the process downstream of the reactors comprising the bank of parallel reactors, but before the polymer mixing or blending point to compensate for the fluctuations of the volumetric productivity in each reactor train producing the individual blend components (see for example FIG. 4). The buffer tanks may improve the compositional control of the final product blends by homogenizing the individual reactor effluents and by allowing a more independent metering of the polymer blend components. When an individual reactor train effluent is stored in the buffer tank in its liquid state at a pressure below its bubble point, essentially the entire volume of the buffer tank is available for compensating for the differences in the blending and production rates. However, when the individual reactor effluent is stored in the buffer tank in its supercritical state or in its liquid state but at pressures above its bubble point, the dense liquid or supercritical fluid fills the entire tank. In such operation modes, the buffering capacity, i.e. the capacity to deviate from the instant reactor flow rate, is more limited and is associated with the pressure/density changes allowed in the buffer tank and with the size of the buffer tank. In the latter case, the process streams may be driven by a gradual pressure drop downstream of the reactor to avoid the cost of installing and operating booster pumps. However, booster pumps may be alternatively installed and operated within the process to increase the pressure range and thus the buffering capacity of the system. When no booster pumps are deployed, the pressure of the buffer tank should be lower than that of the reactor, but higher than that of the lines downstream of the blending point.

Apparently, while feasible, controlling this kind of buffer system is difficult and it is not very efficient. Thus, in another embodiment, when the individual reactor effluent is stored in the buffer tank in its supercritical state or in its liquid state but at pressures above its bubble point, the conditions in the buffer tanks may be set to achieve fluid-fluid phase separation (separator-buffer tank operation). Buffering in this mode can be achieved by allowing the fluid level of the denser polymer-rich phase to move up and down between the minimum and maximum levels allowed for the desired level of separation while taking the monomer-rich upper phase out of the separator buffer via a pressure control valve. One skilled in the art can see that this operation mode is analogous to the operation of a buffer tank filled with a liquid phase containing the polymeric product and a vapor phase containing the more volatile components, such as monomer(s) and solvent(s). In the supercritical regime, the upper phase is a polymer-lean supercritical fluid, while the lower phase is a polymer-rich supercritical fluid, the latter of which can be withdrawn for blending at a controlled rate required for making a constant blend ratio, independent of the short-term fluctuations in the production ratios of the individual blend components. A similar analogy may be derived for liquid-filled operations. The polymer content, and thus the viscosity of the polymer-rich phase can be controlled by properly adjusting the temperature at constant pressure or by adjusting the pressure at constant temperature in the separator-buffer tank(s). In this embodiment, the polymer-rich effluent(s) of the separator-buffer tank(s) are combined with the direct, unseparated effluent of one of the reactor trains upstream of the separator-blending vessel that recovers the monomer of the direct reactor effluent as a supernatant and the in-line polymer blend as the bottom phase. In this particular embodiment, one of the separators serves as a separator-blender, while the rest of the separators serve as separator-buffers.

In another embodiment of the processes disclosed herein, polymer additives may be added to the iPP-EP copolymer blend at ratios of up to 40 wt %, or up to 30 wt %, or up to 20 wt %, or up to 10 wt %, or up to 5 wt % to further improve product quality and product properties. Exemplary, but not limiting polymer additives, include specialty polymers including polar polymers, waxes, polyalfaolefins, antioxidants, plasticizers, clarifiers, slip agents, flame retardants, heat and uv stabilizers, antiblocking agents, fillers, reinforcing fibers, antistatic agents, lubricating agents, coloring agents, foaming agents, tackifiers, organically modified clays such as are available from Southern Clay, and masterbatches containing above components. Hence, one or more polymer additive storage tanks containing liquid, molten, or dissolved polymer components and polymer additives may be added to the processes disclosed herein. If solvent(s) is used in these polymer additive storage tanks, it may be advantageously the same as used in the polymerization reactors previously described in order to avoid an increase in separation costs in the solvent recovery and recycle section of the process. For example, when the polymer synthesis process is performed in supercritical propylene, the off-line produced polymer additives may also be advantageously, dissolved in supercritical propylene. However, other solvent(s) or solvent-free introduction may be used with the polymer additives. Solvent-free introduction of the polymer additive components may be used when the additive component is brought into its molten state or when the additive component is a liquid at ambient temperatures.

The homogeneous supercritical polymerization and the solution polymerization processes are particularly suitable for providing the product polymer in a dissolved fluid state. In one particular embodiment, the supercritical polymerization process is performed in the substantial absence of an inert solvent/diluent (bulk homogeneous supercritical polymerization) and provides the product in a dissolved supercritical state for the downstream in-line separation-blending process. More particularly, the supercritical polymerization of propylene is performed in the substantial absence of an inert solvent/diluent (bulk homogeneous supercritical propylene polymerization) and provides the product in a dissolved supercritical state for the downstream in-line separation-blending process.

The total amount of inert solvents is generally not more than 40 wt % in the reactor feeds of the invention process. In some embodiments, where the feed essentially comprises the monomer or monomer blend, like for example, bulk slurry, or bulk supercritical, or bulk solution polymerizations, the minimization of solvent use is desired to reduce the cost of monomer recycling. In these cases, the typical solvent concentration in the reactor feed is often below 40 wt %, or below 30 wt %, or below 20 wt %, or below 10 wt %, or below 5 wt %, or even below 1 wt %. In one form disclosed herein, the polymerization system comprises less than 20 wt % aromatic hydrocarbons and advantageously less than 20 wt % toluene. In another form disclosed herein, the polymerization system comprises less than 40 wt %, or less than 30 wt %, or less than 20 wt % saturated aliphatic hydrocarbons and advantageously less than 40 wt %, or less than 30 wt %, or less than 20 wt % of decanes, or nonanes, or octanes, or heptanes, or hexanes, or pentanes, or butanes, or propane, or their mixtures.

Fluid Phase In-Line Blending Process Configuration

The fluid phase in-line iPP-EP copolymer blending process disclosed herein may have different detailed process configurations. For example, the number of parallel reactor trains and their configurations in the parallel reactor bank may be varied. Typically, each reactor train serves to produce either the iPP or the EP copolymer blend component. A given train of the parallel reactor bank may be configured as a single reactor or two or more reactors in series. From a practical commercial plant design standpoint, however, there should be a minimum number of reactors for a given train of the parallel reactor bank in order to make a given polymer blend component. Generally, not more than ten series reactors are utilized and more particularly not more than three series reactors are generally utilized in a given reactor train. The number of parallel trains in the parallel reactor bank may be two, three, four or five or more. The number of reactors in the parallel reactor bank may be any number, although for economic reasons the number of reactors should be maintained as low as the desired product grade slate and plant capacity allows. The optimum number of parallel reactor trains (also referred to as legs of the reactor bank) may be determined by standard chemical engineering optimization methods well known in the art. Most typically, the polymerization-blending plant will have two or three parallel polymerization reactor trains or legs in the reactor bank producing product blends with the corresponding number of in-line polymer blend components. However, more than three parallel reactors/legs may be employed if the production of the target product blends so requires. Besides the in-line polymer blend components, the final polymer blends often contain additives and modifiers that are not produced within the same polymerization process. Therefore, it should be understood that the number of components in the final product blend typically is higher than the number of reactor trains or the number of in-line polymer blend components.

The fluid phase in-line iPP-EP copolymer blending process disclosed herein may also optionally incorporate other polymers, and polymer additives that were produced outside the reactor bank of the processes disclosed herein. The optional other polymer and polymer additive components may first be transferred into solution or molten fluid state before being blended with the in-line produced polymer blend components. These other polymer and polymer additive components may be stored in polymer additive storage tanks containing liquid, molten, or dissolved polymer components and polymer additives prior to being transferred and metered to the separation-blending vessel or to a mixing point upstream or downstream of the separation-blending vessel, Polymer and polymer additive components may be accurately metered to the blending vessel or to another mixing point by one or more pumps or if the downstream pressure is lower, through the use of one or more pressure letdown valves. The optional additives and modifiers can be mixed into the product upstream of or directly in the separator-blending vessel or downstream of the separator-blending vessel of the processes disclosed herein. In order to simplify monomer treatment in the monomer recycle train and thus to reduce the cost of monomer recycle, it is often advantageous to add the additives and modifiers downstream of the separator-blending vessel. In such embodiments, the additives and modifiers may be mixed with the in-line produced polymer blend in dedicated pieces of equipment or in the hardware of the product finishing section of the processes disclosed herein, for example, in the devolatizer extruders.

Figure 2:
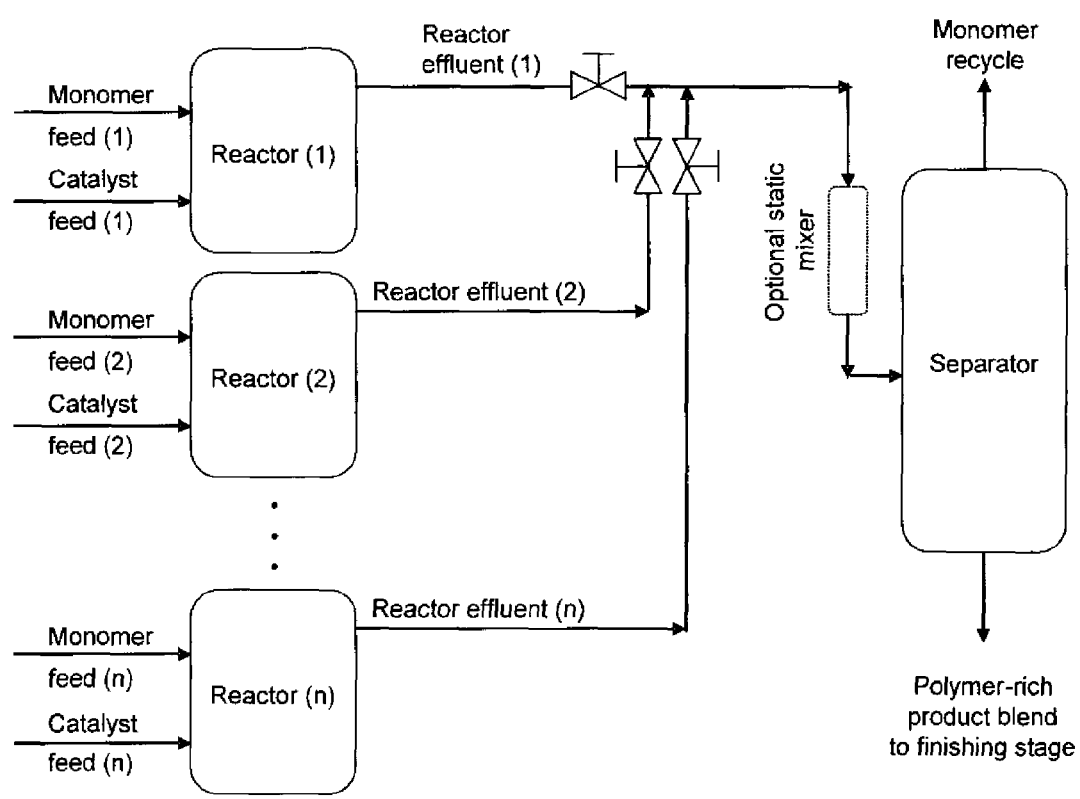
FIG. 2 presents an exemplary in-line polymer blending process schematic for producing isotactic polypropylene and ethylene-propylene copolymer blends with a single separation vessel.

Referring to FIG. 2, in one exemplary embodiment of the fluid phase in-line iPP-EP copolymer blending process disclosed herein, the effluents of all parallel reactor trains in the reactor bank are brought into a single separator-blending vessel (also referred to as a high-pressure separator). The separator-blender separates some or most of the low molecular weight components, such as monomer(s), optional solvent(s), and product lights (monomer-rich phase) from the polymer-rich phase, but also blends the iPP and EP copolymer blend components made in different reactor trains of the invention process forming a polymer-rich blend effluent. This mode is also referred to as single separation vessel operation. The number of reactor trains in the parallel bank may be 2, 3, 4, and up to n. The effluents of the different reactor trains and thus the individual polymer components are combined upstream of the separation vessel after individual pressure let down valves, which function to bring the reactor train effluents to the common pressure of the separator-blending vessel. Catalyst killing agent(s) may be optionally introduced prior to or into the separator-blending vessel to minimize further polymerization outside the polymerization reactors. Optionally, one or more static mixers positioned before the separator-blending vessel, but downstream of the mixing point, may also be utilized to enhance mixing between the reactor train effluents. Optionally, some or all reactor train effluents may be heated before the pressure letdown (not shown in FIG. 2) in order to maintain the temperature in the downstream lines and in the separation-blending vessel at the desired value, i.e., above the solid-fluid phase transition temperature of the polymer-rich phase of the separator-blender, but below the cloud point of the combined effluents entering the separator-blending vessel to allow the formation of a polymer-rich denser fluid phase and a monomer-rich lighter fluid phase.

After the combined reactor train effluent streams enter the separator-blending vessel, monomer recycle (monomer-rich phase) emerges from the top of the separator-blending vessel and a polymer-rich blend emerges from the bottom of the vessel. The polymer-rich blend may then be conveyed to a downstream finishing stage for further monomer stripping, drying and/or pelletizing. As described earlier, modifiers and additives may also be introduced either before or into the separator-blending vessel or downstream of it. A downstream introduction of these modifiers and additives typically simplifies monomer recycle, and is thus advantageous. In this embodiment, the single separator-blending vessel serves as both a separator and a blender. One advantage of this exemplary embodiment is the utilization of a single separator-blending vessel, which provides for process simplicity because it functions for both separation and blending purposes. One disadvantage of this exemplary embodiment is that because all reactor train effluent streams are combined, the recovered monomer stream from the separator-blending vessel may need to be separated prior to recycle to the individual reactor trains in the parallel bank of reactors. In summary, this embodiment may be simpler and thus lower cost in the separator section, but may be more costly in the monomer separation and recycling loop section of the process.

Figure 3:
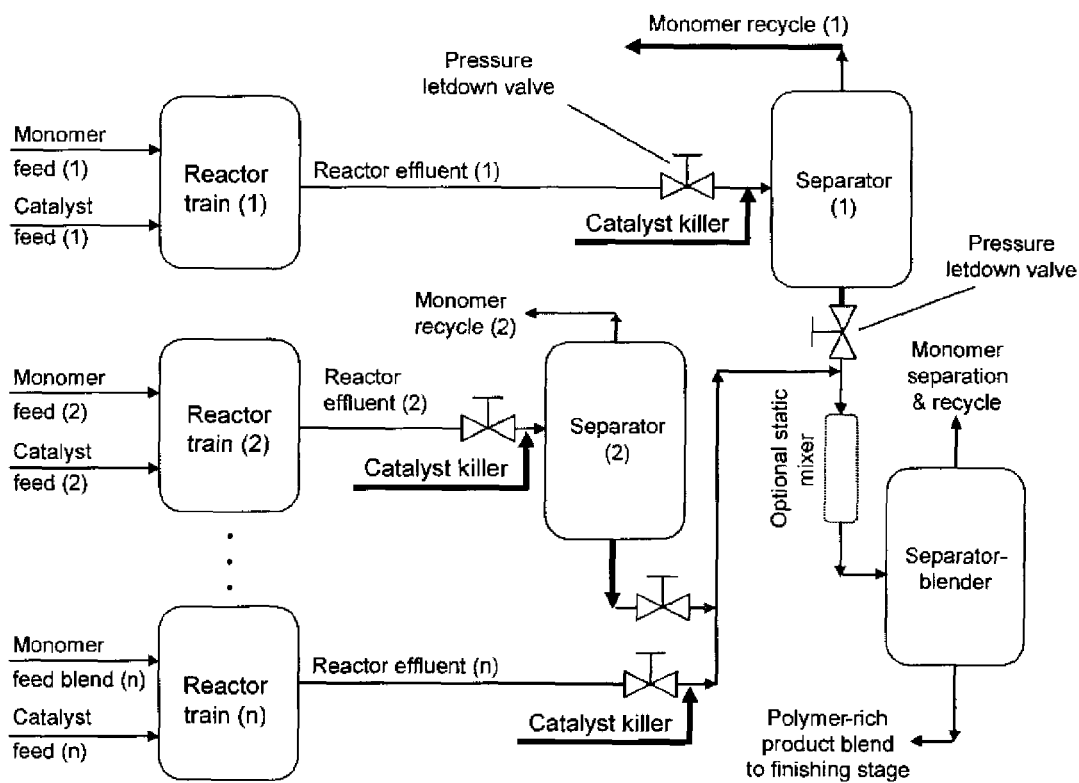
FIG. 3 presents an exemplary in-line polymer blending process schematic for producing isotactic polypropylene and ethylene-propylene copolymer blends with multiple separation vessels.

FIG. 3 depicts an alternative exemplary embodiment of the fluid phase in-line iPP-EP copolymer blending process disclosed herein in which each reactor train has a dedicated separator vessel with the exception of one reactor effluent train where all polymer-rich phases from the other reactors are combined in a high-pressure separator that also serves as a blending vessel (also referred to as multiple separation vessel operation). In this embodiment, for all but one of the reactor trains (all but train n in FIG. 3), the single-stream high-pressure separator serves as a separator to separate a polymer-enriched phase from a monomer-rich phase in the reactor effluent stream. In order to keep the content of low molecular weight components higher and thus to keep the viscosity of the polymer-enriched phase lower, the single-stream high-pressure separators dedicated to the individual reactor trains often operate at a somewhat higher pressure than the one downstream high-pressure separator that serves both as a separator and as a blender (separator-blender). Therefore, there is an optional pressure letdown between these separators and the separator-blender. For the one high-pressure separator (separator-blender) where the other polymer-rich phases are combined and the reactor train effluent from one of the reactor trains is introduced (reactor train n in FIG. 3), the separator serves both iPP-EP copolymer blending and product-feed separating functions. Catalyst killing agent may be optionally introduced prior to or into each separator vessel, including the separator-blender to minimize further polymerization outside the polymerization reactors. Optionally, one or more static mixers positioned before the separator-blending vessel, but downstream of the mixing point may be utilized to enhance mixing between the polymer-rich phases of the reactor trains and the reactor train effluent of the reactor train associated with the separator-blender. Optionally, some or all reactor train effluents may be heated before the first pressure letdown (not shown in FIG. 3) in order to maintain the temperature in the downstream lines and in the separators, including the separation-blending vessel, at the desired value, i.e., above the solid-fluid phase transition temperatures of the polymer-rich phases but below the cloud point of the streams entering the separators, including the separator-blender, to allow the formation of polymer-enriched or polymer-rich denser fluid phases and monomer-rich lighter fluid phases. The process of this embodiment may be advantageous in the production of polymer blends that include different homopolymers or homopolymer(s) and copolymer(s) as blend components. In this embodiment, the homopolymerization train(s) has/have its (their) own separator(s) and the copolymerization train (or one of the copolymerization trains in case of more than one copolymer trains used) serves as a blender. The monomer(s) recovered in the separator(s) dedicated to individual reactor train(s) may be recycled to the corresponding reactor train(s) without the complex separation from other monomers as was associated with single separation-blending vessel operation previously described. Hence, one advantage of this embodiment is that monomer recycle is simplified and thus affords lower cost in the monomer recycle loop. While multiple separation vessel operation increases cost in the separator section, it adds flexibility in the monomer recycle loops. In summary, this embodiment may be more complicated and higher cost in the separator section, but may be simpler in the monomer recycle loops.

Since both embodiments of FIGS. 2 and 3 serve the same function of polymer blending and separation of the polymer-rich from the monomer-rich phases, the choice between them is driven by the economics of a given plant producing a given product slate and may be determined by standard engineering optimization techniques known in the art.

Figure 4:
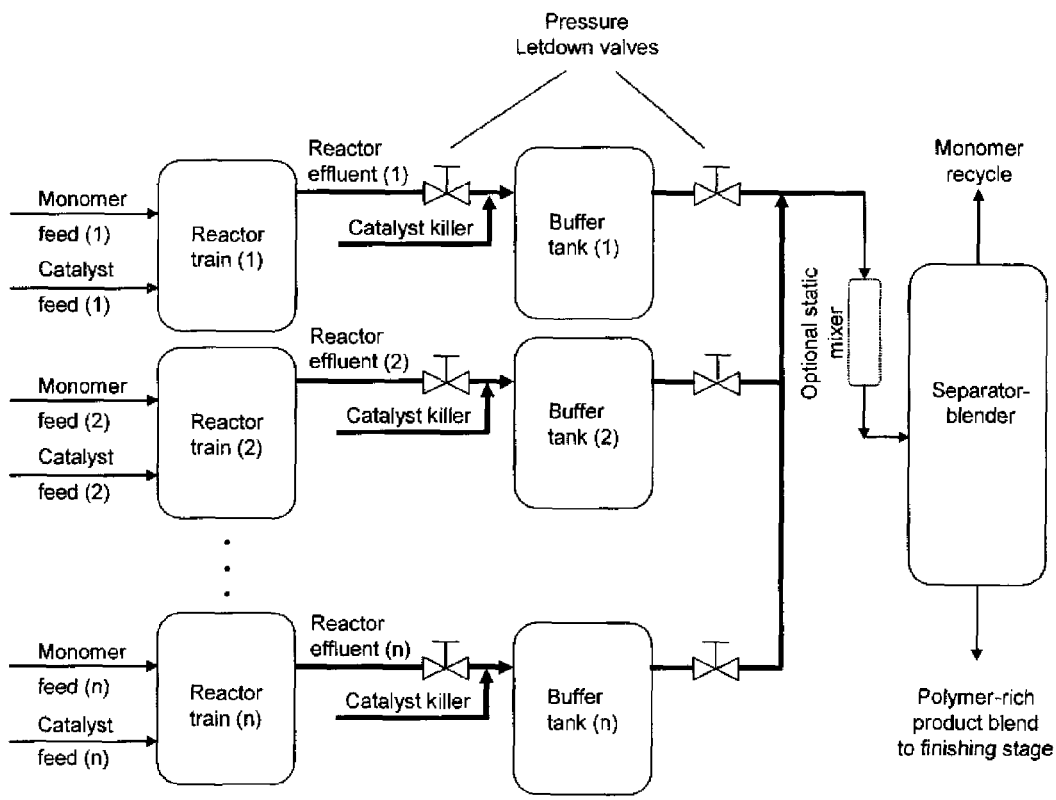
FIG. 4 presents an exemplary in-line polymer blending process schematic for producing isotactic polypropylene and ethylene-propylene copolymer blends with product effluent buffer tanks for improved blend ratio control.

FIG. 4 presents another alternative exemplary embodiment of the fluid phase in-line iPP-EP copolymer blending process disclosed herein in which is provided a dedicated buffer tank in which no phase separation occurs for each reactor train and in which the reactor train effluents are combined in a single separator-blending vessel (also referred to as single separation vessel operation with butler tanks). Each of the n parallel polymerization reactor trains in the reactor bank is provided with its own buffer tank to enable the fine-tuning of the mixing ratio of the blend components. Pressure let down valves may be positioned on the inlet and outlet side of each buffer tank to control the in-line polymer blend component flow. Optionally, the reactor effluents may be heated to maintain the desired temperature in the downstream separator-blender as described above. Catalyst killing agent may be optionally introduced prior to or into each buffer tank to minimize further polymerization outside the polymerization reactors. Optionally, one or more static mixers positioned after the mixing point but before the separation vessel for blending may be utilized to enhance mixing between the reactor effluents being fed from the buffer tanks. In comparison to the single separation vessel operation of FIG. 2, this alternative exemplary embodiment allows for more precise control of the blend ratio and quality but without the benefit of dedicated monomer recovery provided by the configuration depicted in FIG. 3. As previously discussed, this embodiment may improve the control of product blend ratio and hence product quality, but its buffer capacity may be limited.

Figure 5:
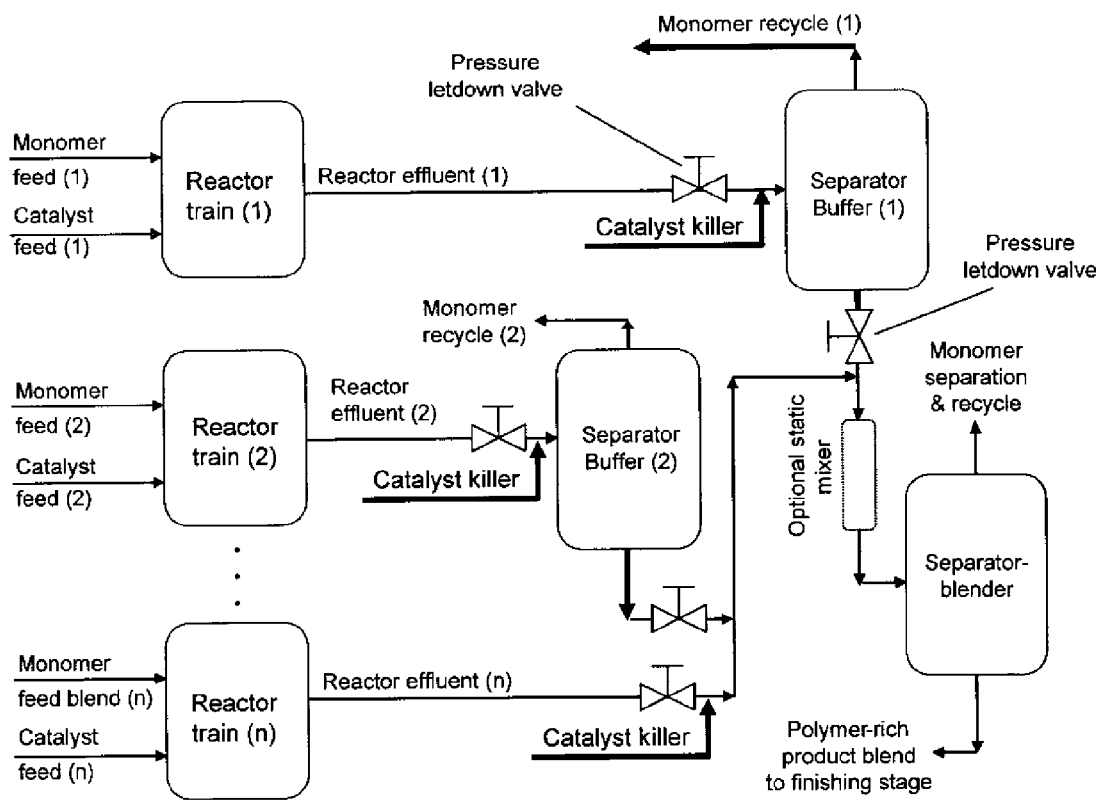
FIG. 5 presents an exemplary in-line polymer blending process schematic with product effluent buffer tanks that also serve as monomer/product separators for improved blend ratio control.

An alternative design employing buffering capability is depicted in FIG. 5. FIG. 5, a variation of the multiple separation vessel operation depicted in FIG. 3, and an advantageous version of the buffer-only operation shown in FIG. 4, presents yet another alternative exemplary embodiment of the fluid phase in-line iPP-EP copolymer blending process disclosed herein. In this exemplary embodiment the single-stream high-pressure separators dedicated to the individual reactor trains also serve as buffer tanks. Referring to FIG. 5, for all reactor trains but n, the reactor train effluent is fed to a dual-purpose separator-buffer for both separation of the polymer-rich phase from the supernatant monomer-rich phase and storage of polymer-rich phase prior to conveyance to a downstream blending separator. These single-stream separators dedicated to individual reactor trains afford buffering by allowing the level of the denser polymer-rich phase to move between an upper and a lower limit. This buffer capacity allows for the correction in the potential fluctuations in the production rates of the individual in-line blend components and thus provides a means for a more precise control of the polymer blend ratio. For reactor train n, the high-pressure separator (separator-blender) functions to separate the polymer-rich phase from the monomer-rich phase for the reactor effluent from reactor n and also to blend the polymer-rich phases from all reactors (1, 2, through n in FIG. 5). From a blend control point of view, there is no buffering for the in-line component n, and thus all other blend component flows to the separator-blending vessel, and ultimately their production rates, are controlled by the production rate in reactor train n in order to maintain the desired blend ratios. Catalyst killing agent may be optionally introduced prior to or into each separator vessel to minimize further polymerization within the separator. Optionally, one or more static mixers positioned before the separation vessel for blending may be utilized to enhance mixing between polymer-rich phases of the reactors and the reactor effluent of the reactor associated with the blending separator. For heat and pressure management, the same considerations, configurations, and controls may be applied as described for the previous embodiments. As in all process configurations, optional modifiers and additives may be introduced either prior or into the separator-blending vessel or downstream of it.

Figure 6:
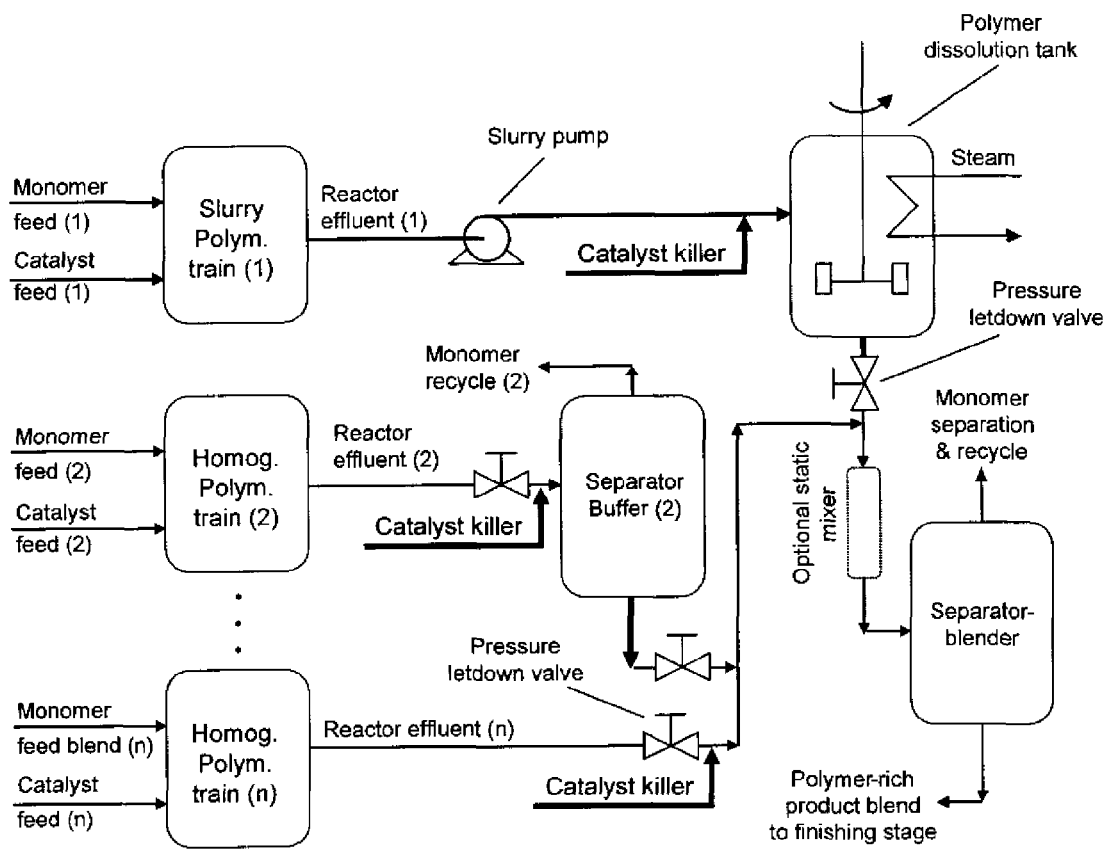
FIG. 6 presents an exemplary in-line polymer blending process schematic for producing isotactic polypropylene and ethylene-propylene copolymer blends with one slurry reactor train.

FIG. 6 presents yet another exemplary embodiment of the fluid-phase in-line iPP-EP copolymer blending process disclosed herein in which one of the parallel polymerization trains (train 1 in FIG. 6) produces the polymer blending component (iPP or EP copolymer) in the form of solid pellets, i.e. operates in the slurry polymerization regime. Thus in order to bring the polymer into a dissolved state before in-line blending, the reactor effluent is brought into a heated stirred vessel. In order to keep the entire reactor effluent in a dense fluid phase, the pressure of the reactor effluent is increased by a slurry pump. Slurry polymerization typically operates at lower temperatures than supercritical and solution polymerizations and thus may afford products with higher molecular weight and melting peak temperatures, which may provide advantages in certain polymer blend applications. However, the dissolution of polymer pellets adds cost and tends to be prone to fouling and other operational issues. Other aspects of the in-line blending process disclosed herein, such as catalyst killing, additive blending, heat and pressure management, as described in the previously described embodiments, apply hereto as well.

Figure 7:
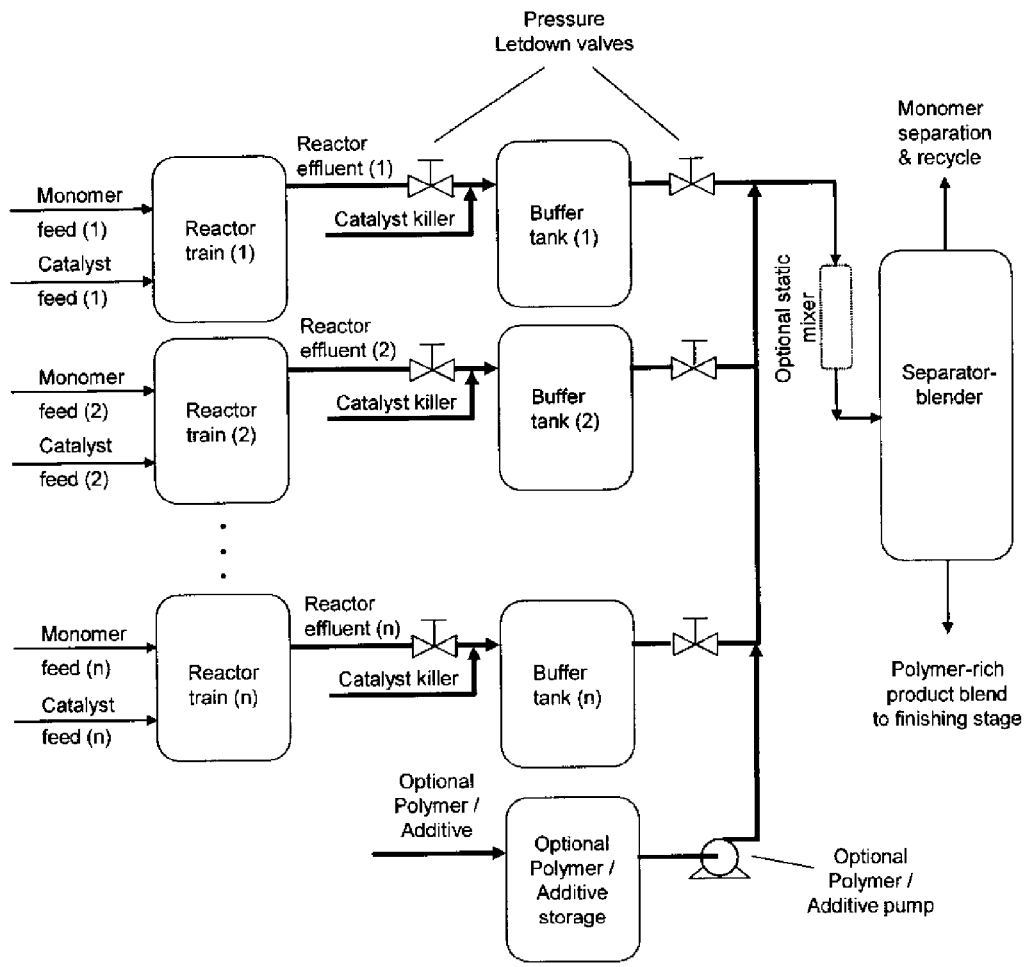
FIG. 7 presents an exemplary in-line polymer blending process schematic for producing isotactic polypropylene and ethylene-propylene copolymer blends with optional buffer tanks for improved blend ratio control and with the option for additive/polymer blending component.
Figure 8:
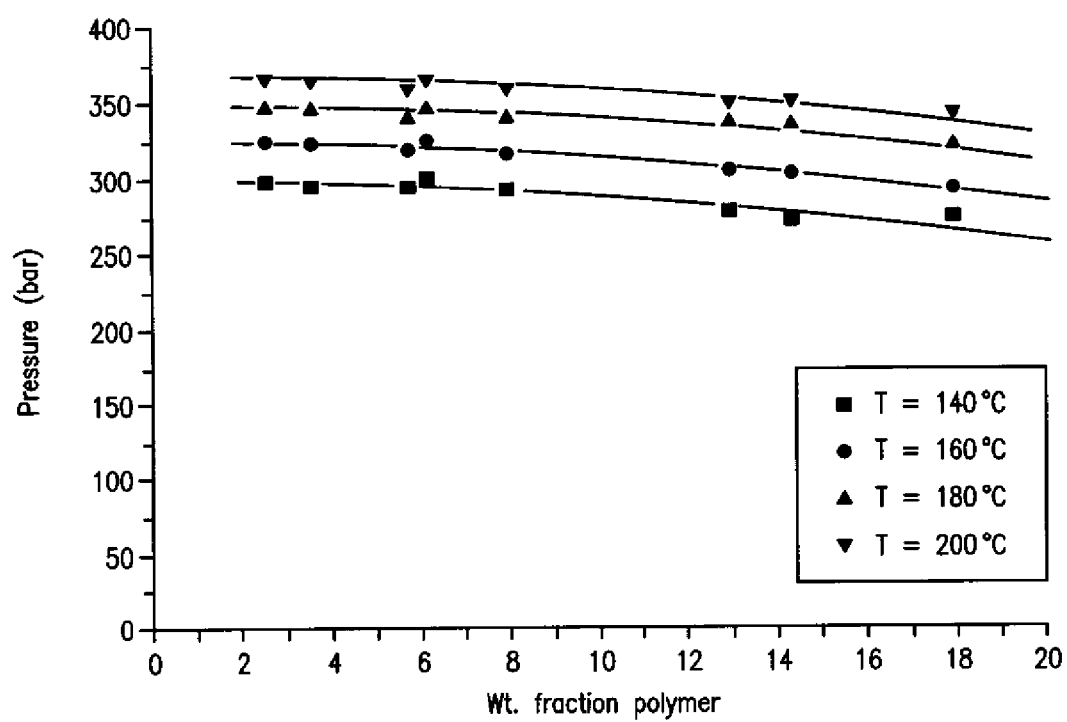
FIG. 8 presents cloud point isotherms for Polymer Achieve™ 1635.
Figure 9:
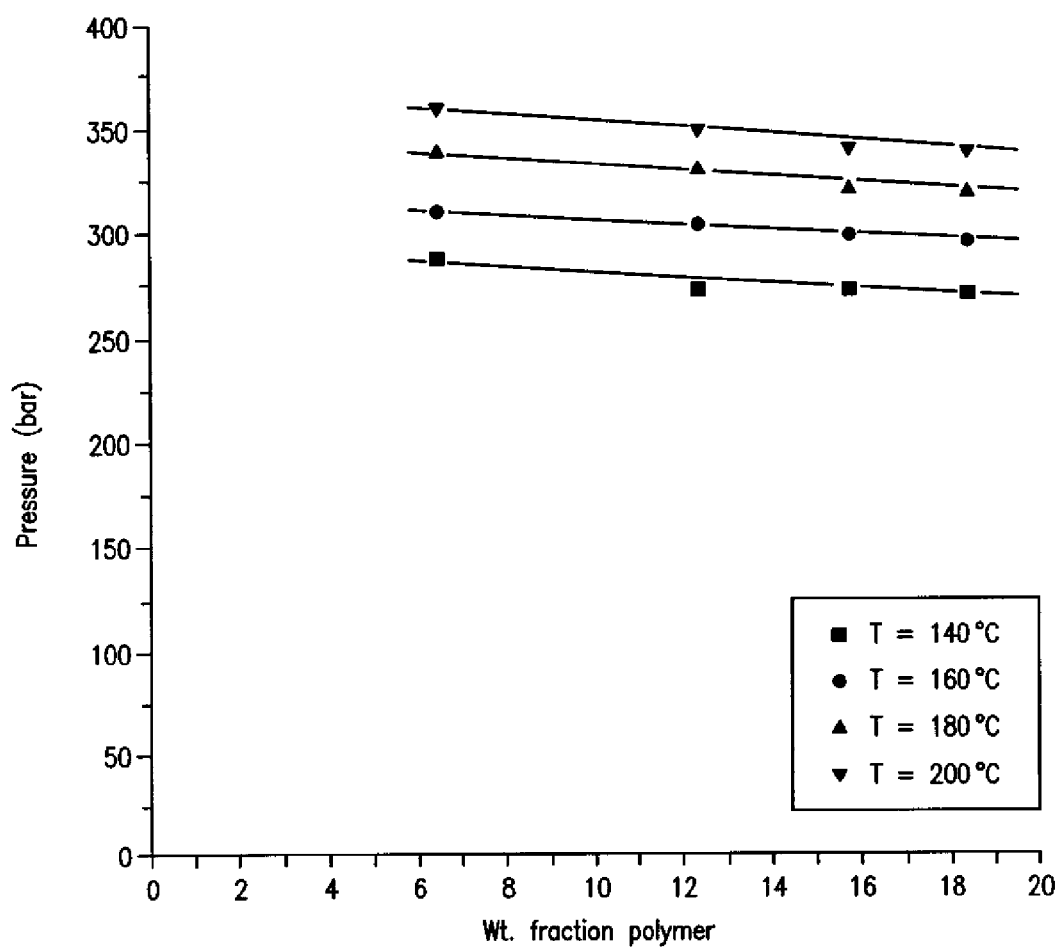
FIG. 9 presents cloud point isotherms for Polymer PP 45379 dissolved in bulk propylene.

FIG. 7 presents still yet another exemplary embodiment of the fluid phase in-line iPP-EP copolymer blending process disclosed herein in which one or more optional polymer and/or more polymer additive storage tanks may be added to the process for the storage and metering of other fluid polymers and polymer additives to the blending vessel. Optional pump(s) may be used to convey the polymer(s) or polymer additive(s) to the separator vessel for blending. Note that FIG. 7 presents the particular embodiment wherein the one or more optional polymer and/or more polymer additive storage tanks are added to the single separation-blending vessel operation with buffer tanks configuration of FIG. 4. However, the one or more optional polymer and/or one or more polymer additive storage tanks may be added to the processes depicted in FIG. 2, FIG. 3, and FIG. 5 without deviating from the spirit of the fluid phase in-line blending process disclosed herein. Similarly, optional off-line produced polymers, modifiers and additives may be introduced in any part of the polymer finishing section or in a dedicated section prior to the product finishing section of the process disclosed herein. Other aspects of the in-line blending process disclosed herein, such as catalyst killing, additive blending, heat and pressure management, as described in the previously described embodiments, apply hereto as well.

As will be appreciated by one skilled in the art of chemical engineering, the process schematic details of the design of the fluid phase in-line blending process in terms of reactor configuration, separator configuration, valving, heat management, etc. may be set differently without deviating from the spirit of the fluid-phase in-line blending process disclosed herein. The choice between different embodiments of the processes disclosed herein will be driven by product performance requirements and process economics, which can be readily determined by standard engineering techniques. However, the in-line blending processes disclosed herein are advantageous relative to the prior art by the virtue of reduced blending cost due to savings in investment and operation costs, and enabling well-controlled and cost-effective molecular-level blending to yield enhanced polymer blend performance.

The processes disclosed herein provide an effective recycle pathway for homogeneous supercritical olefin polymerization, an example of which is bulk homogeneous supercritical propylene polymerization (SCPP). As will be discussed in more detail below, the efficient separation of monomer and polymer is achieved by advantageously utilizing the cloud point pressure and temperature relationships for the relevant (polymer/olefinic monomer) or (copolymer/olefinic monomer blend); e.g. (polypropylene/propylene monomer), (ethylene-propylene copolymer/ethylene-propylene monomer blend), etc. mixtures.

For illustration, cloud point curves are shown in FIGS. 8 to 22 for three different polypropylene samples having different molecular weights and crystallinities dissolved in propylene (at 18 wt %). (Achieve 1635 PP is a commercially available metallocene-catalyzed isotactic polypropylene having a Melt Flow Rate, MFR, ($I_{10}/I_2$-ASTM 1238, 230° C., 2.16 kg) of 32 g/10 min available from ExxonMobil Chemical Company, Houston, Tex. ESCORENE PP 4062 is a commercially available isotactic polypropylene having an MFR of 3.7 g/10 min, available from ExxonMobil Chemical Company, Houston, Tex. PP 45379 is an isotactic polypropylene having an MFR of 300 dg/min produced using a supported metallocene in a slurry polymerization process.

Monomer Recycle to Parallel Reactor Trains:

As disclosed in U.S. Patent Application No. 60/905,247, filed on Mar. 6, 2007, incorporated herein in its entirety by reference, some forms of the present disclosure also provide for simplified recycle methods for the monomers emerge unconverted from the parallel reactor trains. In particular, the simplified monomer recycle methods are applicable for use with said fluid-phase in-line polymer blending processes in which each monomer component fed to a first group of one or more reactor trains of the said in-line blending processes (G1) is also present in the feed of a second group of one or more trains of the said in-line blending processes (G2) so that when the monomer pool of the said first group of trains (G1) is combined with the monomer pool of the second group of trains (G2), the said combined monomer pool and the monomer pool of the second group of trains (G2) are the same. Stating it differently, when the effluents (or reduced effluent streams derived from the effluents) of the said first group of reactor trains (G1) are combined with the effluents of the said second group of reactor trains (G2), the combined effluent stream essentially contains only monomers that are present in the feed of the said second group of reactor trains (G2). Stating it yet another way, the effluents (or reduced effluent streams derived from the effluents) of the said first group of reactor trains (G1) essentially do not introduce new monomer components into the recycled effluents of said second group of reactor trains (G2) when the effluent streams of G1 and G2 are combined, in a mathematical form, these conditions can be described as follows:

$$N(G1+G2)=N(G2) \text{ and } N(G1) \leq N(G2)$$

where $N(G1+G2)$ is the number of monomers in the combined monomer pool of the first and second group of reactor trains of the in-line fluid phase polymer blending process; $N(G1)$ and $N(G2)$ are the number of monomers in the monomer pool of the first (G1) and second (G2) group of reactor trains of the in-line fluid phase polymer blending process, respectively. The monomer pools present in the individual reactor trains of G1 can be the same or different. However, the monomer pools present in the individual reactor trains of G2 are always the same, although the monomer concentrations or monomer ratios may be different (but may also be the same). The number of reactor trains both in the first and in the second groups of reactor trains (G1 and G2) can be one or more than one. In practice, the number of reactor trains belonging to the first group of reactor trains of the in-line fluid phase polymer blending process (G1) can be one, two, three, four, five, or more. Similarly, the number of reactor trains belonging to the second group of reactor trains of the in-line fluid phase polymer blending processes (G2) can also be one, two, three, four, five, or more. It should be understood that as all reactor trains of the in-line fluid phase polymer blending processes disclosed herein, the one or more reactor trains of G1 are configured in parallel relative to the one or more reactor trains of G2. The G1 and G2 reactor trains are also fluidly connected to one another. When the above-stated conditions for the monomer pools are met in the in-line fluid phase polymer blending processes disclosed herein, the simplified monomer recycle methods disclosed in U.S. Patent Application No. 60/905,247 are applicable to the present disclosure. In all embodiments of the simplified recycle processes, the monomer recycle streams recovered from the product streams of G1 before mixing them with any of the effluents of G2 are recycled to G1 while the monomer recycle streams recovered from the mixed polymer-containing streams of G1 and G2 are recycled to G2. Since the mixed streams that contain monomers originated both from G1 and G2 are recycled to G2, the simplified monomer recycle methods also ensure that the monomer component recycle rates in the recycle stream originated from the combined G1 and G2 product-containing streams and sent to G2 are not higher than the desired monomer component flow rates in the composite feed of G2.

The simplified recycle methods described above and in U.S. Patent Application No. 60/905,247 are particularly advantageous to the in-line blending processes for producing iPP and EP copolymer blends disclosed herein because to the propylene monomer is present in each of the two or more parallel reactor trains. For example, if one parallel reactor train polymerizes isotactic polypropylene, and a second parallel reactor train polymerizes ethylene-propylene copolymer, the unreacted propylene monomer from the first reactor train may be combined with the unreacted propylene and ethylene monomers from the second parallel reactor train and recycled back to the second parallel reactor train using the simplified monomer recycle methods disclosed herein.

Isotactic PP and EP Copolymer Catalyst System Overview

The in-line process for blending iPP and EP copolymer blend components disclosed herein may utilize any number of catalyst systems (also referred to as catalysts) in any of the reactors of the polymerization reactor section of the process. The in-line process for blending polymers disclosed herein may also utilize the same or different catalysts or catalyst mixtures in the different individual reactors of the reactor bank of the present invention. It should be understood that by using different catalyst systems we mean that any part of the catalyst system can vary and any combination is allowed. For example, the invention process may use unsupported catalyst systems in some trains while using supported catalyst systems in other trains. In other embodiments, the catalyst systems in some reactor trains may comprise aluminoxane (for example, MAO) activator, while comprising non-coordinating anion activators in some other trains. In another embodiments, the catalyst systems in some reactor trains may comprise Ziegler-Natta catalysts, while the catalyst systems in other reactor trains of the invention process may comprise metallocenes or nonmetallocene metal-centered, heteroaryl ligand catalyst compounds (where the metal is chosen from the Group 4, 5, 6, the lanthanide series, or the actinide series of the Periodic Table of the Elements) activated by aluminoxane or non-coordinating anion activators or any combinations thereof. While the number of different catalyst systems deployed in the invention processes can be any number, the use of no more than five different catalysts and more particularly, no more than three different catalysts in any given reactor is advantageous for economic reasons. The deployment of no more than ten catalysts or the deployment of no more than six catalysts in the reactor bank of the polymerization process is advantageous for economic reasons. The one or more catalysts deployed in the reactors may be homogeneously dissolved in the fluid reaction medium or may form a heterogeneous solid phase in the reactor. In one particular embodiment, the catalyst(s) is (are) homogeneously dissolved in the fluid reaction medium. When the catalyst is present as a solid phase in the polymerization reactor, it may be supported or unsupported.

The process disclosed herein may use any combination of homogeneous and heterogeneous catalyst systems simultaneously present in one or more of the individual reactors of the polymerization reactor section, i.e., any reactor of the polymerization section of the present invention may contain one or more homogeneous catalyst systems and one or more heterogeneous catalyst systems simultaneously. The process disclosed herein may also use any combination of homogeneous and heterogeneous catalyst systems deployed in the polymerization reactor section. These combinations comprise scenarios when some or all reactors use a single catalyst and scenarios when some or all reactors use more than one catalyst. The one or more catalysts deployed in the process disclosed herein may be supported on particles, which either can be dispersed in the fluid polymerization medium or may be contained in a stationary catalyst bed. When the supported catalyst particles are dispersed in the fluid reaction medium, they may be left in the polymeric product or may be separated from the product prior to its crystallization from the fluid reactor effluent in a separation step that is downstream of the polymerization reactor section. If the catalyst particles are recovered, they may be either discarded or may be recycled with or without regeneration.

The catalyst may also be supported on structured supports, such as for example, monoliths comprising straight or tortuous channels, reactor walls, and internal tubing. When the catalysts are supported, operation may take place on dispersed particles. When the catalyst is supported on dispersed particles, operations may take place without catalyst recovery i.e., the catalyst is left in the polymeric product. In another embodiment, unsupported catalysts may be dissolved in the fluid reaction medium.

Catalyst systems may be introduced into the reactor by any number of methods. For example, the catalyst may be introduced with the monomer-containing feed or separately. Also, the catalyst(s) may be introduced through one or multiple ports to the reactor. If multiple ports are used for introducing the catalyst, those ports may be placed at essentially the same or at different positions along the length of the reactor. If multiple ports are used for introducing the catalyst, the composition and the amount of catalyst feed through the individual ports may be the same or different. Adjustment in the amounts and types of catalyst through the different ports enables the modulation of polymer properties, such as for example, molecular weight distribution, composition, composition distribution, and crystallinity.

Figure 24:
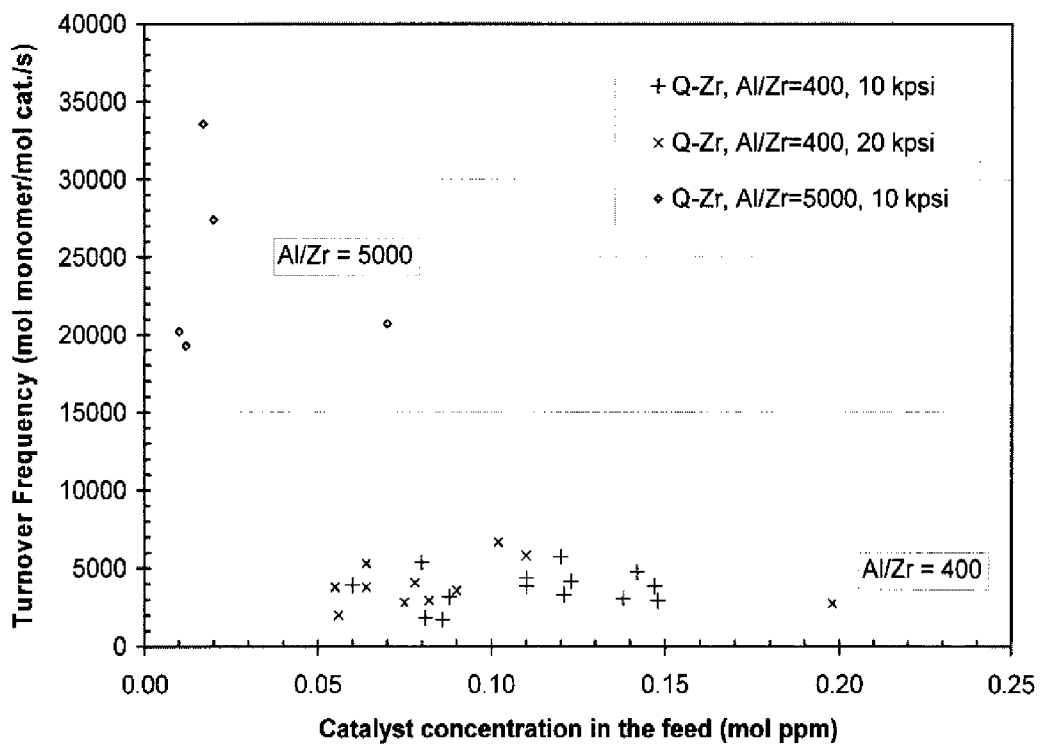
FIG. 24 depicts that turnover frequency is independent of catalyst concentration suggesting first kinetic order for catalyst in supercritical propylene polymerization with MAO-activated (μ-dimethylsilyl)bis(2-methyl-4-phenylindenyl) zirconium dichloride (Q-Zr-MAO) at 120-130° C. and 69 and 138 MPa (10 or 20 kpsi, respectively)

FIG. 24 is a plot of turnover frequency as a function of catalyst concentration in homogeneous supercritical propylene polymerization with MAO-activated (μ-dimethylsilyl)

bis(2-methyl-4-phenylindenyl)zirconium dichloride (Q-Zr-MAO) at 120-130° C. and 10 or 20 kpsi total pressure. The figure shows that turnover frequency independent of catalyst concentration suggesting first kinetic order for catalyst in homogeneous supercritical propylene polymerization with MAO-activated (μ-dimethylsilyl)bis(2-methyl-4-phenylindenyl)zirconium dichloride (Q-Zr-MAO). Stated differently, the monomer conversion rate is proportional to the concentration of the metallocene component (expressed as Zr-concentration) of the catalyst system comprising the (t-dimethylsilyl)bis(2-methyl-4-phenylindenyl)zirconium dichloride catalyst precursor compound and the MAO activator (the latter employed in a 400:1 Al/Zr ratio).

Catalyst Compounds and Mixtures:

The processes described herein may use any polymerization catalyst capable of polymerizing the monomers disclosed herein if that catalyst is sufficiently active under the polymerization conditions disclosed herein. Thus, Group-3-10 transition metals may form suitable polymerization catalysts. A suitable olefin polymerization catalyst will be able to coordinate to, or otherwise associate with, an alkenyl unsaturation. Illustrative, but not limiting, olefin polymerization catalysts include Ziegler-Natta catalyst compounds, metallocene catalyst compounds, late transition metal catalyst compounds, and other non-metallocene catalyst compounds.

Distinction should made between active catalysts, also referred to as catalyst systems herein, and catalyst precursor compounds. Catalyst systems are active catalysts comprising one or more catalyst precursor compounds, one or more catalyst activators, and optionally, one or more supports. Catalytic activity is often expressed based on the concentration of the catalyst precursor compounds without implying that the active catalyst is the precursor compound alone. It should be understood that the catalyst precursor is inactive without being contacted or being treated with a proper amount of activator. Similarly, the catalyst activator is inactive without combining it with a proper amount of precursor compound. As will become clear from the following description, some activators are very efficient and can be used stoichiometrically, while some others are used in excess, and in sometimes large excess, to achieve high catalytic activity as expressed based on the concentration of the catalyst precursor compounds. Since some of these activators, for example methylaluminoxane (MAO), increase catalytic activity as expressed based on the concentration of the catalyst precursor compounds, they are sometimes referred to as "cocatalysts" in the technical literature of polymerization.

As disclosed herein. Ziegler-Natta catalysts are those referred to as first, second, third, fourth, and fifth generation catalysts in the PROPYLENE HANDBOOK, E. P. Moore, Jr., Ed., Hanser, New York, 1996. Metallocene catalysts in the same reference are described as sixth generation catalysts. One exemplary non-metallocene catalyst compound comprises nonmetallocene metal-centered, heteroaryl ligand catalyst compounds (where the metal is chosen from the Group 4, 5, 6, the lanthanide series, or the actinide series of the Periodic Table of the Elements).

Just as in the case of metallocene catalysts, these nonmetallocene metal-centered, heteroaryl ligand catalyst compounds are typically made fresh by mixing a catalyst precursor compound with one or more activators. Nonmetallocene metal-centered, heteroaryl ligand catalyst compounds are described in detail in PCT Patent Publications Nos. WO 02/38628, WO 03/040095 (pages 21 to 51), WO 03/040201 (pages 31 to 65), WO 03/040233 (pages 23 to 52), WO 03/040442 (pages 21 to 54), WO 2006/38628, and U.S. patent application Ser. No. 11/714,546, each of which is herein incorporated by reference.

Particularly useful metallocene catalyst and non-metallocene catalyst compounds are those disclosed in paragraphs [0081] to [0111] of U.S. Ser. No. 10/667,585 and paragraphs [0173] to [0293] of U.S. Ser. No. 11/77004, the paragraphs of which are herein incorporated by reference.

An exemplary family of suitable catalysts for producing both the iPP and EP blend components is known in the art as bridged bisindenyl metallocenes. As described by many papers (see for example, W. Spaleck et al., Organometallics, 13 (1994) 954, W. Spaleck et al., "New Isotactic Polypropylenes via. Metallocene Catalysts" in Ziegler Catalysts, Fink/Mulhaupt/Brintzinger, Eds., Springer, Berlin, 1995, and L. Resconi et al., J. Am. Chem. Soc. 120 (1998) 2308). This family of metallocene catalysts can provide both high and low stereo regularity for propylene incorporation depending on the substitution on the bisindenyl scaffold. For example, the unsubstituted parent (such as for example, the Hf version, dimethyl (μ-dimethylsilyl)bis(indenyl)hafnium activated by MAO or borate non-coordinating anion activators) may provide for low stereoregularity, and thus reduced crystallinity, while some substituted derivatives, particularly the 2,4-substituted versions (such as, for example, the Zr version, dimethyl (μ-dimethylsilyl)bis(2-methyl-4-naphthylindenyl)zirconium), afford high stereoregularity. The latter thus is particularly useful for producing high-crystallinity iPP blend components.

The processes disclosed herein can employ mixtures of catalyst compounds to tailor the properties that are desired from the polymer. Mixed catalyst systems prepared from more than one catalyst precursor compounds can be employed in the in-line blending processes to alter or select desired physical or molecular properties. For example, mixed catalyst systems can control the molecular weight distribution of isotactic polypropylene when used with the invention processes or for the invention polymers. In one embodiment of the processes disclosed herein, the polymerization reaction(s) may be conducted with two or more catalyst precursor compounds at the same time or in series. In particular, two different catalyst precursor compounds can be activated with the same or different activators and introduced into the polymerization system at the same or different times. These systems can also, optionally, be used with diene incorporation to facilitate long chain branching using mixed catalyst systems and high levels of vinyl terminated polymers.

As disclosed herein, two or more of the above catalyst precursor compounds can be used together.

Activators and Activation Methods for Catalyst Compounds:

The catalyst precursor compounds described herein are combined with activators for use as active catalysts herein.

An activator is defined as any combination of reagents that increases the rate at which a metal complex polymerizes unsaturated monomers, such as olefins. An activator may also affect the molecular weight, degree of branching, comonomer content, or other properties of the polymer.

A. Aluminoxane and Aluminum Alkyl Activators:

In one form, one or more aluminoxanes are utilized as an activator in the in-line blending processes disclosed herein. Alkyl aluminoxanes, sometimes called aluminoxanes in the art, are generally oligomeric compounds containing —Al(R)—O— subunits, where R is an alkyl group. Examples of aluminoxanes include methylaluminoxane (MAO), modified methylaluminoxane (MMAO), ethylaluminoxane and isobutylaluminoxane. Alkylaluminoxanes and modified alkylaluminoxanes are suitable as catalyst activators, particularly when the abstractable ligand is a halide. Mixtures of different aluminoxanes and modified aluminoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and European and PCT Patent Publication Nos. EP 0 561 476 A1, EP 0 279 586 B1, EP 0 516 476 A, EP0 594 218 A1 and WO 94/10180, all of which are herein incorporated by reference in their entirety.

When the activator is an aluminoxane (modified or unmodified), some embodiments select the maximum amount of activator at a 5000-fold molar excess Al/M over the catalyst compound (per metal catalytic site). The minimum activator-to-catalyst-compound is typically a 1:1 molar ratio.

B. Ionizing Activators:

It is contemplated to use an ionizing or stoichiometric activator, neutral or ionic, such as tri(n-butyl)ammonium tetrakis (pentafluorophenyl)boron, a trisperfluorophenyl borone metalloid precursor or a trisperfluoronaphtyl)borone metalloid precursor, polyhalogenated heteroborane anions (PCT patent publication no. WO 98/43983), boric acid (U.S. Pat. No. 5,942,459) or combination thereof as an activator herein. Also contemplated for use herein are neutral or ionic activators alone or in combination with aluminoxane or modified aluminoxane activators.

Examples of neutral stoichiometric activators include tri-substituted boron, aluminum, gallium and indium or mixtures thereof. The three substituent groups are each independently selected from alkyls, alkenyls, halogen, substituted alkyls, aryls, arylhalides, alkoxy and halides. The three groups are independently selected from halogen, mono or multicyclic (including halosubstituted) aryls, alkyls, and alkenyl compounds and mixtures thereof, particularly advantageous are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternately, the three groups are alkyls having 1 to 4 carbon groups, phenyl, naphthyl or mixtures thereof. Alternately, the three groups are halogenated, advantageously fluorinated, aryl groups. Alternately, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European patent publication Nos. EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

C. Non-Ionizing Activators:

Activators are typically strong Lewis-acids which may play either the role of ionizing or non-ionizing activator. Activators previously described as ionizing activators may also be used as non-ionizing activators.

Abstraction of formal neutral ligand may be achieved with Lewis-acids that display an affinity for the formal neutral ligand. These Lewis-acids are typically unsaturated or weakly coordinated. Examples of non-ionizing activators include $R^{10}(R^{11})_3$, where $R^1$ is a group 13 element and $R^{11}$ is a hydrogen, a hydrocarbyl, a substituted hydrocarbyl, or a functional group. Typically. $R^{11}$ is an arene or a perfluorinated arene. Non-ionizing activators also include weakly coordinated transition metal compounds such as low valent olefin complexes.

Non-limiting examples of non-ionizing activators include $BMe_3$, $BEt_3$, $B(iBu)_3$, $BPh_3$, $B(C_6F_5)_3$, $AlMe_3$, $AlEt_3$, $Al(iBu)_3$, $AlPh_3$, $B(C_6F)_3$, aluminoxane, CuCl, Ni(1,5-cyclooctadiene)$_2$.

Additional neutral Lewis-acids are known in the art and will be suitable for abstracting formal neutral ligand. See in particular the review article by E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

Suitable non-ionizing activators include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arctic or a perfluorinated arene.

Other non-ionizing activators include $B(R^{12})_3$, where $R^{12}$ is an arene or a perfluorinated arene. Alternately, non-ionizing activators include $B(C_6H_5)_3$ and $B(C_6F_5)_3$. Another non-ionizing activator is $B(C_6F_5)_3$. Alternately, activators include ionizing and non-ionizing activators based on perfluoroaryl borane and perfluoroaryl borates such as $PhNMe_2H^+$ B $(C_6F_5)_4^-$, $(C_6H_5)_3C^+ B(C_6F_5)_4^-$, and $B(C_6F_5)_3$.

Additional activators that may be used with the catalyst compounds disclosed herein include those described in PCT patent publication No. WO 03/064433A1, which is incorporated by reference herein in its entirety.

Additional useful activators for use in the processes disclosed herein include clays that have been treated with acids (such as $H_2SO_4$) and then combined with metal alkyls (such as triethylaluminum) as described in U.S. Pat. No. 6,531,552 and EP Patent No. 1 160 261 A1, which are incorporated by reference herein.

Activators also may be supports and include ion-exchange layered silicate having an acid site of at most −8.2 pKa, the amount of the acid site is equivalent to at least 0.05 mmol/g of 2,6-dimethylpyridine consumed for neutralization. Non-limiting examples include chemically treated smectite group silicates, acid-treated smectite group silicates. Additional examples of the ion-exchange layered silicate include layered silicates having a 1:1 type structure or a 2:1 type structure as described in "Clay Minerals (Nendo Kobutsu Gaku)" written by Haruo Shiramizu (published by Asakura Shoten in 1995).

Examples of an ion-exchange layered silicate comprising the 1:1 layer as the main constituting layer include kaolin group silicates such as dickite, nacrite, kaolinite, metahalloysite, halloysite or the like, and serpentine group silicates such as chrysotile, lizaldite, antigorite or the like. Additional non-limiting examples of the ion-exchange layered silicate include ion-exchange layered silicates comprising the 2:2 layer as the main constituting layer include smectite group silicates such as montmorillonite, beidellite, nontronite, saponite, hectorite, stephensite or the like, vermiculite group silicates such as vermiculite or the like, mica group silicates such as mica, illite, sericite, glauconite or the like, and attapulgite, sepiolite, palygorskite, bentonite, pyrophyllite, talc, chlorites and the like. The clays are contacted with an acid, a salt, an alkali, an oxidizing agent, a reducing agent or a treating agent containing a compound intercalatable between layers of an ion-exchange layered silicate. The intercalation means to introduce other material between layers of a layered material, and the material to be introduced is called as a guest compound. Among these treatments, acid treatment or salt treatment is particularly advantageous. The treated clay may then be contacted with an activator compound, such as TEAL, and the catalyst compound to polymerize olefins.

In another form, the polymerization systems comprise less than 5 wt % polar species, or less than 4 wt %, or less than 3 wt %, or less than 2 wt %, or less than 1 wt %, or less than 1000 ppm, or less than 750 ppm, or less than 500 ppm, or less than 250 ppm, or less than 100 ppm, or less than 50 ppm, or less than 10 ppm. Polar species include oxygen containing compounds (except for alumoxanes) such as alcohols, oxygen, ketones, aldehydes, acids, esters and ethers.

In yet another form, the polymerization systems comprise less than 5 wt % trimethylaluminum and/or triethylaluminum, or less than 4 wt %, or less than 3 wt %, or less than 2 wt %, or less than 1 wt %, or less than 1000 ppm, or less than 750 ppm, or less than 500 ppm, or less than 250 ppm, or less than 100 ppm, or less than 50 ppm, or less than 10 ppm.

In still yet another form, the polymerization systems comprise methylaluminoxane and less than 5 wt % trimethylaluminum and or triethylaluminum, or less than 4 wt %, or less than 3 wt %, or less than 2 wt %, or less than 1 wt %, or less than 1000 ppm, or less than 750 ppm, or less than 500 ppm, or less than 250 ppm, or less than 100 ppm, or less than 50 ppm, or less than 10 ppm.

The in-line blending processes disclosed herein may use finely divided, supported catalysts to prepare propylene/1-hexene copolymers with greater than 1.0 mole % 1-hexene. In addition to finely divided supports, in-line blending processes disclosed herein may use fumed silica supports in which the support particle diameter may range from 200 angstroms to 1500 angstroms, small enough to form a colloid with reaction media.

Catalyst Supports:

In another form, the catalyst compositions of fluid phase in-line blending processes disclosed herein may include a support material or carrier. For example, the one or more catalyst components and/or one or more activators may be deposited on, contacted with, vaporized with, bonded to, or incorporated within, adsorbed or absorbed in, or on, one or more supports or carriers.

The support material may be any of the conventional support materials. In one form, the supported material may be a porous support material, for example, talc, inorganic oxides and inorganic chlorides. Other support materials may include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

Useful support materials are inorganic oxides that include those Group 2, 3, 4, 5, 13 or 14 metal oxides. In one form, the supports include silica, which may or may not be dehydrated, fumed silica, alumina (PCT patent publication No. WO 99/60033), silica-alumina and mixtures thereof. Other useful supports include magnesia, titania, zirconia, magnesium chloride (U.S. Pat. No. 5,965,477), montmorillonite (European Patent No. EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in European Patent No. EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

The support material, for example an inorganic oxide, has a surface area in the range of from about 10 to about 700 $m^2/g$, pore volume in the range of from about 0 to about 4.0 cc/g and average particle size in the range of from about 0.02 to about 50 µm. Alternatively, the surface area of the support material is in the range of from about 50 to about 500 $m^2/g$, pore volume of from about 0 to about 3.5 cc/g and average particle size of from about 0.02 to about 20 µm. In another form, the surface area of the support material is in the range is from about 100 to about 400 $m^2/g$, pore volume from about 0 to about 3.0 cc/g and average particle size is from about 0.02 to about 10 µm.

Non-porous supports may also be used as supports in the processes described herein. For example, in a one embodiment the nonporous, fumed silica supports described in U.S. Pat. No. 6,590,055 may be used and is incorporated by reference herein.

While supported catalysts may be used in the disclosed in-line blending processes for making iPP-EP blends, unsupported catalysts are more advantageous due to their better handling properties under homogeneous polymerization conditions.

Isotactic PP & EP Copolymer Polymerization Scavengers

Compounds that destroy impurities are referred to as scavengers by one skilled in the art of polymerization. Impurities may harm catalysts by reducing their activity. Scavengers may be optionally fed to the reactor(s) of the in-line blending process disclosed herein. Catalytic activity may be defined many different ways. For example, catalytic activity can be expressed as turnover frequency, i.e., the number of moles of monomers converted to the product in a unit time by one mole of catalyst precursor employed in preparing the active catalyst system. For a given reactor operating at the same residence time, catalytic activity may also be measured in terms of catalyst productivity, customarily expressed as the weight of polymer made by a unit weight of catalyst precursor with or without the weight of the activator.

The scavengers for use in the processes disclosed herein may be different chemical compound(s) from the catalyst activator. Non-limiting exemplary scavengers include diethyl zinc, and alkyl aluminum compounds, such as trimethyl aluminum, triethyl aluminum, tri-isobutyl aluminum, and trioctyl aluminum. The scavenger may also be the same as the catalyst activator and is generally applied in excess of what is needed to fully activate the catalyst. These scavengers include, but are not limited to, aluminoxanes, such as methyl aluminoxane. The scavenger may also be introduced to the reactor with the monomer feed or with any other feed stream. In one particular embodiment, the scavenger is introduced with the monomer-containing feed. The scavenger may be homogeneously dissolved in the polymerization reaction medium or may form a separate solid phase. In one particular embodiment, scavengers are dissolved in the polymerization medium.

Isotactic PP and EP Copolymer Polymerization Reactor Configuration

The polymerization processes of the fluid phase in-line process for iPP and EP copolymer blending disclosed herein may be carried out in two or more reactors making the iPP and EP copolymer for downstream blending. In one embodiment, PP homopolymer and EP copolymer blends are made by using two reactor trains in a parallel configuration. In another form, the PP homopolymer and EP copolymer blends are made by using three, or four, or five, or six reactor trains in a parallel configuration.

As previously described, the in-line blending iPP and EP copolymer blend components are produced in a reactor bank composed of at least two parallel reactor trains. A reactor train of the parallel reactor bank may include one or more reactors that may be configured in series configuration. The number of parallel reactors trains or branches in a parallel bank may be any number, but for practical reasons, is generally limited to less than ten, alternatively not more than six parallel reactor trains, alternatively not more than five or not more than four reactor trains, alternatively not more than three parallel reactor trains, and alternatively not more than two parallel reactor trains. The number of series cascade reactors constituting a given reactor train or branch of a parallel configuration may be any number, but for practical reasons, is generally limited to not more than ten reactors in series, alternatively not more than six reactors in series, alternatively not more than three reactors in series, and alternatively not more than two reactors in series.

In one embodiment, the polymer-containing effluents from two or more reactor trains configured in a parallel configuration are combined yielding a polymer blend comprising the polymeric products of the individual reactors without first recovering the polymeric products of the individual reactors in solid forms. The two or more reactor trains constituting the parallel configuration generally include a single reactor, or alternatively, two or more reactors in series.

The reactors of the polymerization system for the fluid phase in-line process for iPP and EP copolymer blending disclosed herein may be stirred or unstirred. When a reactor train comprises two or more reactors, the members of the reactor train are not necessarily constructed the same way, for example, the individual members of a reactor train may be stirred, unstirred, or a combination thereof. The individual reactors may also be of equal or different size. The same is true for the reactors in the entire reactor bank. The optimal reactor configuration and sizes may be determined by standard engineering techniques known to those skilled in the art of chemical engineering.

Any type of polymerization reactor may be deployed in the fluid phase in-line process for blending disclosed herein. The optimal reactor design may be determined by standard engineering techniques known to those skilled in the art of chemical engineering. Non-limiting exemplary reactor designs include stirred tank with or without an external loop, tubular reactor, and loop reactor. The reactors may operate adiabatically or may be cooled. The cooling may be achieved within the reactor, or through the reactor jacket, or dedicated heat exchange loops may be applied.

Isotactic PP and EP Copolymer Polymerization Reactors

The fluid phase in-line process for iPP and EP copolymer blending disclosed herein relates to processes to polymerize isotactic polypropylene and EP copolymer comprising contacting propylene, ethylene and optional one or more $C_4$ or higher olefins with suitable catalyst compounds and activators in a fluid reaction medium comprising one or two fluid phases in each parallel reactor. The polymerization system for at least one parallel reactor train producing either the iPP or EP copolymer is in its supercritical state. Catalyst compound and activator may be delivered as a solution or slurry, either separately to the reactor, mixed in line just prior to the reactor, or mixed and pumped as an activated solution or slurry to the reactor. For a given reactor train of the parallel configuration, polymerizations may be carried out in either single reactor operation, in which monomer, comonomers, catalyst(s)/activator(s), scavenger(s), and optional solvent(s) are added continuously to a single reactor or in series reactor operation, in which the above components are added to two or more reactors connected in series. The catalyst components may be added to the first reactor in the series. The catalyst component may also be added to each reactor in the series reactor train. The fresh catalyst feed if added to more than one reactor in the series train may be the same or different to each reactor and their feed rates may be the same or different.

Polymerization processes of the fluid phase in-line process for blending disclosed herein also comprehend high-pressure reactors where the reactor is substantially unreactive with the polymerization reaction components and is able to withstand the high pressures and temperatures that occur during the polymerization reaction. Withstanding these high pressures and temperatures may allow the reactor to maintain the fluid reaction medium in its supercritical condition. Suitable reaction vessel designs include those necessary to maintain supercritical or other high-pressure ethylene polymerization reactions. Non-limiting exemplary reactors include autoclave, pump-around loop or autoclave, tubular, and autoclave/tubular reactors.

The polymerization processes of the fluid phase in-line process for blending disclosed herein may operate efficiently in autoclave (also referred to as stirred tank) and tubular reactors. Autoclave reactors may be operated in either a batch or continuous mode, although the continuous mode is advantageous. Tubular reactors always operate in continuous mode. Typically, autoclave reactors have length-to-diameter ratios of 1:1 to 20:1 and are fitted with a high-speed (up to 2000 RPM) multiblade stirrer and baffles arranged for optimal mixing. Commercial autoclave pressures are typically greater than 5 MPa with a maximum of typically less than 260 MPa. The maximum pressure of commercial autoclaves, however, may become higher with advances in mechanical and material science technologies.

When the autoclave has a low length-to-diameter ratio such as less than four), the feed streams may be injected at one position along the length of the reactor. Reactors with large diameters may have multiple injection ports at nearly the same or different positions along the length of the reactor. When they are positioned at the same length of the reactor, the injection ports are radially distributed to allow for faster intermixing of the feed components with the reactor content. In the case of stirred tank reactors, the separate introduction of the catalyst and monomer(s) may be advantageous in preventing the possible formation of hot spots in the unstirred feed zone between the mixing point and the stirred zone of the reactor. Injections at two or more positions along the length of the reactor is also possible and may be advantageous. In one exemplary embodiment, in reactors where the length-to-diameter ratio is from 4 to 20, the reactor may contain up to six different injection positions along the reactor length with multiple ports at some or each of the lengths.

Additionally, in the larger autoclaves, one or more lateral mixing devices may support the high-speed stirrer. These mixing devices can also divide the autoclave into two or more zones. Mixing blades on the stirrer may differ from zone to zone to allow for a different degree of plug flow and back largely independently, in the separate zones. Two or more autoclaves with one or more zones may connect in a series reactor cascade to increase residence time or to tailor polymer structure in a reactor train producing a polymer blending component. As previously described, a series reactor cascade or configuration consists of two or more reactors connected in series, in which the effluent of at least one upstream reactor is fed to the next reactor downstream in the cascade. Besides the effluent of the upstream reactor(s), the feed of any reactor in the series reactor cascade of a reactor train can be augmented with any combination of additional monomer, catalyst, or solvent fresh or recycled feed streams. Therefore, it should be understood that the iPP or EP copolymer blending component leaving a reactor train of the process disclosed herein may itself be a blend of the same polymer with increased molecular weight and/or compositional dispersion.

Tubular reactors may also be used in the fluid phase in-line process for blending disclosed herein and more particularly tubular reactors capable of to operating up to about 350 MPa. Tubular reactors are fitted with external cooling and one or more injection points along the (tubular) reaction zone. As in autoclaves, these injection points serve as entry points for monomers (such as propylene), one or more comonomer, catalyst, or mixtures of these. In tubular reactors, external cooling often allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Alternatively, tubular reactors may be fabricated with smooth, unpolished internal surfaces to address wall deposits. Tubular reactors generally may operate at pressures of up to 360 MPa, may have lengths of 100-2000 meters or 100-4000 meters, and may have internal diameters of less than 12.5 cm. Typically, tubular reactors have length-to-diameter ratios of 10:1 to 50,000:1 and include up to 10 different injection positions along its length.

Reactor trains that pair autoclaves with tubular reactors are also contemplated within the scope of the fluid phase in-line process for blending disclosed herein. In this reactor system, the autoclave typically precedes the tubular reactor or the two types of reactors form separate trains of a parallel reactor configuration. Such reactor systems may have injection of additional catalyst and/or feed components at several points in the autoclave, and more particularly along the tube length. In both autoclaves and tubular reactors, at injection, feeds are typically cooled to near ambient temperature or below to provide maximum cooling and thus maximum polymer production within the limits of maximum operating temperature. In autoclave operation, a preheater may operate at startup, but not after the reaction reaches steady state if the first mixing zone has some back-mixing characteristics. In tubular reactors, the first section of double-jacketed tubing may be heated (especially at start ups) rather than cooled and may operate continuously. A well-designed tubular reactor is characterized by plug flow wherein plug flow refers to a flow pattern with minimal radial flow rate differences. In both multizone autoclaves and tubular reactors, catalyst can not only be injected at the inlet, but also optionally at one or more points along the reactor. The catalyst feeds injected at the inlet and other injection points can be the same or different in terms of content, density, and concentration. Catalyst teed selection allows polymer design tailoring within a given reactor or reactor train and/or maintaining the desired productivity profile along the reactor length.

At the reactor outlet valve, the pressure drops to begin the separation of polymer and unreacted monomer, co-monomers, solvents and inerts, such as for example ethane, propane, hexane, and toluene. More particularly, at the reactor outlet valve, the pressure drops to levels below that which critical phase separation allowing for a polymer-rich phase and a polymer-lean phase in the downstream separation vessel. Typically, conditions remain above the polymer product's crystallization temperature. The autoclave or tubular reactor effluent may be depressurized on entering the downstream high-pressure separator (HPS or also referred to as a separator, separator vessel, separation vessel, separator/blender vessel, or separation/blending vessel).

As will be subsequently described in detail, the temperature in the separation vessel is maintained above the solid-fluid phase separation temperature, but the pressure may be below the critical point. The pressure need only be high enough such that the monomer may condense upon contacting standard cooling water. The liquid recycle stream may then be recycled to the reactor with a liquid pumping system instead of the hyper-compressors required for polyethylene units. The relatively low pressure in separator reduces the monomer concentration in the liquid polymer phase which results in a lower polymerization rate. The polymerization rate may be low enough to operate the system without adding a catalyst poison or "killer". If a catalyst killer is required (e.g., to prevent reactions in the high pressure recycle) then provision must be made to remove any potential catalyst poisons from the recycled polymer rich monomer stream for example, by the use of fixed bed adsorbents or by scavenging with an aluminum alkyl.

In an alternative embodiment, the HPS may be operated over the critical pressure of the monomer or monomer blend but within the dense fluid-fluid two phase region, which may be advantageous if the polymer is to be produced with a revamped high-pressure polyethylene (HPPE) plant. The recycled BPS overhead is cooled and dewaxed before being returned to the suction of the secondary compressor, which is typical of HPPE plant operation. The polymer from this intermediate or high-pressure vessel then passes through another pressure reduction step to a low pressure separator. The temperature of this vessel is maintained above the polymer melting point so that the polymer from this vessel can be fed as a liquid directly to an extruder or static mixer. The pressure in this vessel is kept low by using a compressor to recover the unreacted monomers, etc. to the condenser and pumping system referenced above.

In addition to autoclave reactors, tubular reactors, or a combination of these reactors, loop-type reactors may be utilized in the fluid phase in-line process for blending disclosed herein. In this reactor type, monomer enters and polymer exits continuously at different points along the loop, while an in-line pump continuously circulates the contents (reaction liquid). The feed/product takeoff rates control the total average residence time. A cooling jacket removes reaction heat from the loop. Typically feed inlet temperatures are near to or below ambient temperatures to provide cooling to the exothermic reaction in the reactor operating above the crystallization temperature of the polymer product. The loop reactor may have a diameter of 41 to 61 cm and a length of 100 to 200 meters and may operate at pressures of 25 to 30 MPa. In addition, an in-line pump may continuously circulate the polymerization system through the loop reactor.

The polymerization processes of the fluid phase in-line process for blending iPP and EP copolymer components disclosed herein may have residence to times in the reactors as short as 0.5 seconds and as long as several hours, alternatively from 1 sec to 120 min, alternatively from 1 second to 60 minutes, alternatively from 5 seconds to 30 minutes, alternatively from 30 seconds to 30 minutes, alternatively from 1 minute to 60 minutes, and alternatively from 1 minute to 30 minutes. More particularly, the residence time may be selected from 10, or 30, or 45, or 50, seconds, or 1, or 5, or 10, or 15, or 20, or 25, or 30 or 60 or 120 minutes. Maximum residence times may be selected from 1, or 5, or 10, or 15, or 30, or 45, or 60, or 120 minutes.

The monomer-to-polymer conversion rate (also referred to as the conversion rate) is calculated by dividing the total quantity of polymer that is collected during the reaction time by the amount of monomer added to the reaction. Lower conversions may be advantageous to limit viscosity although increase the cost of monomer recycle. The optimum total monomer conversion thus will depend on reactor design, product slate, process configuration, etc., and can be determined by standard engineering techniques. Total monomer conversion during a single pass through any individual reactor of the fluid phase in-line process for blending disclosed herein may be up to 90%, or below 80%, or below 60% or 3 to 80%, or 5 to 80%, or 10 to 80%, or 15 to 80%, or 20 to 80%, or 25 to 60%, or 3 to 60%, or 5 to 60%, or 10 to 60%, or 15 to 60%, or 20 to 60%, or 10 to 50%, or 5 to 40%, or 10 to 40%, or 40 to 50%, or 15 to 40%, or 20 to 40%, or 30 to 40% or greater than 5%, or greater than 10%. In one embodiment, when producing isotactic polypropylene and long-chain branching (LCB) of the polypropylene is desired (g'≤0.97 based on GPC-3D and using an isotactic polypropylene standard), single pass conversions may be above 30% and alternatively single-pass conversions may be above 40%. In another embodiment, when isotactic polypropylene essentially free of LCB is desired (0.97<g'<1.05), single-pass conversions may be not higher than 30% and alternatively single-pass-conversions may be not higher than 25%. To limit the cost of monomer separation and recycling, single-pass conversions may be above 3%, or above 5%, or above 10%. It should be understood that the above exemplary conversion values reflect total monomer conversion, i.e., the conversion obtained by dividing the combined conversion rate of all monomers by the total monomer feed rate. When monomer blends are used, the conversion of the more reactive monomer component(s) will always be higher than that of the less reactive monomer(s). Therefore, the conversion of the more reactive monomer component(s) can be substantially higher than the total conversion values given above, and can be essentially complete, approaching 100%.

Product Separation and Downstream Processing

The iPP and EP copolymer reactor effluents of the processes disclosed herein are depressurized to a pressure significantly below the cloud point pressure. This allows separation of a polymer-rich phase for further purification and a monomer-rich phase for optional separation and recycle compression back to the reactor(s). The reactor effluents may be optionally heated before pressure let down to avoid the separation of a solid polymer phase, which causes fouling of the separators and associated reduced-pressure lines. The separation of the polymer-rich phase and the monomer-rich phase in the processes disclosed herein is carried out in a vessel known as a high-pressure separator (also referred to as an HPS, separator, separator vessel, or separation vessel). The high-pressure separator located after the mixing point of the polymer-containing product streams of all reactor trains of the parallel reactor bank is also referred to as, separator-blender, separator-blender vessel, or separation-blending vessel recognizing its dual function of blending the said polymer-containing product streams while also separating a monomer-rich phase from a polymer-rich phase, the latter of which comprises the polymer blend of the in-line blending processes disclosed herein.

In certain embodiments, single-stream high-pressure separators employed to partially recover the monomer(s) and optional solvent(s) from the effluent of a single reactor train before sending the polymer-enriched stream to the downstream separator-blender. In such embodiments, the separator-blender blends one or more polymer-enriched stream with one or more unreduced reactor train effluent to yield a monomer-rich phase and a polymer-rich phase, the latter of which comprises the polymer blend of the in-line blending process disclosed herein. In another embodiment, the single-stream high-pressure separator placed upstream of the separator-blender also functions as a buffer vessel (separator-buffer vessel) by allowing the fluid level of the polymer-enriched phase vary in the separator-buffer vessel. Such buffering enables a more precise control of the blend ratios by compensating for the momentary fluctuations in the production rates in the individual reactor trains of the in-line blending process disclosed herein.

The polymer rich phase of the separator-blender may then be transferred to one or more low-pressure separators (LPS also referred to as a low-pressure separation vessel) running at just above atmospheric pressure for a simple flash of light components, reactants and oligomers thereof, for producing a low volatile-containing polymer melt entering the finishing extruder or optional static mixer. The one or more low-pressure separators are distinguished from the one or more high-pressure separators in generally operating at lower pressures relative to the high-pressure separators. The one or more low-pressure separators also are located downstream of the one or more high-pressure separators including the separator-blender. Moreover, the one or more low-pressure separators may function to separate light from heavy components comprising the polymer blend of the in-line blending process disclosed herein, whereas the one or more high-pressure separators may function to separate light from heavy components upstream of the low-pressure separator i.e. monomer-rich phase from polymer-rich phase) and may function to blend the polymer-rich phases from two or more parallel reactor trains or may function as buffers. As previously stated, a high-pressure separator may be alternatively referred to herein as an HPS, separator, separator vessel, separation vessel, separator-blender vessel, or separation-blending vessel, or separator-blender. The use of the term "pressure" in conjunction with low-pressure separator and high-pressure separator is not meant to identify the absolute pressure levels at which these separators operate at, but is merely intended to given the relative difference in pressure at which these separators operate. Generally, separators located downstream in the in-line blending processes disclosed herein operate at lower pressure relative to separators located upstream.

In one embodiment of the fluid phase in-line process for blending iPP and EP copolymer blend components disclosed herein, polymerization is conducted in two or more reactors of a type described herein above under agitation and above the cloud point for the polymerization system. Then, the polymer-monomer mixtures are transferred into a high-pressure separation-blending vessel, where the pressure is allowed to drop below the cloud point. This advantageously results in the denser, polymer-rich phase separating from the lighter monomer-rich phase. As may be appreciated by those skilled in the art, it may optionally be necessary to increase the temperature before or in the high-pressure separation vessel to prevent the formation of a solid polymer phase as the polymer becomes more concentrated. The monomer-rich phase is then separated and recycled to the reactors while the polymer-rich phase is fed to a coupled devolatilizer—such as a LIST dryer (DTB) or devolatizing extruder.

The recycle runs through a separator, where the pressure depends on the pressure-temperature relationship existing within the reactor. For example, supercritical propylene polymerization can be carried out under agitation in the single-phase region in the reactor at 40 to 200 MPa and 95 to 180° C. (see FIG. 18). The product mixture can be discharged into a separator vessel, where the pressure is dropped to a level of 25 MPa or lower, in which case, the mixture is below its cloud point, while the monomer has not yet flashed off (again, see FIG. 18). Under such conditions, it would be expected from Radosz et al., Ind. Eng. Chem. Res. 1997, 36, 5520-5525 and Loos et al., Fluid Phase Equil. 158-160, 1999, 835-846 that the monomer-rich phase would comprise less than about 0.1 wt % of low molecular weight polymer and have a density of approximately 0.3 to 0.6 g/mL (see FIG. 19). The polymer-rich phase would be expected to have a density of approximately 0.5 to 0.8 g/mL.

Assuming that the pressure is dropped rapidly enough, for example, greater than or equal to about 6 MPa/sec, the phases will separate rapidly, permitting the recycle of the monomer-rich phase as a liquid, without the issue of having the monomer-rich phase return to the gas phase. As may be appreciated by those skilled in the art, this eliminates the need for the energy-intensive compression and condensation steps.

The polymer-rich phase is sent directly to a coupled devolatilizer. Suitable devolatilizers may be obtained, for example, from LIST USA Inc., of Charlotte, N.C. The devolatilization is a separation process to separate remaining volatiles from the final polymer, eliminating the need for steam stripping. Working under low vacuum, the polymer solution flashes into the devolatilizer, exits the unit and is then transferred on for further processing, such as pelletization.

Any low or very low molecular weight polymer present in the monomer-rich phase to be recycled may optionally be removed through "knock-out" pots, standard hardware in reactors systems, or left in the return stream depending upon product requirements and the steady-state concentration of the low molecular weight polymer fraction in the product.

In solution reactor processes, present practices employed by those skilled in the art typically effect separation by flashing monomer and solvent or accessing the high-temperature cloud point.

In another form, polymerization is conducted at conditions below the cloud point, with the polymer-monomer mixture transported to a gravimetric separation vessel, where the pressure could be further lowered if desired to enhance phase separation of the polymer-rich and monomer-rich phases. In either of the forms herein described, the monomer, for example, propylene, is recycled while staying in a relatively high density, liquid-like (supercritical or bulk liquid) state. Once again, one or more knock-out pots may be employed to aid in the removal of low molecular weight polymer from the recycle stream.

Figure 20:
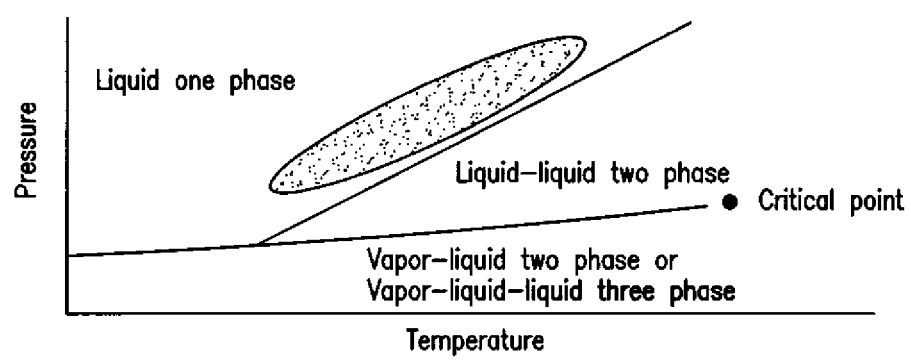
FIG. 20 presents an operating regime in accordance with the process disclosed herein for a reactor operating in a single liquid phase.

As may be appreciated, there are possible and optimal operating regimes for reactors and for the gravity (lower critical solution temperature (LCST)) separator. Referring now to FIG. 20, for reactors operating in a single liquid phase regime, a possible region for operation is just above the LCST and vapor pressure (VP) curves. The optimal region (shown within the shaded oval) for operation occurs at temperatures just above the lower critical end point (LCEP) and at pressures slightly above the LCST curve.

Figure 21:
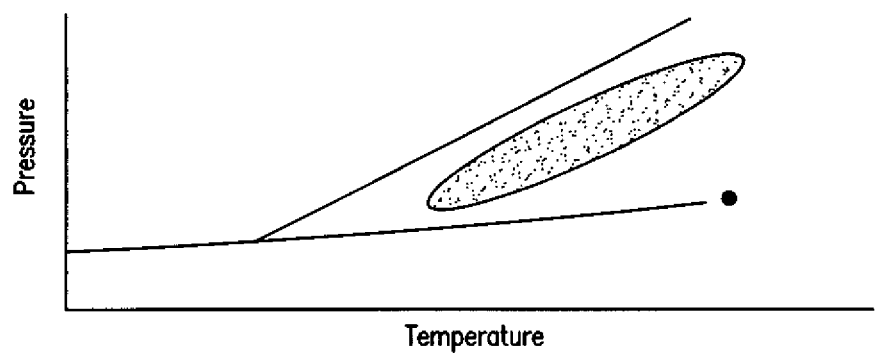
FIG. 21 presents an operating regime in accordance with the process disclosed herein for a reactor operating in a liquid-liquid phase.

Referring now to FIG. 21, for reactors operating within a two-phase fluid-fluid regime, the possible region for operation occurs basically anywhere below the LCST curve. The optimal region (again, shown within the shaded oval) occurs just below the LCST and above the VP curve, although, as may be appreciated, many factors could have a bearing on what actually is optimal, such as the final properties of the desired product. As recognized by those skilled in the art, the two-phase liquid-liquid regime is the economically advantageous method if polypropylene is to be produced with a revamped HPPE plant.

Figure 22:
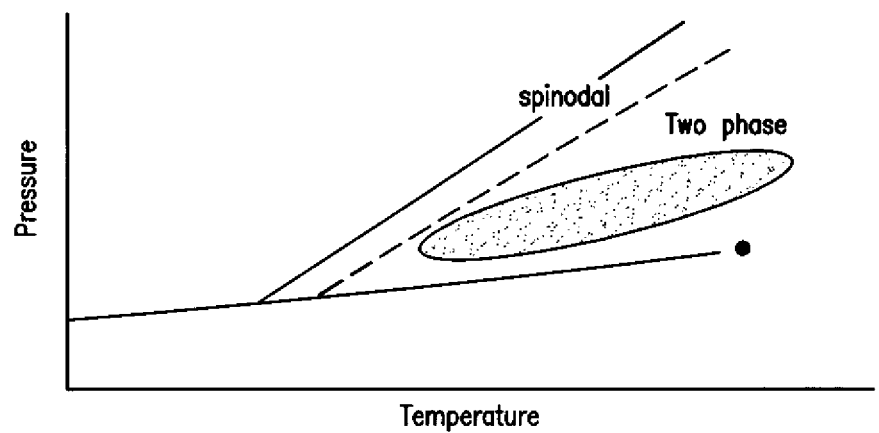
FIG. 22 presents an operating regime in accordance with the process disclosed herein for a gravity separator.
Figure 23:
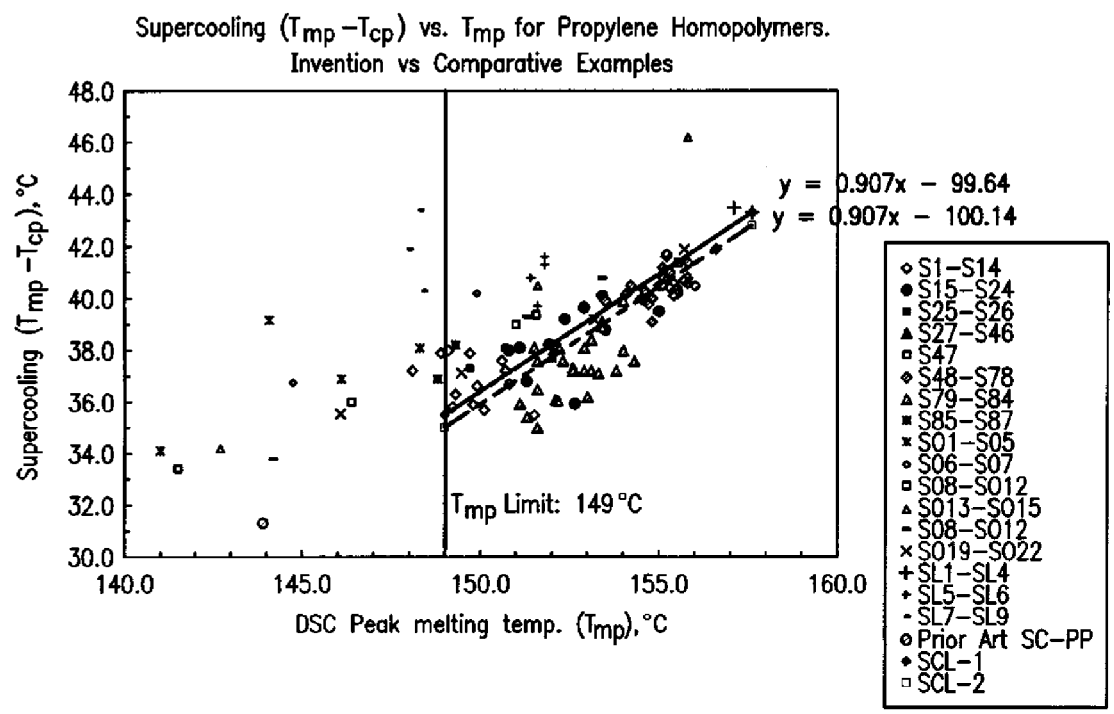
FIG. 23 presents supercooling versus melting peak temperature for the iPP blend component.

Referring now to FIG. 22, for the case where polymerization is conducted at conditions below the cloud point and the polymer-monomer mixture transported to a gravimetric LCST separator, the possible region of operation is anywhere below the LCST curve and above the VP curve. The optimal region (again, shown within the shaded oval) occurs within that portion that is below the spinodal, but not too low in pressure, as shown. Operating in this regime assures that the energy use is optimized. It is also desirable to avoid operation in the region between the LCST and spinodal curves in order to obtain good gravity settling performance. Moreover, it is desirable that the separation is effected at sufficiently high temperatures, so that crystallization does not occur in the polymer-rich phase. This may require that the temperature of the mixture in the separator be higher than the temperature in the reactor(s).

Advantageously, the liquid monomer-rich recycle stream can be recycled to the reactor using a liquid pumping system instead of a hyper-compressor, required for conventional polyethylene units.

Isotactic PP and EP Copolymer Polymerization Catalyst Killing

The use of the processes disclosed herein and the relatively low pressure in the separator vessel greatly reduces the monomer concentration in the liquid polymer-rich phase, which, in turn, results in a much lower polymerization rate. This polymerization rate may be low enough to operate this system without adding a catalyst poison or "killer". If no killing compounds are added then the killer removal step may be eliminated.

If a catalyst killer is required, then provision must be made to remove any potential catalyst poisons from the recycled monomer-rich stream (e.g. by the use of fixed bed adsorbents or by scavenging with an aluminum alkyl). The catalyst activity may be killed by addition of a polar species. Non-limiting exemplary catalyst killing agents include water, alcohols (such as methanol and ethanol), sodium/calcium stearate, CO, and combinations thereof. The choice and quantity of killing agent will depend on the requirements for clean up of the recycle propylene and comonomers as well as the product properties, if the killing agent has low volatility. The catalyst killing agent may be introduced into the reactor effluent stream after the pressure letdown valve, but before the HPS. The choice and quantity of killing agent may depend on the requirements for clean up of the recycle propylene and comonomers as well as the product properties, if the killing agent has low volatility.

Polymer Additives

The in-line iPP and EP copolymer blends produced by the process disclosed herein may be also blended with other polymers and additives using the in-line blending process for other polymers and additives depicted in FIG. 7, in an extrusion process downstream of in-line polymerization/separation/blending processes disclosed herein, or blended in an off-line compounding process.

Tackifiers may also be blended either in-line by the processes disclosed herein (see FIG. 7), in-line via an extrusion process downstream of in-line polymerization/separation/blending processes disclosed herein, or in an off-line compounding process. Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is non-polar. Non-polar tackifiers are substantially free of monomers having polar groups. The polar groups are generally not present; however, if present, they are not present at more that 5 wt %, or not more that 2 wt %, or no more than 0.5 wt %. In some embodiments, the tackifier has a softening point (Ring and Ball, as measured by ASTM E-28) of 80° C. to 140° C., or 100° C. to 130° C. In some embodiments the tackifier is functionalized. By functionalized is meant that the hydrocarbon resin has been contacted with an unsaturated acid or anhydride. Useful unsaturated acids or anhydrides include any unsaturated organic compound containing at least one double bond and at least one carbonyl group. Representative acids include carboxylic acids, anhydrides, esters and their salts, both metallic and non-metallic. The organic compound may contain an ethylenic unsaturation conjugated with a carbonyl group (—C=O). Non-limiting examples include maleic, fumaric, acrylic, methacrylic, itaconic, crotonic, alpha-methyl crotonic, and cinnamic acids as well as their anhydrides, esters and salt derivatives. Maleic anhydride is particularly useful. The unsaturated acid or anhydride may be present in the tackifier at about 0.1 wt % to 10 wt %, or at 0.5 wt % to 7 wt %, or at 1 to 4 wt %, based upon the weight of the hydrocarbon resin and the unsaturated acid or anhydride.

The tackifier, if present, is typically present at 1 wt % to 50 wt %, based upon the weight of the blend, or 10 wt % to 40 wt %, or 20 wt % to 40 wt %. Generally however, tackifier is not present, or if present, is present at less than 10 wt %, or less than 5 wt %, or at less than 1 wt %.

In another form, the polymer blends produced by the processes disclosed herein further comprise a crosslinking agent. The crosslinking agent may be blended either in-line by the processes disclosed herein (see FIG. 11), in-line via an extrusion process downstream of in-line polymerization/separation/blending processes disclosed herein, or in an off-line compounding process. Useful crosslinking agents include those having functional groups that can react with the acid or anhydride group and include alcohols, multiols, amines, diamines and/or tramlines. Non-limiting examples of crosslinking agents useful include polyamines such as ethylenediamine, diethylenetriamine, hexamethylenediamine, diethylaminopropylamine, and/or menthanediamine.

In another form, the polymer blends produced by the processes disclosed herein, and/or blends thereof, further comprise typical additives known in the art such as fillers, cavitating agents, antioxidants, surfactants, adjuvants, plasticizers, block, antiblock, color masterbatches, pigments, dyes, processing aids, UV stabilizers, neutralizers, lubricants, waxes, nucleating agents and/or clarifying agents. These additives may be present in the typically effective amounts well known in the art, such as 0.001 wt % to 10 wt %. These additive may be blended either in-line by the processes disclosed herein (see FIG. 11), in-line via an extrusion process downstream of in-line polymerization/separation/blending processes disclosed herein, or in an off-line compounding process.

Useful fillers, cavitating agents and/or nucleating agents include titanium dioxide, calcium carbonate, barium sulfate, silica, silicon dioxide, carbon black, sand, glass beads, mineral aggregates, talc, clay and the like. Nucleating agents of the non-clarifying type include, but are not limited to, sodium benzoate, Amfine NA 11, Amfine NA 21, and Milliken HPN 68.

Useful antioxidants and UV stabilizers include phenolic antioxidants, such as Irganox 1010, Irganox 1076 both available from Ciba-Geigy. Oils may include paraffinic or naphthenic oils such as Primol 352, or Primol 876 available from ExxonMobil Chemical France, S.A. in Paris, France. The oils may include aliphatic naphthenic oils, white oils or the like.

Plasticizers and/or adjuvants may include mineral oils, polybutenes, phthalates and the like. The plasticizers may include phthalates such as diisoundecyl phthalate (DIUP), diisononylphthalate (DINP), dioctylphthalates DOP) and polybutenes, such as Parapol 950 and Parapol 1300 available from ExxonMobil Chemical Company in Houston Tex. Additional plasticizers include those disclosed in WO0118109A1, U.S. patent application Ser. No. 10/640,435, and U.S. patent application Ser. No. 11/177,004, which are incorporated by reference herein with regard to plasticizer compositions and blending thereof.

Useful processing aids, lubricants, waxes, and/or oils include low molecular weight products such as wax, oil or low $M_n$ polymer, (low meaning below $M_n$ of 5000, or below 4000, or below 3000, or below 2500). Useful waxes include polar or non-polar waxes, functionalized waxes, polypropylene waxes, polyethylene waxes, and wax modifiers.

Useful functionalized waxes include those modified with an alcohol, an acid, or a ketone. Functionalized means that the polymer has been contacted with an unsaturated acid or anhydride. Useful unsaturated acids or anhydrides include any unsaturated organic compound containing at least one double bond and at least one carbonyl group. Representative acids include carboxylic acids, anhydrides, esters and their salts, both metallic and non-metallic. The organic compound may contain an ethylenic unsaturation conjugated with a carbonyl group (—C=O). Non-limiting examples include maleic, fumaric, acrylic, methacrylic, itaconic, crotonic, alpha-methyl crotonic, and cinnamic acids as well as their anhydrides, esters and salt derivatives. Maleic anhydride is particularly useful. The unsaturated acid or anhydride may be present at 0.1 wt % to 10 wt %, or at 0.5 wt % to 7 wt %, or at 1 to 4 wt %, based upon the weight of the hydrocarbon resin and the unsaturated acid or anhydride. Examples include waxes modified by methyl ketone, maleic anhydride or maleic acid. Low Mn polymers include polymers of lower alpha olefins such as propylene, butene, pentene, hexene and the like. A useful polymer includes polybutene having an Mn of less than 1000 g/mol. An example of such a polymer is available under the trade name PARAPOL™ 950 from ExxonMobil Chemical Company. PARAPOL™ 950 is a liquid polybutene polymer having an Mn of 950 g/mol and a kinematic viscosity of 220 cSt at 100° C., as measured by ASTM D 445.

Useful clarifying agents include, but are not limited to the benzalsorbitol family of clarifiers, and more particularly dibenzalsorbitol (Millad 3905), di-p-methylbenzalsorbitol (Milliad 3940), and bis-3,4-dimethylbenzalsorbitol (Milliad 3988).

EXAMPLES

Disclosure Propylene Polymerization Examples at Supercritical Conditions

All polymerizations were performed in bulk polymerization systems (i.e., without using solvent, except for what was introduced with the catalyst solution, which did not exceed 10 wt %) and without monomer recycle.

All polymerization experiments were performed in a continuous stirred tank reactor (CSTR) made by Autoclave Engineers, Erie Pa. The reactor was designed for operating at a maximum pressure and temperature of 207 MPa (30 kpsi) and 225° C., respectively. The nominal reactor volume was 150 mL with a working volume of 127 mL (working volume lower due to reactor internals). The reactor was equipped with an electric heater and with a stirrer with a magnetic drive. A pressure transducer located on the monomer feed line measured the pressure in the reactor. The temperature was measured inside the reactor using a type-K thermocouple. The reactor was protected against over-pressurization by automatically opening an air-actuated valve (High Pressure Company, Erie, Pa.) in case the reactor pressure exceeded the preset limit. A flush-mounted rupture disk located on the side of the reactor provided further protection against catastrophic pressure failure. All product lines were heated to ~150° C. to prevent fouling. The reactor body had two heating bands that were controlled by a programmable logic control device (PLC). The reactor did not have cooling capability. Once the reactor lined out during polymerization, its temperature was controlled manually by adjusting the flow rates of the monomer and catalyst feeds. No external heating was necessary in most experiments, i.e. the reactor temperature was maintained by controlling the heat released by the polymerization process.

Two independent lock-hopper assemblies were used to manage the effluent flow from the reactor: one for waste collection during start up and shut down, and the other one for product collection during the balance period at lined out, steady state conditions. Each lock-hopper consisted of two air-actuated valves bracketing a short piece of high-pressure tubing. Changing the internal diameter and/or the length of the lock-hopper tube allowed the adjustment of the volume of the lock-hoppers. Aliquots of the reactor content were taken out continuously by running the lock-hopper valves in cycles. One lock-hopper cycle consisted of first opening and closing of the valve between the lock-hopper tube and the reactor followed by opening and closing the downstream valve. Adjustments in the frequency of the lock-hopper cycles allowed maintaining the desired reactor pressure at a preset feed rate. The volume and the frequency of the two lock-hoppers were always set the same to allow switching between the lock-hoppers without affecting the steady state condition of the reactor. A drain port on the bottom of the reactor was used to empty the reactor after each experiment.

The application of lock-hoppers for product removal afforded robust reactor operations independent of the properties of the polymer made and/or the polymer concentration in the effluent. This operation mode, however, introduced short-term fluctuations both in the pressure and the temperature of the reactor. Typical pressure and temperature fluctuations caused by the operation of the lock-hopper at 207 MPa (30 kpsi) reactor pressure were less than 20.7 MPa (3 kpsi) and 1.5° C., respectively. The reported reaction pressure and temperature values were obtained by calculating the averages of the pressure and temperature data acquired during the entire time of product collection, which can be referred to as balance period.

Propylene was fed from low-pressure cylinders equipped with a dip leg for liquid delivery to the reactor. Heating blankets provided heat to increase the cylinder head pressure to deliver the monomer to the feed pump at a pressure above the bubble point of the feed. The low-pressure monomer feed was also stabilized against bubble formation by cooling the pump head using chilled water running at 10° C. The monomer feed was purified using two separate beds in series: activated copper (reduced in flowing $H_2$ at 225° C. and 1 bar) for oxygen removal and molecular sieve (5A, activated in flowing $N_2$ at 270° C.) for water removal. The purified monomer feed was fed by a diaphragm pump (Model MhS 600/11, ProMinent Orlita, Germany) through the stirrer head into the reactor. The monomer flow rate was measured by a Coriolis mass flow meter (Model PROline Promass 80, Endress and Hauser) that was located downstream of the purification traps on the low-pressure side of the feed pump. The pressure fluctuation in the reactor caused some minor fluctuation in the feed rate. The reported feed flows were determined by averaging the flow rate during the entire balance period.

The catalyst feed solution was prepared inside an argon-filled dry box (Vacuum Atmospheres). The atmosphere in the glove box was purified to maintain <1 ppm $O_2$ and <1 ppm water. All glassware was oven-dried for a minimum of 4 hours at 120° C. and transferred hot to the antechamber of the dry box. Stock solutions of the catalyst precursors and the activators were prepared using purified toluene and stored in amber bottles inside the dry box. Aliquots were taken to prepare fresh activated catalyst solutions before each polymerization experiment. Catalyst concentrations of the catalyst feed were adjusted to maintain the target reaction temperature at feed rates that introduced not more than 3 to 8 wt % of catalyst solvent (toluene) into the reactor. Due to the small scale and daily start-ups of our reactor, impurity levels were difficult to stabilize, thus catalytic activities varied from run to run. Nonetheless, catalytic activities were very high, particularly with non-coordinating anion activators, typically requiring catalyst concentrations on the order of 10 to 100 mol ppb in the combined feed to the reactor.

In a typical experiment, the reactor was preheated to ~10 to 15° C. below that of the desired reaction temperature. During the line-out period, the catalyst feed and lock-hopper rates were adjusted to reach and maintain the target reaction temperature and pressure. Once the reactor reached steady state at the desired conditions, product collection was switched from the waste collection to the on-balance product collection vessel. The reactor was typically run on-balance between 30 to 90 min, after which the effluent was redirected to the waste collection vessel and the reactor was shut down. The products were collected from the on-balance vessel. The products were vacuum-dried overnight at 70° C. before characterization. The conversion and reaction rates were determined based on the total feed used and the product yield during the balance period.

Catalyst productivity, expressed as g product per g catalyst, is the product of catalyst activity and residence time. In order to generate a scaleable kinetic characterization parameter for catalytic activity, we also determined the turnover frequency (TOF), expressed as mol monomer converted per mol catalyst in one second. TOF was calculated by dividing the average monomer conversion rate with the average catalyst inventory in the reactor. The latter in turn was determined by multiplying the catalyst feed rate with the residence time of the reaction medium. The residence time was derived from the reactor free volume and the volumetric flow rate of the reaction medium. The total mass flow was generated by summing of the individual feed flows. In order to convert mass flows into volumetric flows, the density of the reaction medium was calculated using a proprietary thermodynamic software. The software enabled the calculation of the density of polymer-containing blends at reactor conditions.

Anhydrous toluene from Sigma-Aldrich was used in catalyst preparation and for reactor flushing. Initially, it was used as received (18-liter stainless steel vessels, $N_2$ head pressure) for reactor rinsing and flushing. Later, copper and molecular sieve traps were installed in the toluene feed line, the description of which is given earlier for the gas feed (vide supra). Propylene Grade 2.5 (BOC) was obtained in #100 low-pressure cylinders. The methylaluminoxane (MAO) activator (10 wt % in toluene) was purchased from Albermarle Corporation and was used as received. Tri-isobutylaluminum (Sigma-Aldrich) was used for aestivating the feed line and the reactor if they were exposed to air during maintenance.

Tables 1a, 1b, and 1c list the catalyst precursor compositions, activators, MFR and NMR results (see also the footnotes of the tables). Tables 2a and 2b list thermal properties (crystallization and melting data) and molecular weight data for the disclosed polypropylenes made at the conditions described in Tables 1a, 1b, and 1c. Note that each disclosed product listed in these tables is identified by a unique sample ID in the first column in Tables 1a, 1b, and 1c. These ID numbers are the same as those listed in Tables 2a and 2b. Melting and crystallization data listed were obtained at a cooling rate of 10° C./min using differential scanning calorimetry (DSC). Details of the experimental conditions are described later (vide infra). Heat of fusion of the melting endothermic listed in the column indicated by ΔHf is converted to % crystallinity as described later (vide infra). The difference between melting peak temperature (Tmp) and crystallization peak temperature (Tcp) is listed in the column indicated as supercooling range (Tmp–Tcp). Supercooling limit (SCL) is calculated using SCL=0.909Tmp−99.64 where SCL is the limiting Tmp–Tcp separating comparative and novel polypropylenes. Comparative polypropylenes have experimental Tmp-Tcp values larger than the SCL values, while the Tmp–Tcp values for the novel polypropylenes are equal or fall below the SCL values. Molecular weight (Mw, Mn, Mz) listed in these tables are obtained via GPC (details given later—vide infra).

FIG. 1 shows a plot of supercooling range (Tmp–Tcp) (data from Tables 2a and 2b) plotted against peak melting temperature (Tmp). Also plotted in this figure are comparative polypropylene products obtained from solution and slurry processes. As FIG. 1 demonstrates, the novel polypropylenes, from a variety of catalysts, cluster separately from the comparative products, showing a reduced supercooling range for products with the same melting peak temperature. This in turn affords better crystallization properties for the novel disclosure products compared to comparative polypropylenes with identical melting peak temperatures. Tables 3 and 4 describe the process conditions and characterization data for the comparative solution products, while Tables 5, 6 and 7 show the corresponding details of the comparative slurry products. Note that in comparison, polypropylenes made with the process described herein show lower supercooling ranges (i.e., are at or fall below the SCL values) than comparative products. At a given peak melting temperature these products show higher peak crystallization temperature (lower values of supercooling Tmp–Tcp) than comparative products. The higher crystallization temperature (Tcp) implies faster crystallizability, without the need for external nucleating agents, versus the comparative polypropylene products from other processes. This is a desirable attribute for end-use articles such as films, fibers and fabrics, molded parts.

TABLE 1a

Process Conditions, MFR, and NMR Results for Inventive Polypropylenes

| | Precursor | | | | Reactor | | Catalyst | | Pentads | Regio |
|---|---|---|---|---|---|---|---|---|---|---|
| Sample ID | Metallocene Ligand | Central Atom | $Cl_2$/ $Me_2$ | Activator | Temp °C. | Pressure MPa | Productivity kg P/g prec | MFR g/10 min | mol fraction mmmm | Defects/ 10,000 $C_3^=$ |
| S1 | 1 | Zr | Cl2 | MAO | 124 | 72.6 | 87 | 76 | 0.991 | 81 |
| S2 | 1 | Zr | Cl2 | MAO | 124 | 72.6 | 128 | 107 | 0.992 | 84 |
| S3 | 1 | Zr | Cl2 | MAO | 121 | 75.5 | 39 | 39 | 0.989 | 75 |
| S4 | 1 | Zr | Cl2 | MAO | 122 | 133.2 | 82 | 10 | 0.994 | 79 |
| S5 | 1 | Zr | Cl2 | MAO | 120 | 137.7 | 43 | 15 | 0.992 | 75 |
| S6 | 1 | Zr | Cl2 | MAO | 124 | 139.9 | 91 | 34 | 0.990 | 81 |
| S7 | 1 | Zr | Cl2 | MAO | 123 | 143.3 | 82 | 33 | 0.987 | 87 |
| S8 | 1 | Zr | Cl2 | MAO | 122 | 194.5 | 38 | 43 | 0.988 | 95 |
| S9 | 1 | Zr | Cl2 | MAO | 120 | 210.9 | 46 | 8 | 0.994 | 84 |
| S10 | 1 | Zr | Cl2 | MAO | 119 | 212.2 | 115 | 9 | 0.989 | 85 |
| S11 | 1 | Zr | Cl2 | MAO | 127 | 70.9 | 851 | 180 | 0.989 | 84 |
| S12 | 1 | Zr | Cl2 | MAO | 128 | 70.1 | 626 | 57 | 1.001 | 68 |
| S13 | 1 | Zr | Cl2 | MAO | 129 | 137.3 | 61 | 23 | 0.984 | 88 |
| S14 | 1 | Zr | Cl2 | MAO | 130 | 204.8 | 58 | 18 | 0.988 | 96 |
| S15 | 1 | Zr | Me2 | B1 | 100.1 | 40.2 | 632 | 18 | 0.990 | 44 |
| S16 | 1 | Zr | Me2 | B1 | 102.2 | 73.3 | 491 | 6 | 0.990 | 48 |
| S17 | 1 | Zr | Me2 | B1 | 106.9 | 72.7 | 807 | 26 | 0.990 | 52 |
| S18 | 1 | Zr | Me2 | B1 | 119.1 | 39.3 | 1224 | 80 | 0.988 | 53 |
| S19 | 1 | Zr | Me2 | B1 | 120.3 | 40.2 | 1093 | 122 | 0.983 | 52 |
| S20 | 1 | Zr | Me2 | B1 | 116.8 | 71.9 | 33 | 58 | 0.983 | 56 |
| S21 | 1 | Zr | Me2 | B1 | 119.1 | 71.9 | 1358 | 38 | 0.986 | 56 |
| S22 | 1 | Zr | Me2 | B1 | 119.4 | 138.7 | 283 | 19 | 0.989 | 62 |
| S23 | 1 | Zr | Me2 | B1 | 117.8 | 139.0 | 178 | 15 | 0.988 | 60 |
| S24 | 1 | Zr | Me2 | B1 | 126.7 | 33.8 | 1364 | 149 | 0.983 | 60 |
| S25 | 5 | Hf | Cl2 | MAO | 121 | 137.6 | 31 | 11 | 0.994 | 80 |
| S26 | 5 | Hf | Cl2 | MAO | 122 | 138.7 | 33 | 54 | 0.993 | 76 |
| S27 | 4 | Zr | Cl2 | MAO | 113 | 60.7 | 112 | 15 | 0.993 | 61 |
| S28 | 4 | Zr | Cl2 | MAO | 113 | 62.9 | 129 | 26 | 0.984 | 65 |
| S29 | 4 | Zr | Cl2 | MAO | 111 | 71.7 | 134 | 24 | 0.991 | 61 |
| S30 | 4 | Zr | Cl2 | MAO | 112 | 73.7 | 160 | 19 | 0.992 | 63 |

Ligands: 1 = rac-dimethylsilyl-bis(2-methyl, 4-phenylindenyl), 2 = rac-dimethylsilyl-bis(2-isopropyl, 4-naphthylindenyl), 3 = rac-dimethylsilyl-bis(2-methyl, 4-naphthylindenyl), and 4 = rac-dimethylsilyl-bis(2-methyl, 4-(3',5'-di-tert-butyl-phenyl)indenyl).
Activators: MAO = methylaluminoxane, B1 = N,N-dimethylaniliniumtetrakis(pentafluorophenyl)borate, and C = N,N-dimethylaniliniumtetrakis(heptafluoronaphthyl)borate.

TABLE 1b

Process Conditions, MFR, and NMR Results for Inventive Polypropylenes

| | Precursor | | | | Reactor | | Catalyst | | Pentads | Regio |
|---|---|---|---|---|---|---|---|---|---|---|
| Sample ID | Metallocene Ligand | Central Atom | $Cl_2/Me_2$ | Activator | Temp °C. | Pressure MPa | Productivity kg P/g prec | MFR g/10 min | mol fraction mmmm | Defects/ 10,000 $C_3^-$ |
| S31 | 4 | Zr | Cl2 | MAO | 112 | 74.6 | 150 | 12 | 0.989 | 56 |
| S32 | 4 | Zr | Cl2 | MAO | 110.1 | 75.3 | 138 | 11 | 0.994 | 61 |
| S33 | 4 | Zr | Cl2 | MAO | 111 | 202.5 | 79 | 2 | 0.995 | 72 |
| S34 | 4 | Zr | Cl2 | MAO | 116 | 36.7 | 145 | 63 | 0.995 | 75 |
| S35 | 4 | Zr | Cl2 | MAO | 117 | 36.7 | 150 | 85 | 0.995 | 58 |
| S36 | 4 | Zr | Cl2 | MAO | 116 | 48.3 | 160 | 45 | 0.990 | 69 |
| S37 | 4 | Zr | Cl2 | MAO | 116 | 60.3 | 165 | 30 | 0.994 | 67 |
| S38 | 4 | Zr | Cl2 | MAO | 114 | 61.1 | 164 | 31 | 0.989 | 70 |
| S39 | 4 | Zr | Cl2 | MAO | 114 | 62.9 | 153 | 26 | 0.992 | 69 |
| S40 | 4 | Zr | Cl2 | MAO | 114 | 63.5 | 143 | 30 | 0.989 | 66 |
| S41 | 4 | Zr | Cl2 | MAO | 118 | 48.1 | 127 | 51 | 0.996 | 65 |
| S42 | 4 | Zr | Cl2 | MAO | 118 | 48.2 | 150 | 73 | 0.995 | 64 |
| S43 | 4 | Zr | Cl2 | MAO | 120 | 48.2 | 147 | 77 | 0.999 | 75 |
| S44 | 4 | Zr | Cl2 | MAO | 118 | 48.4 | 158 | 69 | 0.998 | 66 |
| S45 | 4 | Zr | Cl2 | MAO | 118 | 49.1 | 158 | 64 | 0.997 | 65 |
| S46 | 4 | Zr | Cl2 | MAO | 120 | 202.0 | 111 | 8 | 0.996 | 68 |
| S47 | 4 | Zr | Me2 | C | 103.2 | 204.0 | 107 | 1 | 0.992 | 48 |
| S48 | 4 | Zr | Me2 | B1 | 111 | 48.3 | 23 | 12 | 0.995 | 39 |
| S49 | 4 | Zr | Me2 | B1 | 114 | 54.4 | 33 | 21 | 0.994 | 41 |
| S50 | 4 | Zr | Me2 | B1 | 114.2 | 57.3 | 611 | 17 | 0.995 | 43 |
| S51 | 4 | Zr | Me2 | B1 | 117 | 51.6 | 39 | 22 | 0.995 | 45 |
| S52 | 4 | Zr | Me2 | B1 | 116.7 | 58.0 | 76 | 28 | 0.994 | 44 |
| S53 | 4 | Zr | Me2 | B1 | 117.8 | 56.2 | 519 | 32 | 0.991 | 44 |
| S54 | 4 | Zr | Me2 | B1 | 118 | 56.0 | 136 | 27 | 0.992 | 44 |
| S55 | 4 | Zr | Me2 | B1 | 118 | 57.6 | 80 | 37 | 0.992 | 45 |
| S56 | 4 | Zr | Me2 | B1 | 118.1 | 55.6 | 717 | 36 | 0.991 | 46 |
| S57 | 4 | Zr | Me2 | B1 | 118.1 | 56.0 | 431 | 29 | 0.991 | 46 |
| S58 | 4 | Zr | Me2 | B1 | 118 | 49.6 | 46 | 87 | 0.994 | 46 |
| S59 | 4 | Zr | Me2 | B1 | 118.2 | 57.4 | 207 | 35 | 0.993 | 48 |
| S60 | 4 | Zr | Me2 | B1 | 118.6 | 57.3 | 682 | 30 | 0.990 | 45 |

Ligands: 1 = rac-dimethylsilyl-bis(2-methyl, 4-phenylindenyl), 2 = rac-dimethylsilyl-bis(2-isopropyl, 4-naphthylindenyl), 3 = rac-dimethylsilyl-bis(2-methyl, 4-naphthylindenyl), and 4 = rac-dimethylsilyl-bis(2-methyl, 4-(3',5'-di-tert-butyl-phenyl)indenyl).
Activators: MAO = methylaluminoxane, B1 = N,N-dimethylaniliniumtetrakis(pentafluorophenyl)borate, and C = N,N-dimethylaniliniumtetrakis(heptafluoronaphthyl)borate.

TABLE 1c

Process Conditions, MFR, and NMR Results for inventive Polypropylenes

| | Precursor | | | | Reactor | | Catalyst | | Pentads | Regio |
|---|---|---|---|---|---|---|---|---|---|---|
| Sample ID | Metallocene Ligand | Central Atom | $Cl_2/Me_2$ | Activator | Temp °C. | Pressure MPa | Productivity kg P/g prec | MFR g/10 min | mol fraction mmmm | Defects/ 10,000 $C_3^-$ |
| S61 | 4 | Zr | Me2 | B1 | 119 | 49.3 | 46 | 65 | 0.990 | 43 |
| S62 | 4 | Zr | Me2 | B1 | 118.7 | 58.9 | 974 | 37 | 0.991 | 46 |
| S63 | 4 | Zr | Me2 | B1 | 118.7 | 56.9 | 576 | 34 | 0.992 | 44 |
| S64 | 4 | Zr | Me2 | B1 | 118.7 | 57.6 | 207 | 28 | 0.994 | 47 |
| S65 | 4 | Zr | Me2 | B1 | 118.9 | 55.8 | 458 | 37 | 0.991 | 46 |
| S66 | 4 | Zr | Me2 | B1 | 119 | 56.0 | 599 | 38 | 0.989 | 45 |
| S67 | 4 | Zr | Me2 | B1 | 119.2 | 57.8 | 505 | 53 | 0.993 | 47 |
| S68 | 4 | Zr | Me2 | B1 | 119.2 | 56.4 | 513 | 38 | 0.990 | 46 |
| S69 | 4 | Zr | Me2 | B1 | 119.2 | 56.2 | 474 | 34 | 0.989 | 45 |
| S70 | 4 | Zr | Me2 | B1 | 119.2 | 56.4 | 481 | 39 | 0.984 | 48 |
| S71 | 4 | Zr | Me2 | B1 | 119.3 | 57.4 | 200 | 35 | 0.992 | 45 |
| S72 | 4 | Zr | Me2 | B1 | 119.3 | 55.7 | 523 | 37 | 0.989 | 46 |
| S73 | 4 | Zr | Me2 | B1 | 119.3 | 56.2 | 346 | 37 | 0.986 | 47 |
| S74 | 4 | Zr | Me2 | B1 | 119.3 | 56.2 | 714 | 34 | 0.991 | 46 |
| S75 | 4 | Zr | Me2 | B1 | 119.4 | 51.6 | 40 | 54 | 0.993 | 50 |
| S76 | 4 | Zr | Me2 | B1 | 121 | 52.0 | 100 | 50 | 0.992 | 51 |
| S77 | 4 | Zr | Me2 | B1 | 120 | 57.2 | 916 | 37 | 0.988 | 48 |
| S78 | 4 | Zr | Me2 | B1 | 119.8 | 58.0 | 539 | 46 | 0.993 | 47 |
| S79 | 2 | Zr | Cl2 | MAO | 112 | 134.8 | 119 | 1894 | 0.982 | 41 |
| S80 | 2 | Zr | Cl2 | MAO | 112 | 136.5 | 128 | 1724 | 0.987 | 32 |
| S81 | 2 | Zr | Cl2 | MAO | 112 | 135.6 | 89 | 1590 | 0.970 | 27 |
| S82 | 2 | Zr | Cl2 | MAO | 109 | 137.7 | 126 | 1476 | 0.989 | 35 |
| S83 | 2 | Zr | Cl2 | MAO | 110 | 197.6 | 100 | 620 | 0.985 | 39 |
| S84 | 2 | Zr | Cl2 | MAO | 121 | 197.3 | 68 | 2418 | 0.979 | 40 |
| S85 | 3 | Zr | Cl2 | MAO | 111 | 187.6 | 71 | 2 | 0.995 | 89 |

TABLE 1c-continued

Process Conditions, MFR, and NMR Results for inventive Polypropylenes

| Sample ID | Precursor | | | | Reactor | | Catalyst Productivity kg P/g prec | MFR g/10 min | Pentads mol fraction mmmm | Regio Defects/ 10,000 $C_3^-$ |
|---|---|---|---|---|---|---|---|---|---|---|
| | Metallocene Ligand | Central Atom | $Cl_2$/ $Me_2$ | Activator | Temp °C. | Pressure MPa | | | | |
| S86 | 3 | Zr | Cl2 | MAO | 112 | 194.5 | 130 | 11 | 0.993 | 106 |
| S87 | 3 | Zr | Cl2 | MAO | 123 | 192.0 | 140 | 19 | 0.983 | 64 |

Ligands: 1 = rac-dimethylsilyl-bis(2-methyl, 4-phenylindenyl), 2 = rac-dimethylsilyl-bis(2-isopropyl, 4-naphthylindenyl), 3 = rac-dimethylsilyl-bis(2-methyl, 4-naphthylindenyl), and 4 = rac-dimethylsilyl-bis(2-methyl, 4-(3',5'-di-tert-butyl-phenyl)indenyl).

Activators: MAO = methylaluminoxane, B1 = N,N-dimethylaniliniumtetrakis(pentafluorophenyl)borate, and C = N,N-dimethylaniliniumtetrakis(heptafluoronaphthyl)borate.

TABLE 2a

Thermal Characterization and GPC results for Inventive Polypropylenes

| Sample ID | Crystallization (DSC) | | Melting (2nd Heat) (DSC) | | | Tmp − Tcp Supercooling °C. | SCL °C. | DRI (GPC) | | | | |
|---|---|---|---|---|---|---|---|---|---|---|---|---|
| | $T_{c,\,onset}$ °C. | $T_{c,peak}$ °C. | $T_{m,peak}$ °C. | $\Delta H_f$ J/g | Cryst. % | | | Mz kg/mol | Mw kg/mol | Mn kg/mol | Mw/Mn | Mz/Mw |
| S1 | 119.1 | 116.0 | 151.5 | 100.7 | 48.6 | 35.5 | 37.8 | 235.5 | 119.9 | 55.4 | 2.16 | 1.96 |
| S2 | 116.2 | 113.0 | 149.3 | 104.0 | 50.2 | 36.3 | 35.8 | 261.5 | 134.5 | 65.5 | 2.05 | 1.94 |
| S3 | 117.6 | 113.5 | 150.7 | 92.2 | 44.5 | 37.2 | 37.0 | 252.0 | 149.6 | 64.0 | 2.34 | 1.68 |
| S4 | 117.7 | 114.5 | 150.3 | 103.7 | 50.1 | 35.8 | 36.7 | 321.7 | 206.9 | 109.7 | 1.89 | 1.55 |
| S5 | 117.6 | 114.4 | 150.1 | 98.7 | 47.6 | 35.7 | 36.5 | 329.5 | 202.9 | 84.8 | 2.39 | 1.62 |
| S6 | 115.4 | 111.8 | 149.7 | 101.8 | 49.1 | 37.9 | 36.1 | 270.5 | 172.5 | 88.3 | 1.95 | 1.57 |
| S7 | 115.6 | 111.1 | 149.1 | 97.7 | 47.2 | 38.0 | 35.6 | 305.7 | 185.5 | 89.0 | 2.08 | 1.65 |
| S8 | 115.1 | 110.9 | 148.1 | 80.4 | 38.8 | 37.2 | 34.7 | 265.9 | 153.9 | 50.3 | 3.06 | 1.73 |
| S9 | 116.8 | 113.4 | 149.2 | 88.0 | 42.5 | 35.8 | 35.7 | 425.3 | 267.4 | 122.1 | 2.19 | 1.59 |
| S10 | 116.7 | 113.3 | 149.9 | 88.3 | 42.6 | 36.6 | 36.3 | 395.2 | 247.6 | 119.1 | 2.08 | 1.60 |
| S11 | 117.2 | 113.9 | 149.8 | 98.5 | 47.6 | 35.9 | 36.2 | 175.5 | 106.4 | 53.3 | 2.00 | 1.65 |
| S12 | 118.7 | 114.1 | 150.8 | 97.3 | 47.0 | 36.7 | 37.1 | 240.4 | 145.4 | 71.7 | 2.03 | 1.65 |
| S13 | 115.9 | 113.0 | 150.6 | 111.1 | 53.6 | 37.6 | 37.0 | 287.9 | 168.6 | 57.6 | 2.93 | 1.71 |
| S14 | 115.2 | 111.0 | 148.9 | 87.4 | 42.2 | 37.9 | 35.4 | 323.5 | 198.8 | 80.8 | 2.46 | 1.63 |
| S15 | 121.3 | 115.5 | 155.0 | 100.1 | 48.3 | 39.5 | 40.9 | 340.7 | 207.5 | 102.2 | 2.03 | 1.64 |
| S16 | 116.9 | 113.3 | 153.4 | 93.8 | 45.3 | 40.1 | 39.5 | 475.0 | 271.0 | 137.5 | 1.97 | 1.75 |
| S17 | 117.8 | 113.7 | 151.9 | 87.2 | 42.1 | 38.2 | 38.2 | 431.5 | 258.7 | 118.8 | 2.18 | 1.67 |
| S18 | 119.4 | 114.7 | 153.5 | 96.6 | 46.6 | 38.8 | 39.6 | 207.5 | 129.9 | 68.7 | 1.89 | 1.60 |
| S19 | 120.6 | 116.7 | 152.6 | 100.6 | 48.6 | 35.9 | 38.8 | 176.9 | 110.0 | 55.7 | 1.97 | 1.61 |
| S20 | 116.7 | 113.2 | 152.4 | 93.8 | 45.3 | 39.2 | 38.6 | 262.9 | 161.8 | 83.4 | 1.94 | 1.62 |
| S21 | 118.4 | 114.5 | 151.3 | 94.7 | 45.7 | 36.8 | 37.6 | 285.9 | 179.0 | 94.9 | 1.89 | 1.60 |
| S22 | 115.7 | 113.0 | 151.1 | 96.8 | 46.7 | 38.1 | 37.4 | 322.1 | 195.9 | 92.2 | 2.12 | 1.64 |
| S23 | 116.4 | 113.3 | 152.9 | 99.1 | 47.8 | 39.7 | 39.0 | 240.0 | 145.8 | 74.3 | 1.96 | 1.65 |
| S24 | 117.0 | 112.8 | 150.8 | 99.3 | 47.9 | 38.0 | 37.1 | 307.5 | 165.8 | 69.4 | 2.39 | 1.85 |
| S25 | 116.2 | 112.6 | 150.7 | 103.1 | 49.8 | 38.1 | 37.0 | 352.7 | 229.3 | 118.3 | 1.94 | 1.54 |
| S26 | 116.1 | 112.4 | 149.7 | 91.9 | 44.4 | 37.3 | 36.1 | 219.8 | 137.4 | 72.0 | 1.91 | 1.60 |
| S27 | 118.4 | 115.3 | 152.6 | 87.7 | 42.3 | 37.3 | 38.8 | 334.4 | 200.4 | 100.2 | 2.00 | 1.67 |
| S28 | 117.6 | 114.0 | 152.1 | 97.2 | 46.9 | 38.1 | 38.3 | 297.0 | 181.2 | 91.4 | 1.98 | 1.64 |
| S29 | 119.9 | 116.6 | 153.8 | 100.9 | 48.7 | 37.2 | 39.9 | 339.2 | 204.1 | 100.2 | 2.04 | 1.66 |
| S30 | 118.6 | 115.9 | 153.1 | 99.8 | 48.2 | 37.2 | 39.2 | 314.1 | 189.2 | 94.1 | 2.01 | 1.66 |
| S31 | 116.7 | 113.4 | 151.5 | 93.0 | 44.9 | 38.1 | 37.8 | 389.4 | 230.1 | 105.7 | 2.18 | 1.69 |
| S32 | 119.6 | 116.7 | 154.3 | 101.7 | 49.1 | 37.6 | 40.3 | 378.9 | 230.9 | 115.8 | 1.99 | 1.64 |
| S33 | 119.3 | 116.2 | 153.3 | 104.0 | 50.2 | 37.1 | 39.4 | 581.0 | 360.7 | 171.6 | 2.10 | 1.61 |
| S34 | 117.9 | 114.5 | 153.4 | 98.5 | 47.6 | 38.9 | 39.5 | 255.7 | 151.9 | 76.7 | 1.98 | 1.68 |
| S35 | 117.4 | 114.3 | 153.4 | 97.1 | 46.9 | 39.1 | 39.5 | 239.8 | 143.8 | 73.5 | 1.96 | 1.67 |
| S36 | 118.1 | 114.8 | 152.9 | 100.0 | 48.3 | 38.1 | 39.0 | 252.0 | 152.2 | 77.5 | 1.96 | 1.66 |
| S37 | 117.1 | 114.0 | 151.6 | 101.8 | 49.1 | 37.6 | 37.9 | 265.5 | 155.8 | 76.8 | 2.03 | 1.70 |
| S38 | 118.4 | 116.0 | 152.1 | 101.6 | 49.0 | 36.1 | 38.3 | 277.3 | 167.6 | 84.3 | 1.99 | 1.65 |
| S39 | 117.9 | 114.7 | 152.3 | 96.5 | 46.6 | 37.6 | 38.5 | 265.5 | 161.6 | 82.6 | 1.96 | 1.64 |
| S40 | 117.8 | 114.1 | 154.0 | 93.7 | 45.2 | 39.9 | 40.0 | 301.4 | 180.2 | 88.8 | 2.03 | 1.67 |
| S41 | 118.3 | 114.7 | 153.1 | 98.2 | 47.4 | 38.4 | 39.2 | 257.1 | 153.2 | 76.7 | 2.00 | 1.68 |
| S42 | 120.3 | 116.8 | 153.0 | 99.7 | 48.1 | 36.2 | 39.1 | 260.4 | 153.0 | 76.0 | 2.01 | 1.70 |
| S43 | 117.6 | 114.1 | 152.2 | 95.5 | 46.1 | 38.1 | 38.4 | 235.7 | 140.3 | 70.1 | 2.00 | 1.68 |
| S44 | 117.5 | 114.3 | 152.0 | 96.5 | 46.6 | 37.7 | 38.2 | 243.2 | 143.3 | 70.6 | 2.03 | 1.70 |
| S45 | 120.0 | 116.0 | 154.0 | 99.9 | 48.2 | 38.0 | 40.0 | 235.8 | 141.1 | 68.7 | 2.06 | 1.67 |
| S46 | 119.8 | 115.4 | 152.6 | 99.0 | 47.8 | 37.2 | 38.8 | 432.7 | 272.5 | 130.7 | 2.08 | 1.59 |

Supercooling Limit (SCL) given by SCL = 0.907x − 99.64, where x is Tmp
In the above examples S1 to S46, branching index (g')values ranged between 0.874 to 1.074.

TABLE 2b

Thermal Characterization and GPC results for Inventive Polypropylenes

| Sample ID | Crystallization (DSC) | | Melting (2nd Heat) (DSC) | | | Tmp – Tcp | SCL | DRI (GPC) | | | | |
|---|---|---|---|---|---|---|---|---|---|---|---|---|
| | $T_{c,\,onset}$ °C. | $T_{c,peak}$ °C. | $T_{m,peak}$ °C. | $\Delta H_f$ J/g | Cryst. % | Supercooling °C. | °C. | Mz kg/mol | Mw kg/mol | Mn kg/mol | Mw/Mn | Mz/Mw |
| S47 | 117.4 | 114.2 | 155.5 | 90.5 | 43.7 | 41.4 | 41.4 | 678.3 | 436.5 | 215.8 | 2.02 | 1.55 |
| S48 | 118.5 | 114.7 | 156.6 | 97.5 | 47.1 | 41.9 | 42.4 | 298.2 | 189.9 | 98.1 | 1.94 | 1.57 |
| S49 | 117.2 | 114.3 | 155.1 | 98.4 | 47.5 | 40.8 | 41.0 | 239.1 | 151.7 | 79.8 | 1.90 | 1.58 |
| S50 | 120.2 | 115.0 | 155.8 | 96.2 | 46.4 | 40.8 | 41.7 | 361.8 | 226.1 | 118.6 | 1.91 | 1.60 |
| S51 | 119.9 | 115.0 | 155.8 | 95.5 | 46.1 | 40.8 | 41.7 | 323.1 | 205.9 | 111.0 | 1.86 | 1.57 |
| S52 | 118.1 | 114.5 | 155.2 | 97.3 | 47.0 | 40.7 | 41.1 | 326.0 | 199.0 | 98.9 | 2.01 | 1.64 |
| S53 | 118.4 | 114.5 | 154.5 | 98.9 | 47.7 | 40.0 | 40.5 | 303.0 | 188.1 | 96.3 | 1.95 | 1.61 |
| S54 | 118.0 | 114.4 | 155.8 | 97.3 | 47.0 | 41.4 | 41.7 | 334.3 | 200.2 | 92.0 | 2.18 | 1.67 |
| S55 | 117.9 | 113.6 | 155.2 | 97.3 | 47.0 | 41.6 | 41.1 | 268.4 | 168.4 | 91.0 | 1.85 | 1.59 |
| S56 | 118.3 | 114.3 | 155.3 | 99.6 | 48.1 | 41.0 | 41.2 | 278.6 | 174.4 | 89.0 | 1.96 | 1.60 |
| S57 | 118.1 | 114.5 | 155.0 | 99.4 | 48.0 | 40.5 | 40.9 | 315.3 | 193.5 | 95.8 | 2.02 | 1.63 |
| S58 | 118.4 | 114.9 | 155.3 | 98.8 | 47.7 | 40.4 | 41.2 | 496.2 | 188.6 | 39.7 | 4.76 | 2.63 |
| S59 | 117.4 | 113.9 | 155.1 | 97.9 | 47.3 | 41.2 | 41.0 | 278.4 | 176.4 | 96.2 | 1.83 | 1.58 |
| S60 | 117.0 | 113.5 | 155.2 | 97.4 | 47.0 | 41.7 | 41.1 | 304.5 | 187.2 | 94.3 | 1.98 | 1.63 |
| S61 | 119.9 | 115.2 | 155.8 | 96.1 | 46.4 | 40.6 | 41.7 | 300.9 | 187.1 | 92.1 | 2.03 | 1.61 |
| S62 | 119.6 | 115.2 | 155.5 | 95.4 | 46.1 | 40.3 | 41.4 | 286.6 | 178.7 | 94.7 | 1.89 | 1.60 |
| S63 | 119.5 | 115.1 | 155.5 | 97.6 | 47.1 | 40.4 | 41.4 | 272.4 | 173.2 | 96.3 | 1.80 | 1.57 |
| S64 | 118.6 | 114.6 | 155.1 | 99.2 | 47.9 | 40.5 | 41.0 | 265.8 | 168.6 | 93.6 | 1.80 | 1.58 |
| S65 | 119.0 | 115.3 | 155.4 | 97.3 | 47.0 | 40.1 | 41.3 | 293.9 | 178.7 | 90.0 | 1.99 | 1.65 |
| S66 | 118.1 | 114.8 | 155.4 | 100.9 | 48.7 | 40.6 | 41.3 | 280.4 | 171.5 | 85.5 | 2.01 | 1.64 |
| S67 | 116.3 | 113.6 | 153.5 | 96.6 | 46.6 | 39.9 | 39.6 | 268.1 | 169.5 | 83.3 | 2.03 | 1.58 |
| S68 | 119.1 | 115.3 | 155.5 | 98.9 | 47.7 | 40.2 | 41.4 | 284.5 | 178.7 | 94.4 | 1.89 | 1.59 |
| S69 | 118.7 | 115.3 | 155.4 | 99.9 | 48.2 | 40.1 | 41.3 | 293.1 | 182.0 | 92.8 | 1.96 | 1.61 |
| S70 | 119.2 | 115.0 | 155.7 | 100.1 | 48.3 | 40.7 | 41.6 | 284.3 | 179.7 | 95.2 | 1.89 | 1.58 |
| S71 | 116.5 | 113.7 | 154.2 | 97.4 | 47.0 | 40.5 | 40.2 | 262.0 | 163.2 | 86.3 | 1.89 | 1.61 |
| S72 | 119.4 | 115.7 | 154.8 | 97.2 | 46.9 | 39.1 | 40.8 | 284.4 | 176.6 | 92.8 | 1.90 | 1.61 |
| S73 | 118.5 | 114.9 | 154.7 | 101.3 | 48.9 | 39.8 | 40.7 | 272.0 | 173.3 | 95.1 | 1.82 | 1.57 |
| S74 | 118.1 | 114.3 | 155.3 | 100.2 | 48.4 | 41.0 | 41.2 | 287.2 | 176.1 | 87.8 | 2.00 | 1.63 |
| S75 | 119.3 | 114.8 | 154.8 | 101.1 | 48.8 | 40.0 | 40.8 | 255.1 | 157.6 | 79.3 | 1.99 | 1.62 |
| S76 | 117.9 | 114.3 | 154.6 | 97.9 | 47.3 | 40.3 | 40.6 | 230.0 | 144.3 | 78.7 | 1.83 | 1.59 |
| S77 | 119.5 | 115.5 | 156.0 | 97.7 | 47.2 | 40.5 | 41.9 | 296.5 | 182.3 | 92.5 | 1.97 | 1.63 |
| S78 | 116.7 | 113.9 | 154.1 | 98.8 | 47.7 | 40.2 | 40.1 | 248.1 | 154.7 | 83.0 | 1.86 | 1.60 |
| S79 | 119.4 | 116.6 | 151.6 | 103.3 | 49.9 | 35.0 | 37.9 | 91.8 | 57.3 | 28.6 | 2.00 | 1.60 |
| S80 | 118.5 | 115.2 | 151.1 | 100.4 | 48.5 | 36.0 | 37.4 | 92.6 | 58.5 | 28.9 | 2.02 | 1.58 |
| S81 | 119.6 | 115.9 | 151.3 | 104.9 | 50.6 | 35.4 | 37.6 | 97.9 | 59.3 | 28.1 | 2.11 | 1.65 |
| S82 | 119.3 | 116.1 | 152.2 | 108.0 | 52.1 | 36.1 | 38.4 | 100.7 | 62.3 | 28.8 | 2.17 | 1.62 |
| S83 | 119.0 | 115.7 | 152.9 | 106.5 | 51.4 | 37.2 | 39.0 | 115.4 | 70.2 | 32.8 | 2.14 | 1.65 |
| S84 | 117.6 | 115.1 | 151.6 | 105.4 | 50.9 | 36.5 | 37.9 | 90.2 | 58.5 | 30.6 | 1.91 | 1.58 |
| S85 | 117.8 | 114.3 | 152.0 | 94.7 | 45.7 | 37.7 | 38.2 | 576.6 | 359.7 | 166.3 | 2.16 | 1.60 |
| S86 | 116.6 | 111.1 | 149.3 | 99.0 | 47.8 | 38.2 | 35.8 | 392.2 | 246.0 | 116.4 | 2.11 | 1.59 |
| S87 | 115.5 | 111.9 | 148.8 | 85.4 | 41.2 | 36.9 | 35.3 | 306.7 | 192.8 | 93.8 | 2.06 | 1.59 |

Supercooling Limit (SCL) given by SCL = 0.907x – 99.64, where x is Tmp.
In the above examples S47 to S87, branching index (g')values ranged between 0.874 to 1.074.

Solution Polymerization

Comparative Examples

All the solution polymerizations were performed in a liquid filled, single-stage continuous stirred tank reactor (CSTR). The reactor was a 0.5-liter stainless steel autoclave and was equipped with a stirrer, a water cooling/steam heating element with a temperature controller, and a pressure controller. Solvents and propylene were first purified by passing through a three-column purification system. The purification system consisted of an Oxiclear column (Model RGP-R1-500 from Labelear) followed by a 5A and a 3A molecular sieve column. Purification columns were regenerated periodically whenever there was evidence of lower activity of polymerization. The purified solvents and monomers were then chilled to about –15 C by passing through a chiller before fed into the reactor through a manifold. Solvent and monomers were mixed in the manifold and fed into reactor through a single tube. All liquid flow rates were measured using Brooksfield mass flow meters or Micro-Motion Coriolis-type flow meters.

The metallocene catalyst precursors shown in Table 3 were pre-activated at a precursor/activator molar ratio of about 1:1 in toluene. All catalyst solutions were kept in an inert atmosphere with <1.5 ppm water content and fed into the reactor by a metering pump through a separate line. Contact between catalyst and monomer took place in the reactor.

As an impurity scavenger, 250 mL of tri-n-octyl aluminum (TNOAl) (25 wt % in hexane, Sigma Aldrich) was diluted in 22.83 kg of hexane. The TNOAl solution was stored in a 37.9-liter cylinder under nitrogen blanket. The solution was used for all polymerization runs until about 90% of consumption, then a new batch was prepared. Pumping rates of the TNOAl solution varied from run to run, typically ranging from 0 (no scavenger) to 4 mL/min.

The reactor was first cleaned by nitrogen purge and solvent wash. After cleaning, the reactor was heated/cooled to the desired temperature using water/steam mixture flowing through the reactor jacket and controlled at a set pressure with controlled solvent flow. Monomers, catalyst solutions and scavenger solution were then fed into the reactor. An automatic temperature control system was used to control and maintain the reactor at a set temperature. Onset of polymerization activity was determined by observations of a viscous product and lower temperature of water-steam mixture. Once the activity was established and system reached steady-state, the reactor was lined out by continuing operating the system under the established condition for a time period of at least five times of mean residence time prior to sample collection. The resulting mixture, containing mostly solvent, polymer and unreacted monomer, was collected in a collection box after the system reached a steady-state operation. The collected samples were first air-dried in a hood to evaporate most of the solvent, and then dried in a vacuum oven at a temperature of about 90° C. for about 12 hours. The vacuum-dried samples were weighed to obtain yields. All reactions were carried out at a pressure of about 2.41 MPa gauge.

TABLE 3

Catalyst systems used for generating Comparative Polypropylenes from Solution Polymerization

| Example | Catalyst | Activator |
|---|---|---|
| SO1 | 1 | B1 |
| SO2 | 1 | B1 |
| SO3 | 1 | B1 |
| SO4 | 1 | B1 |
| SO5 | 1 | B1 |
| SO6 | 1 | B2 |
| SO7 | 1 | B2 |
| SO8 | 1 | C |
| SO9 | 1 | C |
| SO10 | 1 | C |
| SO11 | 1 | C |
| SO12 | 1 | C |
| SO13 | 3 | B1 |
| SO14 | 3 | B1 |
| SO15 | 3 | B1 |
| SO16 | 3 | C |
| SO17 | 3 | C |
| SO18 | 3 | C |
| SO19 | 4 | C |
| SO20 | 4 | C |
| SO21 | 4 | C |
| SO22 | 4 | C |

Notes:
Catalysts: 1 = (rac-dimethylsilyl)bis(2-methyl-4-phenylindenyl)zirconium dimethyl, 3 = (rac-dimethylsilyl)bis(2-methyl-4-naphthylindenyl)zirconium dimethyl, and 4 = (rac-dimethylsilyl)bis(2-methyl-4-(3',5'-di-tert-butylphenyl)indenyl)zirconium dimethyl.
Activators: B1 = dimethylaniliniumtertrakis(pentafluorophenyl)borate, B2 = tritylterttrakis(pentafluorophenyl)borate, and C = dimethylaniliniumtertrakis(heptafluoronaphthyl)borate.

Table 4 below describes the Examples for comparative solution-polymerized propylene homopolymers, against which the disclosed novel propylene homopolymers were compared.

TABLE 4

Solution-polymerization conditions and product properties

| Example | Reactor Temp (° C.) | Cat feed rate (mol/min) | GPC (DRI) Mw (kg/mol) | DSC data (second heating) | | | |
|---|---|---|---|---|---|---|---|
| | | | | Tmp (° C.) | Tcp (° C.) | Tmp – Tcp (° C.) | SCL (° C.) |
| SO1 | 110 | 2.83E−07 | 29.4 | 139.5 | 105.4 | 34.1 | 26.9 |
| SO2 | 105 | 2.13E−07 | 36.6 | 141.0 | 106.9 | 34.1 | 28.2 |
| SO3 | 100 | 2.13E−07 | 47.5 | 144.1 | 104.9 | 39.2 | 31.0 |
| SO4 | 95 | 2.13E−07 | 57.0 | 146.1 | 109.2 | 36.9 | 32.9 |
| SO5 | 90 | 2.13E−07 | 71.9 | 148.3 | 110.2 | 38.1 | 34.9 |
| SO6 | 90 | 2.83E−07 | 59.6 | 144.8 | 108.0 | 36.8 | 31.6 |
| SO7 | 80 | 2.83E−07 | 91.7 | 149.9 | 109.7 | 40.2 | 36.3 |
| SO8 | 120 | 2.83E−07 | 35.2 | 136.2 | 100.8 | 35.4 | 23.9 |
| SO9 | 110 | 2.83E−07 | 60.0 | 141.5 | 108.1 | 33.4 | 28.7 |
| SO10 | 100 | 2.83E−07 | 96.3 | 146.4 | 110.4 | 36.0 | 33.1 |
| SO11 | 90 | 2.3E−07 | 158.0 | 151.0 | 112.0 | 39.0 | 37.3 |
| SO12 | 80 | 2.83E−07 | ~300 | 151.6 | 112.2 | 39.4 | 37.8 |
| SO13 | 110 | 7.12E−07 | 32.1 | 142.7 | 108.5 | 34.2 | 29.8 |
| SO14 | 100 | 1.68E−07 | 56.8 | 151.6 | 111.1 | 40.5 | 37.9 |
| SO15 | 90 | 5.98E−08 | 60.9 | 155.8 | 109.6 | 46.2 | 41.7 |
| SO16 | 120 | 2.67E−07 | 30.5 | 144.2 | 110.4 | 33.8 | 31.1 |
| SO17 | 110 | 2.24E−08 | 113.6 | 153.4 | 112.6 | 40.8 | 39.5 |
| SO18 | 100 | 2.24E−08 | 156.9 | 151.3 | 112.0 | 39.3 | 37.6 |
| SO19 | 120 | 1.29E−07 | 32.1 | 146.1 | 110.5 | 35.5 | 32.9 |
| SO20 | 110 | 1.29E−07 | 50.4 | 149.5 | 112.4 | 37.1 | 35.9 |
| SO21 | 100 | 1.29E−07 | 81.1 | 153.2 | 114.0 | 39.2 | 39.3 |
| SO22 | 90 | 1.29E−07 | ~108 | 155.7 | 113.8 | 41.9 | 41.6 |

Examples SO1 to SO12: C3 monomer feed 14 g/min, hexane solvent 90 ml/min
Examples SO13 to SO22: C3 monomer feed 14 g/min, hexane solvent 80 ml/min
Supercooling Limit (SCL) given by SCL = 0.907 x − 99.64, where x is Tmp.

Slurry-Polymerized Polypropylenes

Comparative Examples

Tables 5, 6 and 7 describe prior-art bulk slurry-polymerized propylene homopolymers and their preparation conditions. The technology for manufacturing propylene homopolymers via bulk slurry polymerization is well documented in the literature for both conventional Ziegler-Natta catalysts as well as supported metallocene catalysts.

ACHIEVE™ 1605, 3854 and 6025G-1 are commercial homopolymers available from ExxonMobil Chemical Co., Houston, Tex., made in commercial reactors. Slurry Examples SL1 to SL4 are similar to these ACHIEVE products. They were manufactured in similar commercial reactors, but the process conditions were adjusted to reach different MFR and molecular weight (Mw by GPC) values, as shown in Table 6.

TABLE 5

Catalysts used for the production of Slurry-polymerized Polypropylenes

| Example | Ligand | Activator |
|---|---|---|
| SL1 | 1 | B1 |
| SL2 | 1 | B1 |
| SL3 | 1 | B1 |
| SL4 | 1 | B1 |
| SL5 | 4 | B1 |
| SL6 | 4 | B1 |

Catalysts: 1 = (rac-dimethylsilyl)bis(2-methyl-4-phenylindenyl)zirconium dimethyl, 4 = (rac-dimethylsilyl)bis(2-methyl-4-(3',5'-di-tert-butylphenyl)indenyl)zirconium dimethyl.
Activator: B1 = dimethylaniliniumtertrakis(pentafluorophenyl)borate.

All catalysts supported on silica; Triethylaluminum (TEAL) used as impurity scavenger.

TABLE 6

Slurry product properties for unmodified reactor granules

| Example | Nominal MFR g/10 min | GPC (DRI) Mw (kg/mol) | DSC data (second heating) | | | |
|---|---|---|---|---|---|---|
| | | | Tmp (° C.) | Tcp (° C.) | Tmp – Tcp (° C.) | SCL (° C.) |
| ACHIEVE 1605 | 30 | 162.1 | 148.4 | 108.1 | 40.3 | 35.0 |
| ACHIEVE 3854 | 23 | N/A | 148.3 | 104.9 | 43.4 | 34.9 |
| ACHIEVE 3854 | 23 | N/A | 148.0 | 106.1 | 41.9 | 34.6 |
| ACHIEVE 6025G1 | 400 | 105.2 | 151.2 | 111.7 | 39.5 | 37.5 |
| SL1 | 150 | 117.3 | 151.4 | 110.6 | 40.8 | 37.7 |
| SL2 | 40 | 162.6 | 151.8 | 110.5 | 41.3 | 38.0 |
| SL3 | 214 | 107.5 | 151.6 | 111.9 | 39.7 | 37.9 |
| SL4 | 240 | 106.3 | 151.8 | 110.2 | 41.6 | 38.0 |
| SL5 | 5 | 239.5 | 157.6 | 115.0 | 42.6 | 43.3 |
| SL6 | 100 | 129.1 | 157.1 | 113.6 | 43.5 | 42.8 |

Supercooling Limit (SCL) derived by SCL = 0.907 x − 99.64, where x is Tmp.

Examples SL5 and SL6 were polymerized in a bulk liquid-phase pilot line, involving two continuous, stirred-tank reactors, operated in series. The reactors were equipped with jackets for removing the heat of polymerization. The catalyst, described in Table 5 above, was fed as a 20% solution in mineral oil and flushed into the lead reactor using propylene. Key process settings employed for the polymerization of Examples SL5 and SL6 are described in Table 7.

TABLE 7

Process Parameters for Polymerization of Examples SL 5 and SL6

| | Example SL5 | Example SL6 |
|---|---|---|
| Catalyst feed rate (g/hr) | 4.9 | 3.4 |
| Scavenger (TEAL) feed rate (ml/min) (2 wt % in hexane) | 4.6 | 4.5 |
| Lead reactor temperature (° C.) | 74 | 74 |
| Lead reactor pressure (psig) | 471.6 | 474.6 |
| Lead reactor $C_3$ feed (kg/hr) | 79.5 | 79.6 |
| Lead reactor $H_2$ gas concn (mppm) | 1156 | 2986 |
| Tail reactor temperature (° C.) | 68 | 68 |
| Tail reactor pressure (psig) | 421.7 | 421.2 |
| Tail reactor $C_3$ feed (kg/hr) | 29.5 | 29.5 |
| Tail reactor $H_2$ gas concn (mppm) | 1314 | 3613 |
| Lead reactor production rate (kg/hr) | 28.5 | 22.7 |
| Tail reactor production rate (kg/hr) | 10.7 | 11.8 |
| Total production rate (kg/hr) | 39.1 | 34.5 |
| Lead reactor residence time (hr) | 2.56 | 2.85 |
| Tail reactor residence time (hr) | 1.87 | 1.86 |
| Total residence time (hr) | 4.4 | 4.7 |

Polymer was discharged from the reactors as granular product. Key characterization data on the reactor granules of Examples SL5 and SL6 are shown in Table 6.

Disclosure Ethylene-Propylene (EP) Copolymer Synthesis Examples Using Continuous Stirred Tank Reactor (CSTR)

All polymerizations were performed in bulk polymerization systems (i.e., without using solvent, except for what was introduced with the catalyst solution, which did not exceed 10 wt %) and without monomer recycle.

Propylene Grade 2.5 (Airgas, Piscataway, N.J.) was obtained in #100 low pressure cylinders equipped with dip leg for liquid delivery to the monomer blending station. Ethylene Grade 4.5 (Airgas, Piscataway, N.J.) was Obtained in high-pressure cylinders.

Custom blends containing ethylene and propylene were prepared in house. The monomer blend was fed to the reactor from the monomer blend vessel.

Gas samples were analyzed using a HP6890N (Agilent Technologies) gas chromatograph (GC) equipped with flame ionization detector (FID), gas sampling valve, and pressure control compensation. The analysis was performed with a 30 m 0.53 mm ID HP AL/M megabore capillary column (film thickness 15 micron). The carrier gas was helium. The temperature program started at 70° C., held initially for 3 min, ramped to 150° C. at 20° C./min. Total analysis time was 7 minutes. The data were acquired and processed by ChromPerfect software (Justice Laboratory Software). Calibration standards containing ethylene, propane and propylene were purchased from DCG Partnership, Pearland, Tex. The FID response factors were based on these calibration standards and were also checked against the results published by J. T. Scanlon, D. E. Willis in *J. Chrom. Sci.* 23 (1985) 333 and by W. A. Dietz in *J. Gas Chrom.* (1967) 68. For our mass balance calculations, propane, a trace impurity in the propylene feed (Air Gas), served as internal standard.

The monomer blend feed was purified using two separate beds in series: activated copper (reduced in flowing $H_2$ at 225° C. and 1 bar) for $O_2$ removal, and molecular sieve (5 Å, activated in flowing $N_2$ at 270° C.) for water removal. The flow rate and density of the feed were measured by a Coriolis mass flow meter (Model PROline promass 80, Endress and Hauser) that was located downstream of the purification traps on the low-pressure side of the feed pump. The purified monomer blend was fed by a diaphragm pump (Model MhS 600/11, ProMinent Orlita, Germany).

For effluent gas sampling, a laboratory gas pump (Senior Metal Bellows, Model MB-21) was used to continually remove a gas stream from the product collection vessel. This stream of reactor effluent was sent to the GC gas sampling port and through the GC sampling loop. The GC was programmed to acquire a new sample every 10 minutes during the run. The off-line feed and on-line effluent analysis results provided the compositional input for the mass balance calculations. The total feed mass flow was generated by summing the monomer feed flow rate measured by the mass-flow meter and the catalyst flow rate measured by the weight drop in the catalyst feed vessel.

Catalyst solutions were prepared in an Ar-filled glove box by using toluene stock solutions of the catalyst precursor and the activator, and were delivered to the reactor by a continuous high-pressure syringe pump (PDC Machines, Inc., Warminster, Pa.). The pump rate directly afforded the catalyst solution feed rate for the mass balances.

Material balances were calculated from two independent composition data sets. One of them relied on effluent gas analysis and propane internal standard. The other one was based on product yield and $^{13}C$ NMR and IR compositional analyses of the product polymer. The on-line analysis provided conversion, yield, and product composition data, therefore allowed to monitor and control those process parameters.

Tables 7 and 8 below provide examples for process conditions applied and product compositions obtained by processes of the current disclosure.

TABLE 7

Exemplary process conditions for producing ethylene-propylene random copolymers of about 20 g/10 min MFR and 14-45 wt % ethylene content by disclosure processes

| Process/Product Variable | Unit | Sample number 25230- 124 | 25230- 149 | 25231- 059 | 25231- 087 | Average |
|---|---|---|---|---|---|---|
| Reactor temperature | deg C. | 105 | 106 | 106 | 104 | 105 |
| Reactor pressure | psi | 10278 | 10436 | 10467 | 10190 | 10343 |
| Feed ethylene (E/(E + P)) | wt % | 7.2 | 7.1 | 6.6 | 6.3 | 6.8 |
| Propylene conversion | % | 19 | 20 | 19.2 | 19 | 19 |
| Ethylene conversion | % | 41 | 46 | 48.5 | 47 | 46 |
| Reactor ethylene (E/(E + P)) | wt % | 4.4 | 4.2 | 3.7 | 3.8 | 4.0 |
| Product ethylene | wt % | 14.3 | 15.1 | 15.1 | 14.4 | 14.7 |
| Inert solvent/diluent | wt % | 5.6 | 3.9 | 5.4 | 6.1 | 5.3 |
| Residence time | min | 5.0 | 5.0 | 5.5 | 5.4 | 5.2 |
| Ethylene incorporation ratio | (Prod. E/P)/(rxn E/P) | 3.6 | 4.1 | 4.6 | 4.3 | 4.1 |
| MFR | g/10 min | 19 | 19 | 21 | 18 | 19 |
| Mw | kg/mol | 130 | 123 | 125.6 | 131 | 127 |
| Mn | kg/mol | 64 | 61 | 61.9 | 66 | 63 |

TABLE 8

Exemplary process conditions for producing ethylene-propylene random copolymers of about 9-16 g/10 min MFR and 11-12 wt % ethylene content by disclosure processes

| Process/Product Variable | Unit | Sample # 25231- 111 | 25231- 116 |
|---|---|---|---|
| Reactor temperature | deg C. | 97 | 96 |
| Reactor pressure | psig | 10285 | 10805 |
| Feed ethylene (E/(E + P)) | wt % | 5.2 | 4.9 |
| Propylene conversion | % | 14.2 | 17.9 |
| Ethylene conversion | % | 35.5 | 43.2 |
| Reactor ethylene (E/(E + P)) | wt % | 3.6 | 3.1 |
| Product ethylene | wt % | 11.9 | 11.1 |
| Inert solvent/diluent | wt % | 6.9 | 4.9 |
| Residence time | min | 5.1 | 5.1 |
| Ethylene incorporation ratio | (Prod. E/P)/(rxn E/P) | 3.6 | 3.9 |
| MFR | g/10 min | 16 | 9 |
| Mw | kg/mol | 150 | 167 |
| Mn | kg/mol | 74 | 84 |

The products obtained by the bulk homogeneous process disclosed herein were compared with a comparative product made with the same catalyst via a solution polymerization process (designated COM1). The catalyst precursor used was dimethyl (μ-dimethylsilyl)bis(indenyl)hafnium and the catalyst activator used was dimethylaniliniumtetrakis(heptafluoronaphthyl)borate. The comparative COM1 product and the products made by the inventive process disclosed herein were selected to have the same MFR and ethylene content. The microstructural differences between COM1 made by the comparative solution process and products of similar (15 wt %) ethylene concentration and MFR (about 20 g/min) made by the inventive processes disclosed herein (designated samples 25230-124 and 25230-149) are illustrated in Table 9 below.

TABLE 9

A comparison of the microstructure and randomness of prior art and current disclosure ethylene-propylene copolymer products of ~15 wt % ethylene and ~20 g/10 mn MFR

| | Ethylene content | | Propylene sequence regio defects | | | | Monomer sequence distribution | | | | | | Cluster Index | $R_E \cdot R_P$ |
|---|---|---|---|---|---|---|---|---|---|---|---|---|---|---|
| | by NMR | | Total | 2,1-E | 2,1-EE | 2,1-P | EEE | EEP | PEP | EPE | PPE | PPP | | |
| Sample # | wt % | mol % | | mol % | | | | | mol fraction | | | | | |
| 25230-124* | 15.5 | 21.6 | 0.97 | 0.56 | 0.41 | 0.00 | 0.007 | 0.060 | 0.149 | 0.052 | 0.250 | 0.482 | 9.79 | 0.76 |
| 25230-149** | 14.9 | 20.8 | 1.05 | 0.55 | 0.51 | 0.00 | 0.007 | 0.058 | 0.143 | 0.052 | 0.255 | 0.486 | 9.77 | 0.77 |
| COM1 | 13.9 | 19.5 | 0.63 | 0.39 | 0.24 | 0.00 | 0.009 | 0.051 | 0.135 | 0.045 | 0.238 | 0.522 | 9.81 | 0.84 |

*Average of two NMR tests
*Average of four NMR tests

As it is demonstrated in Table 9, both the comparative and the inventive products contain randomly distributed ethylene in the polymer chains: the Cluster Indices are essentially equal to 10 and the $R_E \cdot R_P$ products are near 1.0. Unexpectedly, however, the total regio defects in the continuous propylene segments in the polymer chains are substantially different, namely, the total regio defects in the ethylene-propylene random copolymers made by the inventive processes disclosed herein are 54% and 67% higher for the 25230-124 and 25230-149 samples, respectively, than that in the comparative product (COM1) made by the solution process with the same ethylene content and MFR.

Regio Defect Concentrations by $^{13}C$ NMR

Carbon NMR spectroscopy was used to measure stereo and regio defect concentrations in the polypropylene. Carbon NMR spectra were acquired with a 10-mm broadband probe on a Varian UnityPlus 500 spectrometer. The samples were prepared in 1,1,2,2-tetrachloroethane-$d_2$ (TCE). Sample preparation (polymer dissolution) was performed at 140° C. in order to optimize chemical shift resolution, the samples were prepared without chromium acetylacetonate relaxation agent. Signal-to-noise was enhanced by acquiring the spectra with nuclear Overhauser enhancement for 6 seconds before the acquisition pulse. The 3.2 second acquisition period was followed by an additional delay of 5 seconds, for an aggregate pulse repetition delay of 14 seconds. Free induction decays of 3400-4400 coadded transients were acquired at a temperature of 120° C. After Fourier transformation (256K points and 0.3 Hz exponential line broadening), the spectrum is referenced by setting the dominant mmmmm meso methyl resonance to 21.83 ppm.

Chemical shift assignments for the stereo defects (given as stereo pentads) can be found in the literature [L. Resconi, L. Cavallo, A. Fait, and F. Piemontesi, Chem. Rev. 2000, 100, pages 1253-4345]. The stereo pentads (e.g. is mmmm, mmmr, mrrm, etc.) can be summed appropriately to give a stereo triad distribution (m, mr, and rr), and the mole percentage of stereo diads (m and r). Three types of regio defects were quantified: 2,1-erythro, 2,1-threo, and 3,1-isomerization. The structures and peak assignments for these are also given in the reference by Resconi. The concentrations for all defects are quoted in terms of defects per 10,000 monomer units.

The regio defects each give rise to multiple peaks in the carbon NMR spectrum, and these are all integrated and averaged (to the extent that they are resolved from other peaks in the spectrum), to improve the measurement accuracy. The chemical shift offsets of the resolvable resonances used in the analysis are tabulated below. The precise peak positions may shift as a function of NMR solvent choice.

| Regio defect | Chemical shift range (ppm) |
| --- | --- |
| 2,1-erythro | 42.3, 38.6, 36.0, 35.9, 31.5, 30.6, 17.6, 17.2 |
| 2,1-threo | 43.4, 38.9, 35.6, 34.7, 32.5, 31.2, 15.4, 15.0 |
| 3,1 insertion | 37.6, 30.9, 27.7 |

The average integral for each defect is divided by the integral for one of the main propylene signals ($CH_3$, $CH$, $CH_2$), and multiplied by 10000 to determine the defect concentration per 10000 monomers.

Differential Scanning Calorimetry for Measuring Crystallization and Melting Temperatures (Tcp and Tmp) and Heat of Fusion ($\Delta Hf$):

Peak crystallization temperature (Tcp), Peak melting temperature (Tmp) and heat of fusion (Hf, or $\Delta Hf$) were measured using Differential Scanning calorimetry (DSC) on reactor samples (with no nucleating agent added). This analysis was conducted using either a TA Instruments MDSC 2920 or a Q2000 Tzero DSC. The DSC was calibrated for temperature using four standards (Tin, Indium, cyclohexane, and water). Heat of fusion of indium (28.46 J/g) was used to calibrate the heat flow signal. The reproducibility of peak melting temperature for polypropylene is within ±0.3° C. and heat of fusion is within 2%. Typically about 3 to 5 mg of polymer from the reactor was sealed in a standard aluminum pan with flat lids and loaded into the instrument at room temperature. Sample was cooled to −70° C. and heated at 10° C./min to 210° C. to acquire the melting data (first heat). This first heating provides the melting behavior for samples made in the reactor. Since thermal history influences melting and crystallization behavior, the sample was held for 5 minutes at 210° C. to destroy its thermal history. This was followed by cooling this sample to −70° C. at a cooling rate of 10° C./min to analyze its crystallization behavior at this cooling rate. The exothermic peak of crystallization was analyzed using the software provided by the vendor and the peak of crystallization (Tcp) is reported. The sample was held at this low temperature of −70° C. for about 10 minutes to equilibrate it and then heated back to 210° C. at 10° C./min to analyze the melting behavior (second heat). This gave the melting behavior of samples crystallized under controlled cooling conditions (10° C./min). The melting temperature reported is obtained by the analysis of the melting peak using the software provided by the vendor and corresponds to the peak of the melting transition (Tmp). All samples reported in this work showed relatively narrow, single melting peaks and the breadth of melting did not show any significant change for different catalysts. Area under the melting curve was used to determine the heat of fusion ($\Delta H_f$) in J/g using the software provided by to the vendor. This heat of fusion is used to calculate the degree of crystallinity. The percent crystallinity is calculated using the formula: percent crystallinity [area under the curve (J/g)/207.14 (J/g)]×100%. A value of 207.14 J/g or 8700 J/mol is the equilibrium heat of fusion for 100% crystal line polypropylene and is obtained from Ref: B. Wunderlich in "Thermal Analysis" Academic Press, page 418, 1990.

Melt-Flow Rate Measurements:

The Melt-Flow Rates (MFR) of polymers were determined by using Dynisco Kayeness Polymer Test Systems Series 4003 apparatus following the method described in the Series 4000 Melt Indexer Operation manual, Method B. The method follows ASTM D-1238, Condition L, 2.16 kg and 230° C. All samples were stabilized by using Irganox 1010.

Molecular Weights (Mw, Mn and Mz) by Gel-Permeation Chromatography (GPC):

Molecular weight distributions were characterized using Gel-Permeation Chromatography (GPC), also referred to as Size-Exclusion Chromatography (SEC). Molecular weight (weight average molecular weight, Mw, number average molecular weight Mn, Viscosity average molecular weight, Mv, and Z average molecular weight, Mz) were determined using High-Temperature Gel-Permeation Chromatography equipped with a differential refractive index detector (DRI) to measure polymer concentrations (either from Waters Corporation with on-line Wyatt DAWN "EOS" and Waters GPCV viscometer detectors, or Polymer Laboratories with on-line Wyatt mini-DAWN and Viscotek Corporation viscometer detectors. Experimental details on the measurement procedure are described in the literature by T. Sun, P. Brant, R. R.

Chance, and W. W. Graessley, Macromolecules, Volume 34, Number 19, 6812-6820 (2001).

The analysis was performed using a Waters GPCV 2000 (Gel Permeation Chromatograph) with triple detection. The three detectors were in series with Wyatt DAWN "EOS" MALLS 18 angle laser light scattering detector first, followed by the DRI (Differential Refractive Index) then Differential Viscometer detector. The detector output signals are collected on Wyatt's ASTRA software and analyzed using a GPC analysis program. The detailed GPC conditions are listed in Table 8 below.

Standards and samples were prepared in inhibited TCB (1,2,4-trichlorobenzene) solvent. Four NBS polyethylene standards were used for calibrating the GPC. Standard identifications are listed in the table below. The samples were accurately weighed and diluted to a ~1.5 mg/mL concentration and recorded. The standards and samples were placed on a PL Labs 260 Heater/Shaker at 160° C. for two hours. These were filtered through a 0.45 micron steel filter cup then analyzed.

The concentration, c, at each point in the chromatogram is calculated from the baseline-subtracted DRI signal, IDRI, using the following equation:

$$c = K_{DRI} \, IDRI(dn/dc)$$

where KDRI is a constant determined by calibrating the DRI, and (dn/dc) is the same as described below for the LS analysis. Units on parameters throughout this description of the SEC method are such that concentration is expressed in g/cm$^3$, molecular weight is expressed in g/mole, and intrinsic viscosity is expressed in dL/g.

For the light-scattering detector used at high temperature, the polymer molecular weight, M, at each point in the chromatogram is determined by analyzing the LS output using the Zimm model for static light scattering (M. B. Huglin, Light Scattering from Polymer Solutions, Academic Press, 1971):

$$\frac{K_O c}{\Delta R(\theta)} = \frac{1}{MP(\theta)} + 2A_c c$$

Here, $\Delta R(\theta)$ is the measured excess Rayleigh scattering intensity at scattering angle $\theta$, c is the polymer concentration determined from the DRI analysis, A2 is the second virial coefficient, $P(\theta)$ is the form factor for a monodisperse random coil (described in the above reference), and Ko is the optical constant for the system:

$$K_o = \frac{4\pi^2 n^2 (dn/dc)^2}{\lambda^4 N_A}$$

in which NA is Avogadro's number, and (dn/dc) is the refractive index increment for the system. The refractive index, n=1.500 for TCB at 135° C. and $\lambda$=690 nm. In addition, A2=0.0006 for propylene polymers and (10015 for butene polymers, and (dn/dc)=0.104 for propylene polymers and 0.098 for butene polymers.

A high temperature Viscotek Corporation viscometer was used, Which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]_i$, at each point in the chromatogram is calculated from the following equation:

$$[\eta]_i = \eta_{si}/C_i$$

where the concentration, $C_i$, was determined from the DRI output.

The branching index (g') is calculated using the output of the SEC-DRI-LS-VIS method as follows. The branching index g' is defined as: Sample measured $[\eta]$/calculated theoretical $[\eta]$ of a linear polymer, where the calculated theoretical $[\eta]$ of a linear=$kM^\alpha$ Where k=0.0002288 and $\alpha$=0.705 for propylene polymers.

Mv is the viscosity average molecular weight based on molecular weights determined by light-scattering (LS) analysis. The viscosity average molecular weight. Mv, of the sample is calculated by:

$$Mv = \{\Sigma h_i M_i^\alpha / \Sigma h_i\}^{1/\alpha}$$

$M_i$=molecular weight for each time slice, $h_i$, from the chromatogram, and the summations are carried out over all chromotographic slices, i.e., between the integration limits.

TABLE 8

| Gel Permeation Chromatography (GPC) measurement conditions | | |
|---|---|---|
| INSTRUMENT | | WATERS 2000 V + Wyatt Dawn EOS |
| COLUMN | Type: | 3 × MIXED BED TYPE "B" |
| | | 10 MICRON PD (high porosity col.'s) |
| | Length: | 300 mm |
| | ID: | 7.8 mm |
| | Supplier | POLYMER LABS |
| SOLVENT PROGRAM | A | 0.54 ml/min TCB inhibited |
| | | GPC console setting was 0.5 mL/min to which 8% expansion factor (from Waters) makes actual flow 0.54 mL/min |
| DETECTOR | A: | Wyatt MALLS 17 angle's of laser light scattering detector |
| | B: | DIFFERENTIAL REFRACTIVE INDEX (DRI) in series |
| | C: | Viscometer |
| | | IDvol. = +232.2 ul LS to DRI |
| | | IDvol. = −91.8 ul Dp to DRI |
| TEMPERATURE | Injector: | 135° C. |
| | Detector: | 135° C. |
| | Column: | 135° C. |
| DISOLUTION CONDITIONS | | Shaken for 2 h on a PL SP260 heater |
| | | Shaker @160° C. |
| SAMPLE FILTRATION | | Through a 0.45μ SS Filter @ 135° C. |
| INJECTION VOLUME | | 329.5 μL |
| SAMPLE CONCEN-TRATION | | 0.15 w/v % (1.5 mg/ml) Target wt |
| SOLVENT DILUENT | | TCB inhibited |
| CALIBRATION NARROW PE STANDARDS | | NIST 1482a; NIST1483a; NIST1484a |
| BROAD PE STANDARD | | NIST 1475a |

Monomer Sequence Distribution and Composition by $^{13}$C NMR:

Carbon NMR spectroscopy was used to measure monomer sequence distribution, composition, clustering, and regio defect concentrations in the propylene sequences. Carbon NMR spectra were acquired with a 10-mm broadband probe on a Varian UnityPlus 500 spectrometer. The samples were prepared in 1,1,2,2-tetrachloroethane-d$_2$ (TCE). Sample preparation (polymer dissolution) was performed at 140° C.

Figure 25:
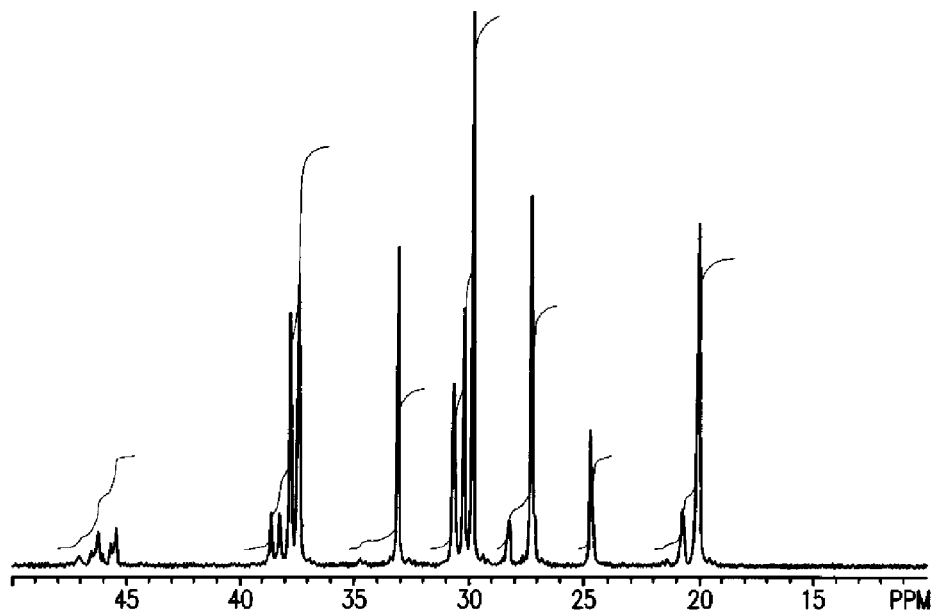
FIG. 25 presents a typical $^{13}$C NMR spectrum of an $C_2^=$-$C_3^=$ copolymer with high ethylene content.

In order to optimize chemical shift resolution, the samples were prepared without chromium acetylacetonate relaxation agent. Signal-to-noise was enhanced by acquiring the spectra with nuclear Overhauser enhancement for 10 seconds before the acquisition pulse. The 3.2 second acquisition period was followed by an additional delay of 4 seconds, for an aggregate pulse repetition delay of 17 seconds. Free induction decays of 3400-4400 coadded transients were acquired at a temperature of 120° C. After Fourier transformation (256K points and 0.3 Hz exponential line broadening), the spectrum is referenced by setting the upfield peak of the TCE to 74.054 ppm. FIG. 25 depicts a typical $^{13}$C NMR spectrum of a $C_2^=$-$C_3^=$ copolymer with high ethylene content.

The Journal of Applied Polymer Science article by Di Martino and Kelchtermans (*J. Applied Polymer Sci.* 56 (1995) 1781) provides an accessible tabulation of the chemical shift assignments for the peaks in the spectrum. The review article by Randall and Rucker (J. C. Randall and S. P. Rucker, *Macromolecules* 27(8) (1994) 2120) gives an overview of the procedure for converting the peak areas to the monomer sequence triads that define the chain microstructure. The measured integrals are converted into monomer triad and chain defect concentrations through a linear algebraic matrix system y=Ax which relates the two. The matrix system employs the integrals as the dependent y vector, the triad/defect concentrations as the x vector, and the number of carbons (intensity) contributed by each triad or defect structure to each integral region as the transfer matrix, A. The nomenclature adopted for the analysis is tabulated below:

| Chemical shift range (ppm) | NMR region | Chain structure |
|---|---|---|
| 45-48 | A | PPP + ½PPE |
| 43-43.8 | 2,1-P | 2,1-Pt |
| 41-42 | 2,1-P | 2,1-Pe |
| 37-39 | B | PEP + (½)PEE + EPE + (½)PPE |
| 38.4-38.95 | 2,1-P | 2,1-Pe + 2,1-Pt |
| 35.2-36 | 2,1-P | 2,1-Pe + 2,1-Pt |
| 34-35.7 | 2,1-E + 2,1-P | 2,1-E + 2,1-EE + 2,1-Pt |
| 33.8, 33.9 | 2,1-E | 2,1-E |
| 33.4, 33.55 | 2,1-EE | 2,1-EE |
| 32.9-33.4 | C | EPE |
| 32-32.5 | 2,1-P | 2,1-Pt |
| 31.1-31.25 | 2,1E + 2,1-EE | 2,1-E, 2,1-EE |
| 30.5-31.05 | D | EPP + 2,1-Pt + 2,1-Pe |
| 30.6-30.7 | Γγ | PEEP |
| 30.2-30.3 | γδ⁺ | PEEE + 2,1-Pe |
| 29.8-30 | δ⁺δ⁺ | (EEE)n |
| 27.8-29 | F | PPP |
| 27.5-27.9 | Bγ | 2,1-E-E |
| 27.25-27.45 | G1 | PEE |
| 26.9-27.25 | G2 | PEE |
| 24.2-24.9 | H | PEP |
| 21.2-22.3 | I1 | PPPmm |
| 20.5-21.2 | I2 | PPPmr + PPE |
| 19.76-20.3 | I3 | PPPrr + EPE |
| 15.0 | 2,1-P-t | 2,1-P-t |
| 15.4 | 2,1-P-t | 2,1-P-t |
| 17.2 | 2,1-P-e | 2,1-P-e |
| 17.5 | 2,1-P-e | 2,1-P-e |

The ethylene and propylene triad concentrations are normalized to 100%. The mole-percent ethylene will then be the sum of the ethylene-centered triads, and mole-percent propylene will be the sum of the propylene-centered triads. The defect concentrations can be cast in terms of mol % defects, i.e. defects per 100 triads.

The distribution of monomers in the chain can be modeled with a statistical model for the polymerization. The simplest, Bernoullian, model assumes that comonomers add to the growing chain without bias from the monomer currently at the chain terminus. The next-higher order model, the first order Markovian, assumes that the monomer is sensitive to the current chain-end monomer during the addition reaction. This allows the mathematical description of a reaction system's propensity for making alternating, random, and block copolymers. The Markovian analysis of finite EP polymer chains by Randall and Rucker (J. C. Randall and S. P. Rucker, *Macromolecules* 27(8) (1994) 2120) explains the mathematics behind the statistical modeling of the polymer microstructure, and is excerpted in part here.

There are four basic first-order Markov transition probabilities for the four possible adjoining pairs of monomer units In a Markov diad, the first unit is called the initial state and the second unit is called the final state. With the exception of the end groups, a diad description requires that each unit in a copolymer chain serves as both an initial state and a final state. For a copolymer chain, there are only two possibilities for the initial state and, likewise, only two possibilities for the final state. The statistical treatment that follow will be derived for a poly(ethylene-co-propylene), but they apply to any copolymer chain.

Probability designations for ethylene-propylene copolymerization

| Initial State | Add | Final state | Transition probability |
|---|---|---|---|
| E | E | E | $P_{EE}$ |
| E | P | P | $P_{EP}$ |
| P | E | E | $P_{PE}$ |
| P | P | P | $P_{PP}$ |

Accordingly, the four transition probabilities outlined in the table above must be related as follows:

$$P_{EE}+P_{EP}=1$$

$$P_{PE}+P_{PP}=1$$

A first order Markovian system reduces to Bernoullian when $$P_{EE}=P_{PE}=P_E=\text{mole fraction of ``E''}, \text{ and}$$

$$P_{EP}=P_{PP}=P_P=\text{mole fraction of ``P''},$$

which demonstrates that chain propagation for Bernoullian copolymer systems is independent of the identity of the initial state. Consequently, Bernoullian statistical analyses are defined with only one independent variable and first order Markov analyses are defined with two independent variables. The process for deriving the transition probabilities from the triad concentrations is described comprehensively in the work of Randall and Rucker (J. C. Randall and S. P. Rucker, *Macromolecules* 27(8) (1994) 2120). A sequence of any length in a copolymer chain can now be defined in terms of only two transition probabilities.

Calculating the transition probabilities has utility not only for calculating the predicted concentration of any arbitrary sequence of monomers in the chain, but also for characterizing the propensity of the monomers to cluster in the chain. One such method for characterizing the tendency of comonomers to polymerize in a non-random fashion is the cluster index developed by Randall (J. C. Randall, "A Review of High Resolution Liquid $^{13}$Carbon Nuclear Magnetic Resonance Characterizations of Ethylene-Based Polymers", *JMS-Rev. Macromol. Chem. Phys.* (1989), C29(2 & 3), pp 201-

317). This measures the deviation in the concentration of isolated comonomer triads (EPE triads) from that predicted by a Bernoullian model:

$$\text{Cluster index} = 10 \cdot \left[1 - \frac{[EPE]_{observed} - [EPE]_{random}}{[P]_{observed} - [EPE]_{random}}\right]$$

which can be restated in terms of the monomer triads:

$$\text{Cluster index} = 10 \cdot \left[1 - \frac{[EPE]_{observed} - [EPE]_{random}}{[PPP]_{observed} + [PPE+EPP]_{observed} + [EPE]_{observed} - [EPE]_{random}}\right]$$

In a polymer of 50 mol % ethylene, for example, an alternating architecture will have all the P comonomer in one-monomer blocks. Thus $[EPE]_{observed} = [P]_{observed}$, and the duster index becomes 0. A random copolymer will have $[EPE]_{observed} = [EPE]_{random}$, giving a cluster index of 10. In the case of a block copolymer, the fraction in the brackets becomes −0.33, and the cluster index 13.3. This is summarized in the table below:

| Microstructure | Cluster index for 50/50 copolymer |
|---|---|
| Alternating | 0 |
| Random | 10 |
| Block | 13.3 |

Another pair of common descriptors for the polymerization process are the reactivity ratios, $R_E$ and $R_P$, which can be expressed as rate of homopolymerization divided by the rate of copolymerization, multiplied or divided by the ratio [E]/[P].

$$R_E = \frac{k_{EE}}{k_{EP}} = \frac{P_{EE}[P]}{P_{EP}[E]}$$

$$R_P = \frac{k_{PP}}{k_{PE}} = \frac{P_{PP}[E]}{P_{PE}[P]}$$

Calculating these reactivity ratios from the NMR data would require information about the monomer ratios in the reactor, [E]/[P], which often are not available. Multiplying these quantities $R_E$ and $R_P$, we can remove the monomer ratio dependence:

$$R_E R_P = \frac{P_{EE} P_{PP}}{p_{EP} P_{PE}}$$

In principle, this product can be determined from any polymer analytical technique that yields a triad distribution and also from kinetics experiments. The important result of this calculation is that there are certain values for the transition probabilities that provide break points for describing blocky, alternating, or random polymers, and these are tabulated below.

| Transition probabilities | $R_E R_P$ | Polymer structure |
|---|---|---|
| $P_{EE} = 1\ P_{EP} = 0$<br>$P_{PP} = 1\ P_{PE} = 0$ | ∞ | blocky |
| $P_{EE} = .5\ P_{EP} = .5$<br>$P_{PP} = .5\ P_{PE} = .5$ | 1 | random |
| $P_{EE} = 0\ P_{EP} = 1$<br>$P_{PP} = 0\ P_{PE} = 1$ | 0 | perfectly alternating |

-continued

| Transition probabilities | $R_E R_P$ | Polymer structure |
|---|---|---|

Figure 26:
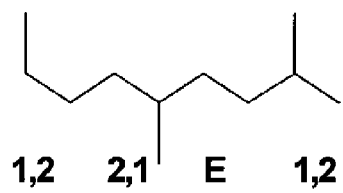
FIG. 26 presents the defects for an EP copolymer chain segment growing from left to right.
Figure 26:
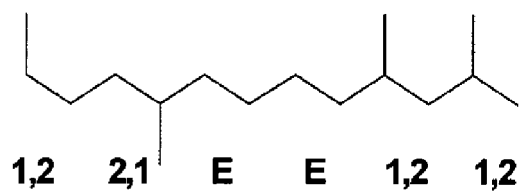
Figure 26:
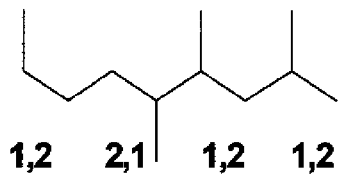

Several regio defects were assigned and integrated in the NMR spectrum where observed. These result from reverse (2,1) addition of the propylene monomer, followed by either a propylene, one ethylene, or two ethylenes, and are designated 2,1-P, 2,1-E, and 2,1-EE, respectively. Peak assignments for these defects can be found in the work of Cheng. (H. N. Cheng, "$^{13}$C NMR Analysis of Ethylene-Propylene Rubbers", *Macromolecules*, 17, 1950-1955, (1984)). The defects are illustrated in FIG. 26 for a polymer chain segment growing from left to right.

The quantification of the regio defect concentrations can be performed by integrating representative spectral region(s) for each defect, and comparing that (average) integral against the total monomer triad count, as determined from the linear algebraic solution described above.

For the materials considered here, we used the 318-319 ppm region to quantify 2,1-E defects, and the 33.4-33.55 region to quantify the 2,1-EE defect. The 2,1-P defects when present give characteristic (and well-resolved) peaks in the 15-17.5 ppm region). These are further resolved into contributions from erythro (2,1-Pe) and threo (2,1-Pt) stereochemistry at the defect site.

Ethylene Concentration by Infrared Spectroscopy (IR):

Ethylene analyses of ethylene-propylene copolymers by IR were performed using thin polymer films of the product EP copolymers. The calibration standards and test films were prepared according to sub-method A of ASTM D3900. The calibration correlated the area ratio of the peaks at 1155 and 722 cm$^{-1}$, and was fitted by the following expression for products with ethylene contents of less than 40 wt %:

Ethylene wt %=72.698−86.495$X$+13.696$X^2$ where X=(peak area at 1155 cm$^{-1}$)/(peak area at 722 cm$^{-1}$). The $^{13}$C NMR and IR analysis results showed good agreements and the IR and NMR results were typically within 1 wt %.

Polymer Density:

Density is measured by density-gradient column, such as described in ASTM D1505, on a compression-molded specimen that has been slowly cooled to room temperature.

Quiescent Isothermal Crystallization Kinetics of Supercritical Polypropylenes

The crystallization kinetics of the SC-PP were measured via isothermal measurements using a Perkin Elmer Diamond DSC. The DSC cell was calibrated for temperature using two standards: indium (onset of second melting peak used is 156.6° C.) and deionizer water (onset of first melting peak used is 0° C.). Heat of fusion was calibrated using standard heat of fusion of Indium 28.46 J/g. Reproducibility of Indium for a calibrated DSC cell for onset of melting is ±0.2° C. and heat of fusion is ±1-2%.

About 3-4 mg of a sample was encapsulated in a Aluminum pan provided by the vendor. Reference pan of closely matching mass was used for all measurements. Sample was equilibrated at room temperature and heated to 210° C. at 10"C/min followed by a hold at 210° C. for 3 minutes to destroy its thermal history. It was then rapidly cooled at programmed cooling rate of 300° C./min to the desired isothermal temperature and held isothermally for 30 minutes to allow the sample to crystallize isothermally. The start temperature of the isothermal measurement varied from sample to sample but typically for samples that had a peak melting temperature between 150° C. to 156° C. at heating rate of 10° C./ruin, the start temperature for isothermal measurement ranged between 132° C. to 136° C. For samples that have a lower melting temperature, the isothermal measurement was started at a slightly lower temperature. After the isothermal crystallization for 30 minutes the sample was heated back to 210° C. at a heating rate of 10° C./min to record the melting characteristics of the isothermally crystallized sample. The same sample was held at 210° C. for 3 minutes and cooled to a temperature 2 degree lower than the start temperature at 300° C./min followed by a 30 minutes hold and then the heating segment. With each sample, this cool, isothermal hold followed by heating cycle was repeated for a total of 5 temperatures at a maximum and a fresh sample used to extend the measurement range to lower temperatures. Isothermal crystallization and melting data was collected for at least about 8-10 temperatures for each polypropylene sample.

Data analysis was performed using a Pyris data analysis software (version 7.0) provided by Perkin Elmer. Time taken for crystallinity to develop at each isothermal crystallization temperature was evaluated by integrating the exothermic heat of crystallization (in J/g) versus time (minutes). From a table of % crystallized versus time, time taken for 50% crystallinity to develop was noted as the t-half time in minutes at that particular temperature. Time taken for 50% crystallinity is reported at 122° C. and 126° C. for comparison of crystallization kinetics of different polypropylenes. In addition, t-half data at additional temperatures covering a temperature range about 15 to 20 degrees are plotted in the Figure versus crystallization temperature to compare the crystallization behavior. Lower t-half time at a particular crystallization temperature is indicative of faster crystallization.

Mechanical Property Test Methods:

| | |
|---|---|
| Tensile Properties | ASTM D 638 |
| Heat Deflection Temperature | ASTM D 648 (66 psi) |
| Vicat Softening Temperature | ASTM D 1525 (200 g) |
| Gardner Impact Strength | ASTM D 5420 |
| Izod Impact Strength | ASTM D 256 (A) |
| 1% Secant Flexural Modulus | ASTM D 790 (A) |
| Rockwell Hardness | ASTM D 785 (R scale) |

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. All numerical values within the detailed description and the claims herein are "about" or "approximately" the indicated value, and take into account experimental error and variations that would be expected by a person having ordinary skill in the art.

What is claimed is:

1. An in-line blending process for producing blends of polypropylene and ethylene-propylene copolymer comprising:
   (a) providing two or more reactor trains configured in parallel and a high-pressure separator downstream fluidly connected to the two or more reactor trains configured in parallel, wherein one or more of the reactor trains produces polypropylene and one or more of the reactor trains produces ethylene-propylene copolymer;
   (b) contacting in one or more of the reactor trains configured in parallel 1) propylene, 2) one or more catalyst systems, and 3) optional one or more diluents or solvents, wherein the polymerization system for at least one of the reactor trains configured in parallel containing 1) propylene, 2) one or more catalyst systems, and 3) optional one or more diluents or solvents is at a temperature above the solid-fluid phase transition temperature, at a pressure no lower than 10 MPa below the cloud point pressure and less than 1500 MPa, and is above its critical temperature and critical pressure,
   contacting in the other one or more reactor trains configured in parallel 1) propylene, 2) ethylene, 3) optional one or more comonomers comprising four or more carbon atoms, 4) one or more catalyst systems, and 5) optional one or more diluents or solvents, wherein at least one of the reactor trains containing 1) propylene, 2) ethylene, 3) optional one or more comonomers comprising four or more carbon atoms, 4) one or more catalyst systems, and 5) optional one or more diluents or solvents is at a temperature of between 65° C. and 180° C. and at a pressure no lower than 10 MPa below the cloud point pressure of the polymerization system and less than 1500 MPa,
   wherein the polymerization system for each reactor train is in its dense fluid state and comprises propylene, any ethylene present, any comonomer comprising four or more carbon atoms present, any diluent or solvent present, and the polymer product,
   wherein the catalyst system for each reactor train comprises one or more catalyst precursors, one or more activators, and optionally, one or more catalyst supports;
   wherein the polymerization system for each reactor train comprises less than 40 wt % of the optional solvent; and
   (c) forming a reactor effluent including a homogeneous fluid phase polymer-monomer mixture in each parallel reactor train;
   (d) combining the reactor effluent comprising the homogeneous fluid phase polymer-monomer mixture from each parallel reactor train to form a combined reactor effluent;

(e) passing the combined reactor effluent through the high-pressure separator for product blending and product-feed separation;

(f) maintaining the temperature and pressure within the high-pressure separator above the solid-fluid phase transition point but below the cloud point pressure and temperature to form a fluid-fluid two-phase system comprising a polymer-rich phase and a monomer-rich phase;

(g) separating the monomer-rich phase from the polymer-rich phase to form a polymer-enriched stream comprising a blend of polypropylene and ethylene-propylene copolymer and a separated monomer-rich stream, and (h) further processing the polymer enriched stream of (g) to further remove any solvent/diluent and/or monomer to yield a polypropylene-(ethylene-propylene copolymer) product blend.

2. The process of claim 1, wherein the polypropylene is an isotactic polypropylene with a melting peak temperature of 149° C. or higher, and a weight-averaged molecular weight of 35 kg/mol or higher; and the ethylene-propylene copolymer is a random copolymer comprising between 10 wt % and 20 wt % randomly distributed ethylene.

3. The process of claim 1, wherein the one or more catalyst systems used in contacting the propylene, and optional one or more diluents or solvents or the propylene, ethylene, optional one or more comonomers comprising four or more carbon atoms, and optional one or more diluents or solvents are chosen from Ziegler-Natta catalysts, metallocene catalysts, nonmetallocene metal-centered, heteroaryl ligand catalysts, late transition metal catalysts, and combinations thereof.

4. The process of claim 1, wherein the catalyst system for the one or more reactor trains producing polypropylene comprises a non-coordinating anion activated metallocene catalyst.

5. The process of claim 1 wherein the polymerization systems of the two or more reactor trains configured in parallel comprise less than 20 wt % of the optional solvent.

6. The process of claim 1 wherein the two or more reactor trains configured in parallel operate above the critical or pseudo-critical temperature and critical or pseudo-critical pressure of their polymerization system.

7. The process of claim 1 wherein the combined propylene and ethylene concentration in the combined feed to each reactor train configured in parallel is 35 wt % or more.

8. The process of claim 1 wherein the combined propylene and ethylene concentration in the effluent of each of the two or more reactor trains configured in parallel is greater than 2 mol/L.

9. The process of claim 1 wherein the combined propylene and ethylene concentration in the effluent of each of the two or more reactor trains configured in parallel is greater than 10 mol/L.

10. The process of claim 1 wherein the one or more reactor trains producing the ethylene-propylene copolymer operates at a pressure of between 12.0 and 137.9 MPa.

11. The process of claim 1 further comprising removing oligomers, polymers, solvent/diluent or combinations thereof from the separated monomer-rich phase through the use of at least one knock-out pot, at least one separation tower, or a combination thereof.

12. The process of claim 1 further comprising providing one or more storage tanks, and feeding from the one or more storage tanks one or more polymers, one or more plasticizers, and/or one or more polymer additives to the process after (c).

13. The process of claim 1, wherein (h) includes feeding the polymer enriched stream of (g) to one or more low-pressure separators to further separate the monomers and other volatiles to form a further-enriched polymer stream comprising a blend of polypropylene and ethylene-propylene copolymer.

14. The process of claim 13 further comprising feeding the further-enriched polymer stream to a coupled devolatilizer to further separate other volatiles to form the polypropylene-(ethylene-propylene copolymer) product blend, wherein the coupled devolatilizer operates under vacuum enabling the further-enriched polymer stream to flash off the monomers and other volatiles, and wherein the coupled devolatilizer is a devolatilizing extruder.

15. The process of claim 14, wherein the polypropylene-(ethylene-propylene copolymer) product blend comprises from 1 to 50 wt % polypropylene and from 50 to 99 wt % ethylene-propylene copolymer.

16. The process of claim 14 wherein one or more polymers, one or more plasticizers and/or one or more polymer additives are added to the polypropylene-(ethylene-propylene copolymer) product blend at the high-pressure separator, the low-pressure separator, the devolatilizing extruder or combinations thereof.

17. The process of claim 1 wherein the high-pressure separator is a gravimetric separation vessel, wherein the monomer-rich phase has a density of about 0.3 to about 0.7 grams/mL and the polymer-rich phase has a density of about 0.4 to about 0.8 grams/mL.

18. The process of claim 1 further comprising recycling the separated monomer-rich stream of (g) to the one or more of the reactor trains producing ethylene-propylene copolymer.

19. The process of claim 1, wherein the optional one or more comonomers comprising four or more carbon atoms are chosen from butene-1, pentene-1, hexene-1, octene-1, decene-1, dodecene-1, and combinations thereof.

20. The process of claim 1 further comprising recycling the separated monomer-rich stream of (g) to the one or more reactor trains producing polypropylene.

* * * * *